United States Patent [19]

Simpson

[11] Patent Number: 5,685,118

[45] Date of Patent: Nov. 11, 1997

[54] ROOF PANELS WITH STIFFENED ENDLAPS

[75] Inventor: Harold G. Simpson, Tulsa, Okla.

[73] Assignee: Harold Simpson, Inc., Tulsa, Okla.

[21] Appl. No.: 484,976

[22] Filed: Jun. 7, 1995

Related U.S. Application Data

[63] Continuation-in-part of Ser. No. 185,480, Jan. 21, 1994, and Ser. No. 181,756, Jan. 21, 1994, which is a continuation of Ser. No. 846,278, Mar. 2, 1992, Pat. No. 5,303,528, which is a division of Ser. No. 402,901, Sep. 1, 1989, Pat. No. 5,142,838, which is a division of Ser. No. 745,320, Jun. 14, 1985, abandoned, which is a continuation-in-part of Ser. No. 568,083, Jan. 4, 1984, Pat. No. 4,597,234, and a continuation of Ser. No. 604,884, Oct. 26, 1990, abandoned, which is a division of Ser. No. 136,246, Dec. 18, 1987, abandoned, which is a continuation-in-part of Ser. No. 90,689, Aug. 28, 1987, abandoned, which is a continuation-in-part of Ser. No. 745,320, Jun. 14, 1985, abandoned, which is a continuation-in-part of Ser. No. 568,083, Jan. 4, 1984, Pat. No. 4,597,234.

[51] Int. Cl.$^6$ .................. E04D 1/34; E04D 1/06
[52] U.S. Cl. .............. 52/520; 52/537; 52/533; 52/542; 52/522; 52/588.1
[58] Field of Search .............. 52/90.2, 537, 508, 52/509, 506.1, 506.01, 510, 520, 407.3, 533, 542, 522, 588.1

[56] References Cited

U.S. PATENT DOCUMENTS

| | | | |
|---|---|---|---|
| 4,099,356 | 7/1978 | Graham | 52/520 |
| 4,114,340 | 9/1978 | Dean et al. | 52/520 |
| 4,193,247 | 3/1980 | Heckelsberg | 52/520 X |
| 4,217,741 | 8/1980 | Cole | 52/520 |
| 4,269,012 | 5/1981 | Mattingly et al. | 52/542 X |
| 4,406,106 | 9/1983 | Dinges | 52/520 X |
| 4,522,005 | 6/1985 | Seaburg et al. | 52/520 X |
| 4,655,020 | 4/1987 | Ginn, Jr. | |
| 4,694,628 | 9/1987 | Vondergoltz et al. | 52/520 X |
| 4,819,398 | 4/1989 | Dameron | 52/529 |

OTHER PUBLICATIONS

ARMCO Drawing ER-105, Apr., 1970.
ARMCO Drawing ER-220, Sep., 1981.
ARMCO Drawing ER-221, Sep., 1981.

*Primary Examiner*—Wynn E. Wood
*Attorney, Agent, or Firm*—Bill D. McCarthy; Randall K. McCarthy; Phillip L. Free, Jr.

[57] ABSTRACT

A standing seam roof assembly with a four corner sealing assembly having an upper pair of interlocking standing seam joint panels and a lower pair of interlocking standing seam joint panels which meet in a lapped four corner juncture area, the upper ends of the lower panel pair are overlapped by the lower ends of the upper panel pair at the juncture area, one panel of each of the upper panel pair and the lower panel pair having an upstanding male side lap portion forming a male apex. The other panel of each of the upper panels and the lower panels have an upstanding female sidelap portion overlapping the respective male sidelap portions, each of the female sidelap portions having a longitudinally disposed sealant cavity and a sidelap sealant strip that is predeterminedly disposed within the sealant cavity with the sealant strip veering at the juncture area. The upstanding leg portions of the male sidelap portions are received within the insertion cavity of one of the female sidelap portions. An endlap sealant is positioned between the overlapping lower ends of the upper panels and the upper ends of the lower panels, the endlap sealant disposed to extend upwardly to sealingly engage the sidelap sealant strip in the female sidelap portion. A cinch strap and backup plate are provided.

16 Claims, 28 Drawing Sheets

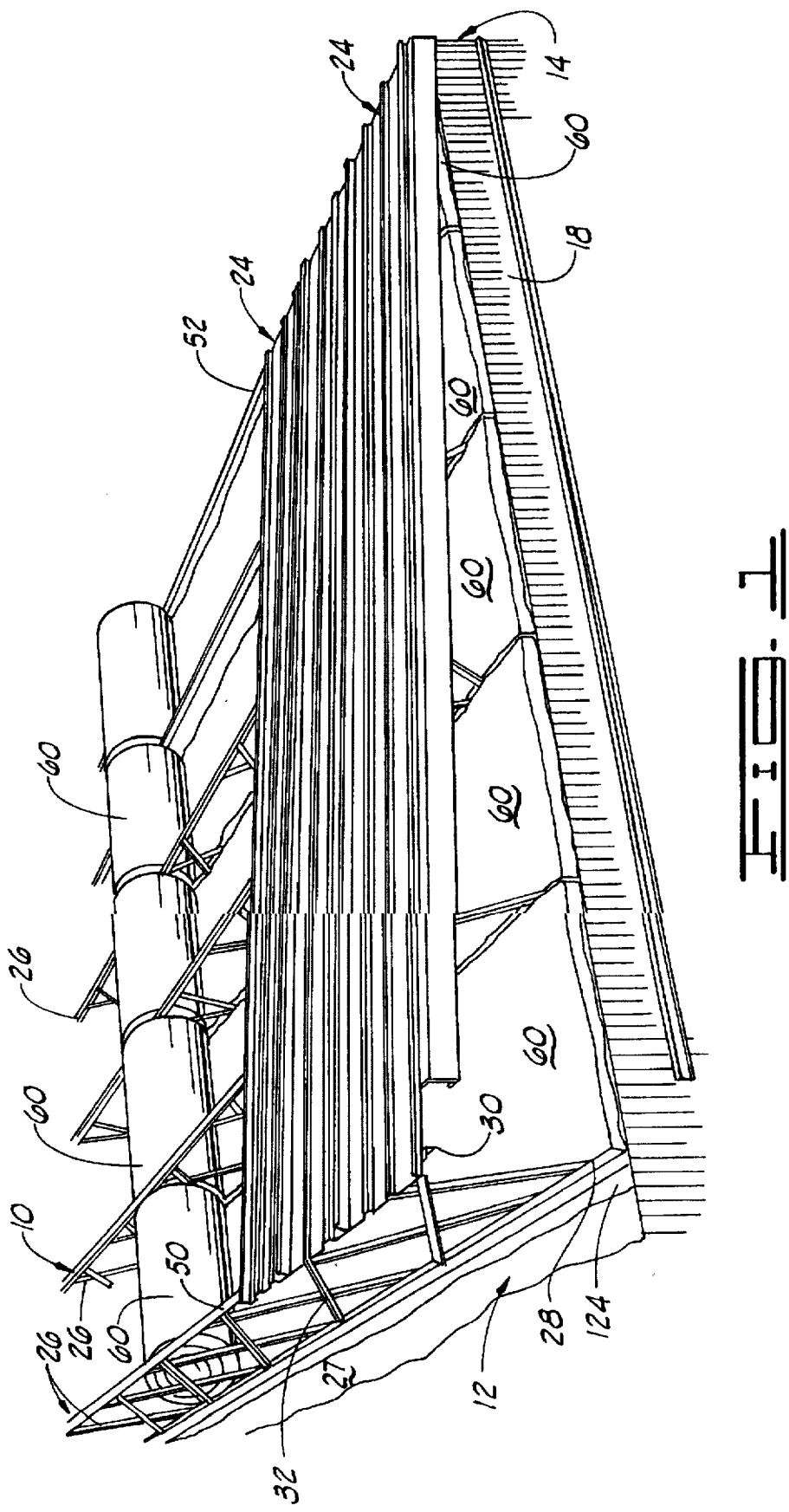

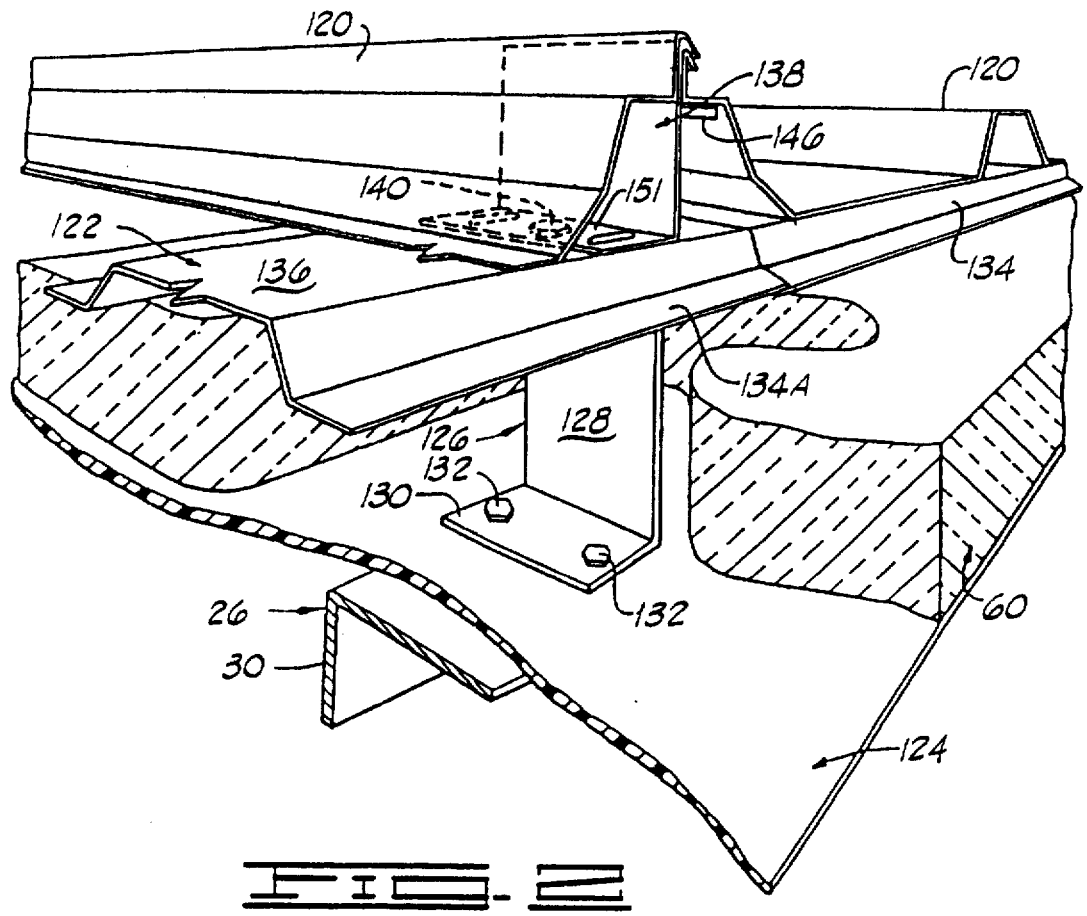
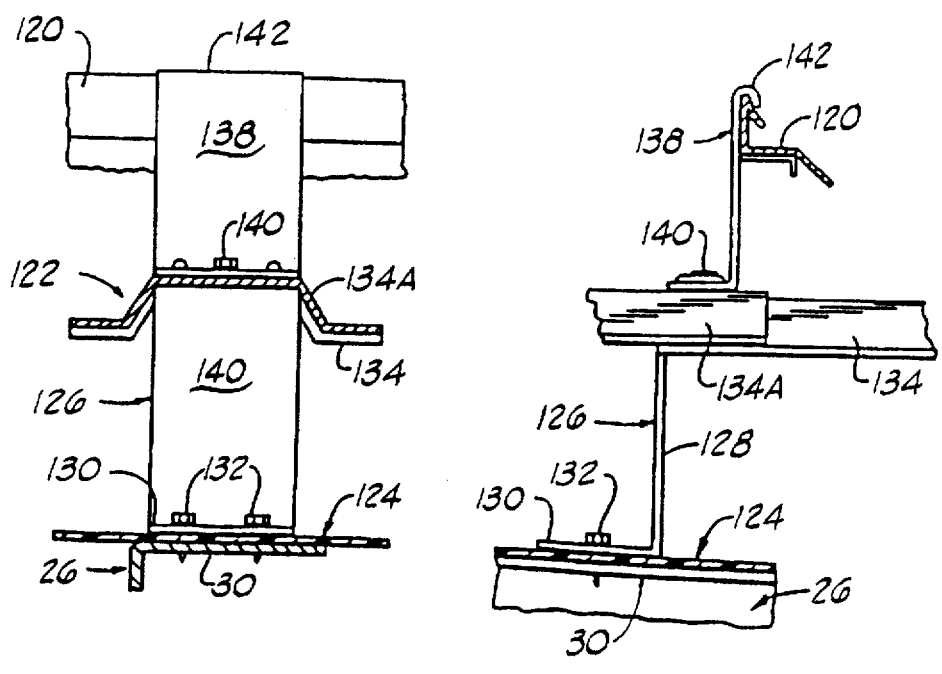

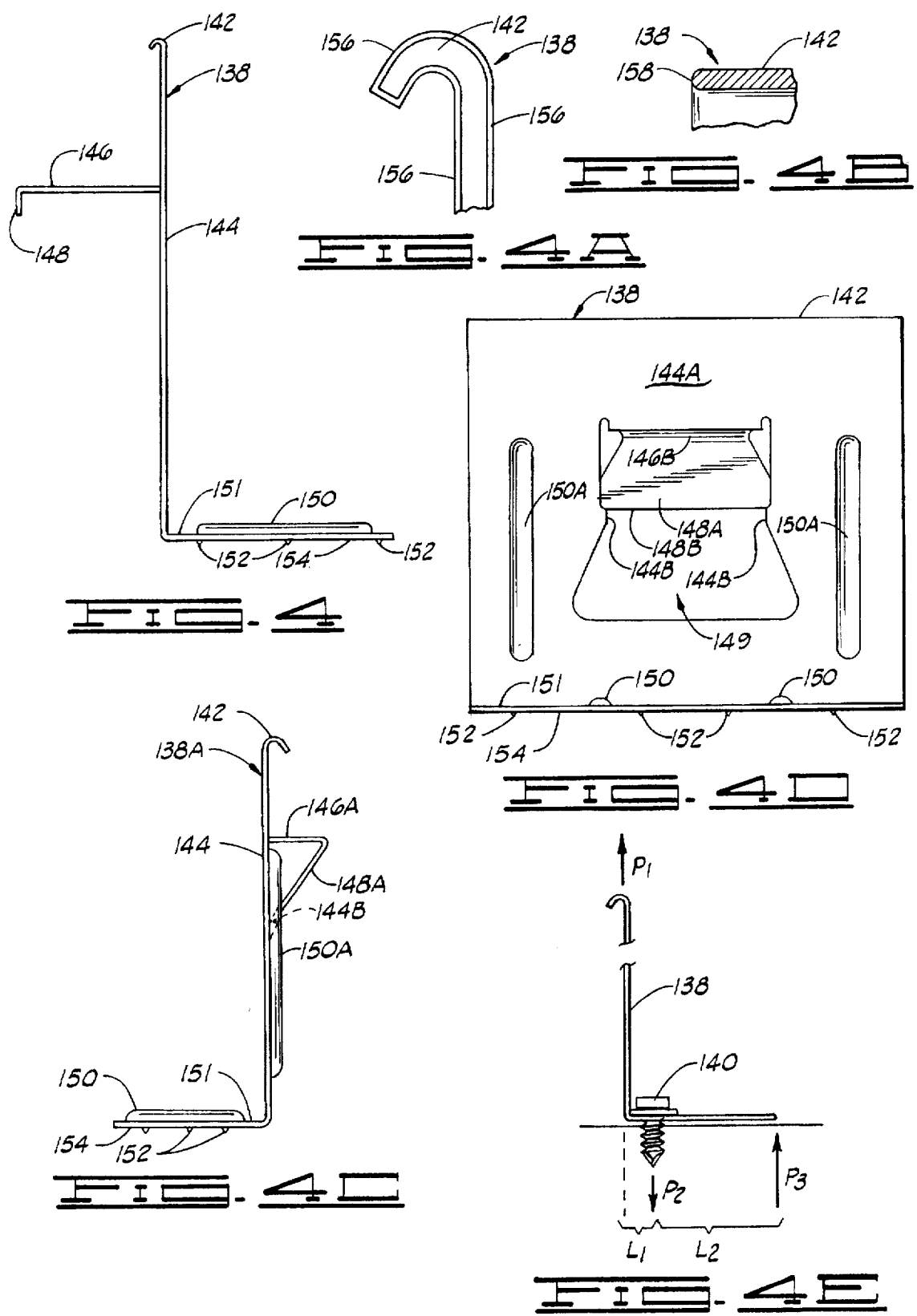

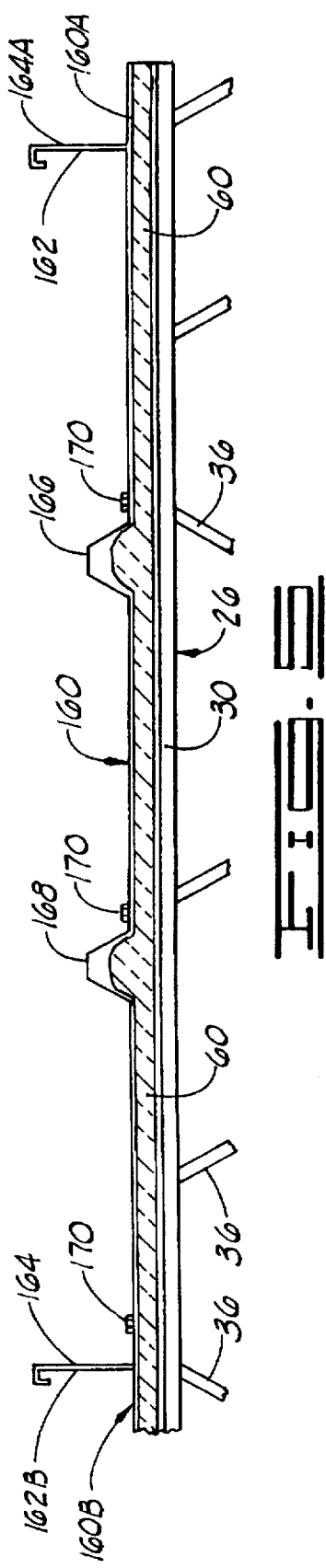
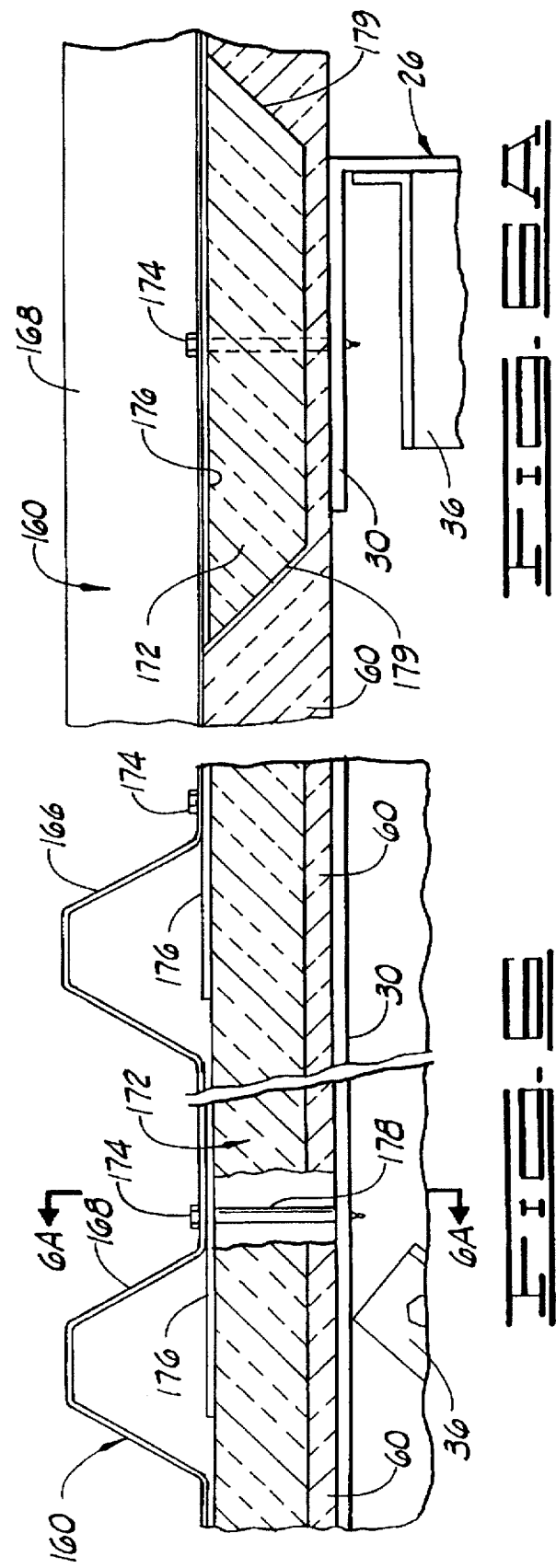

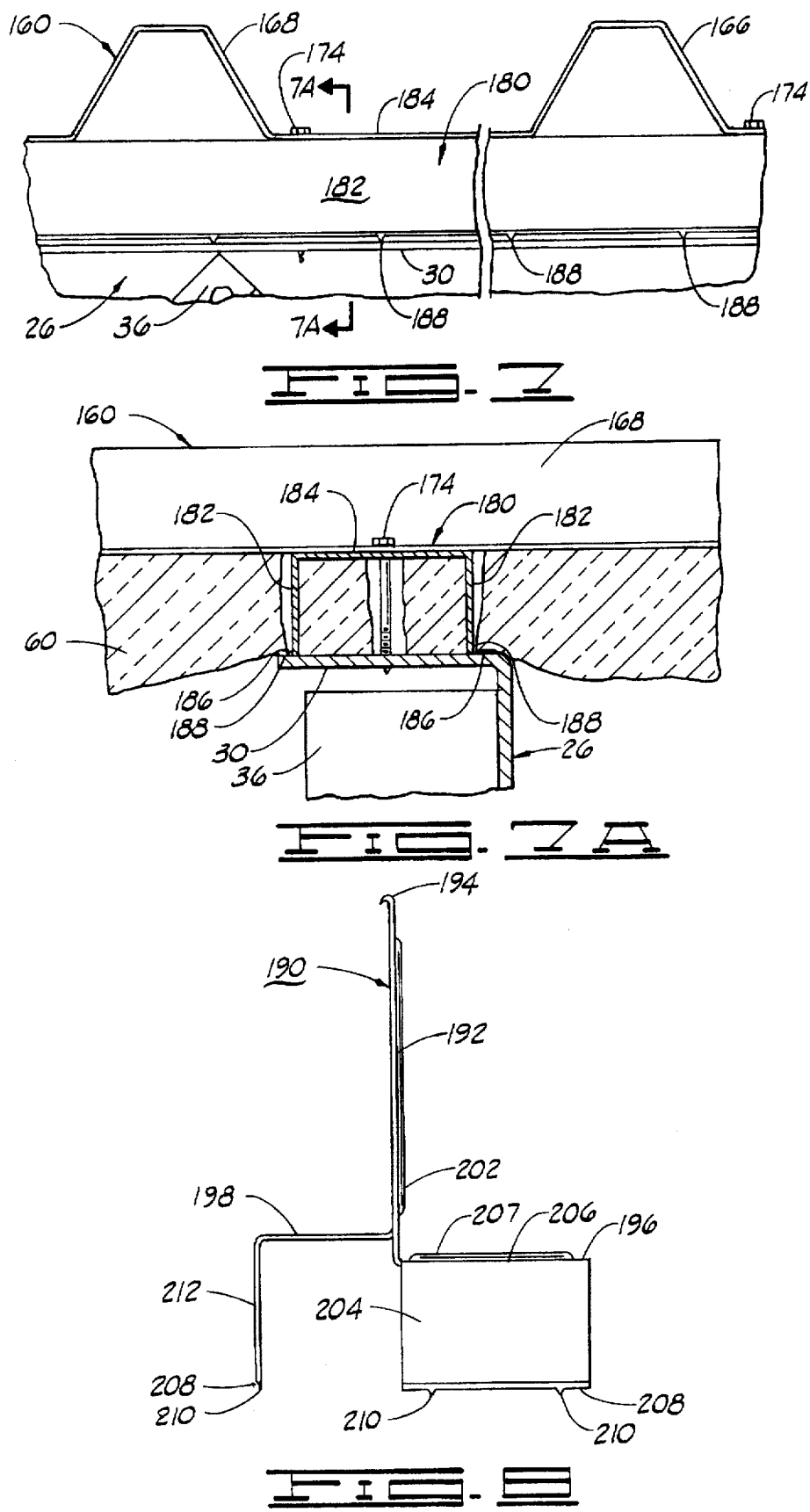

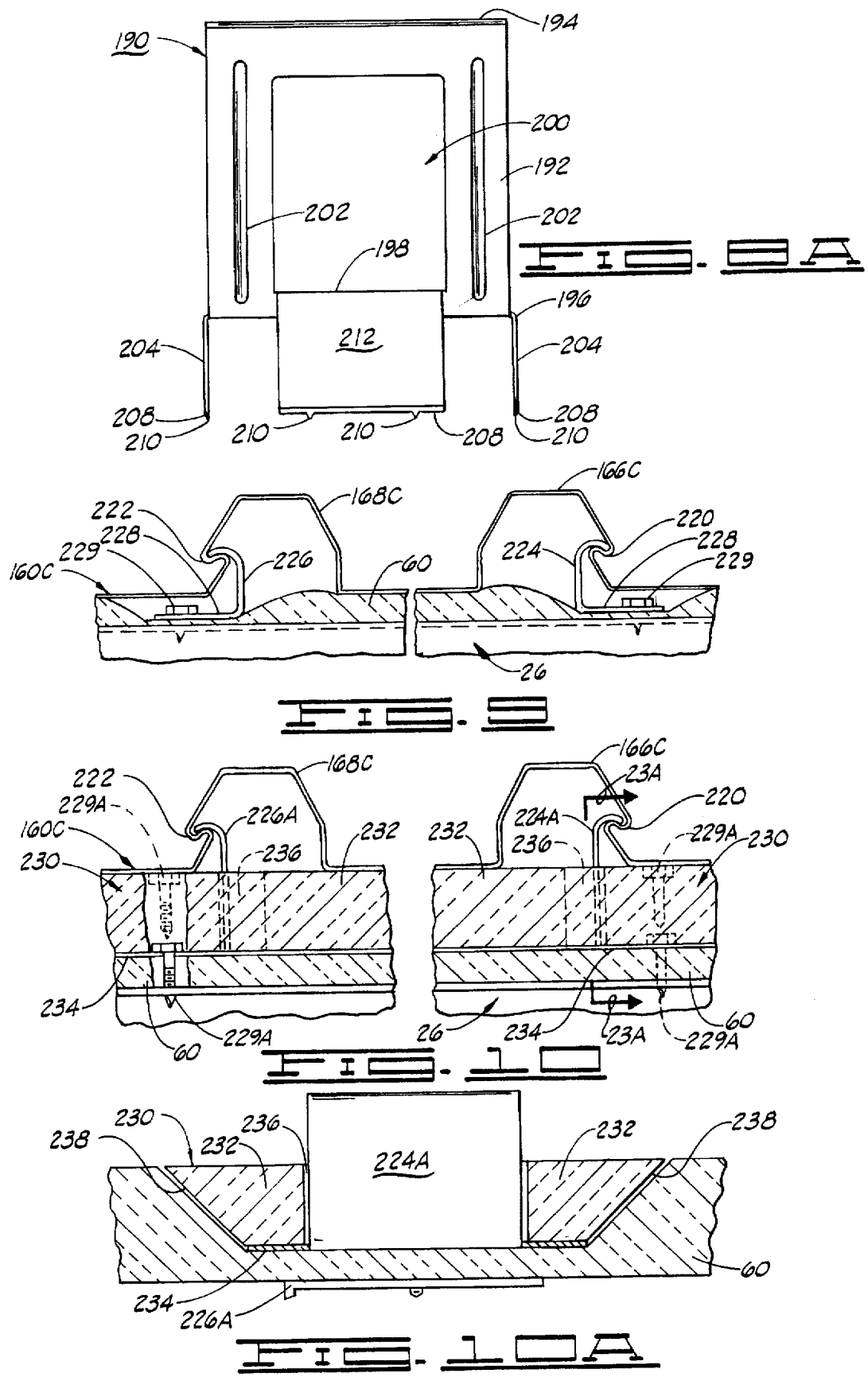

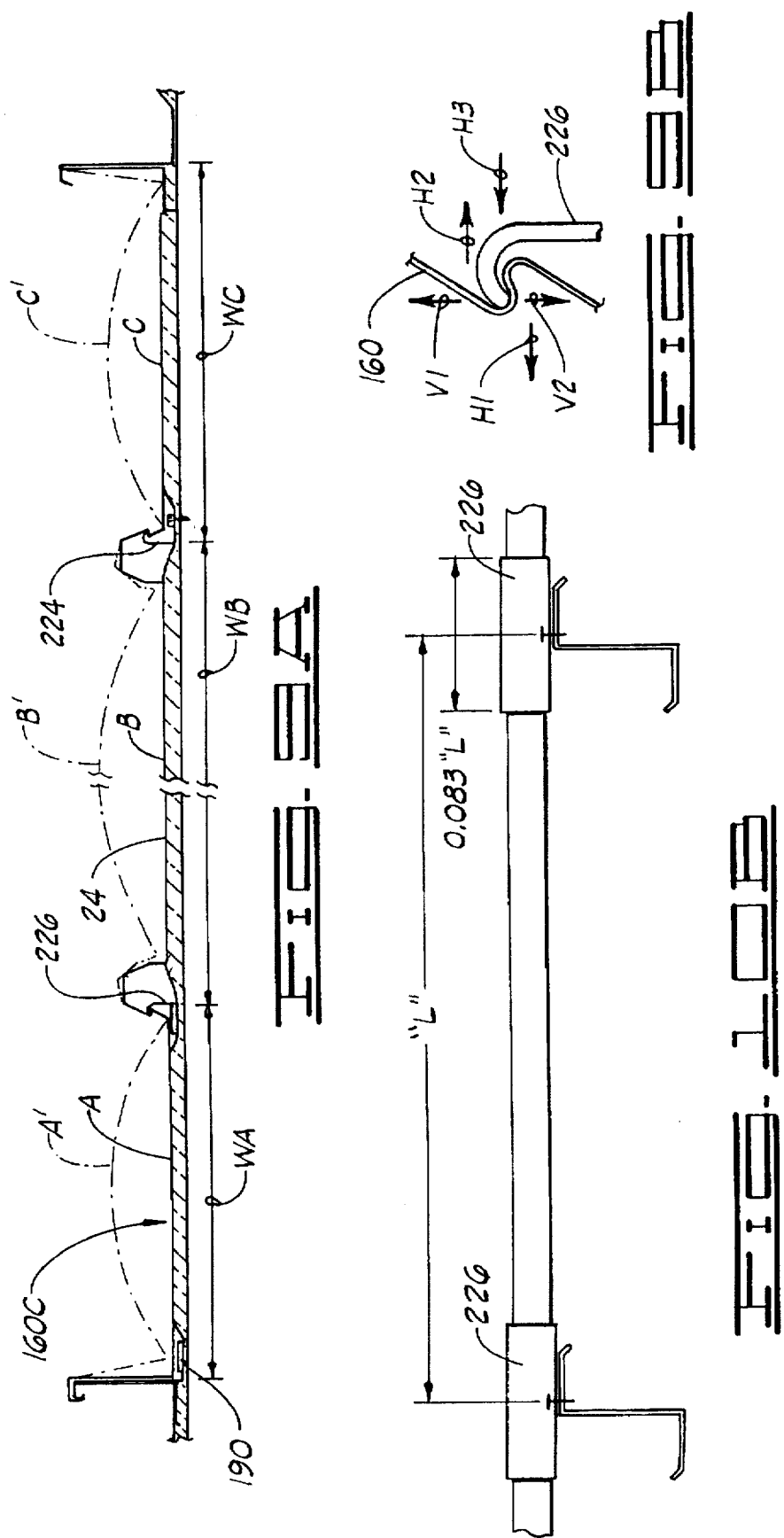

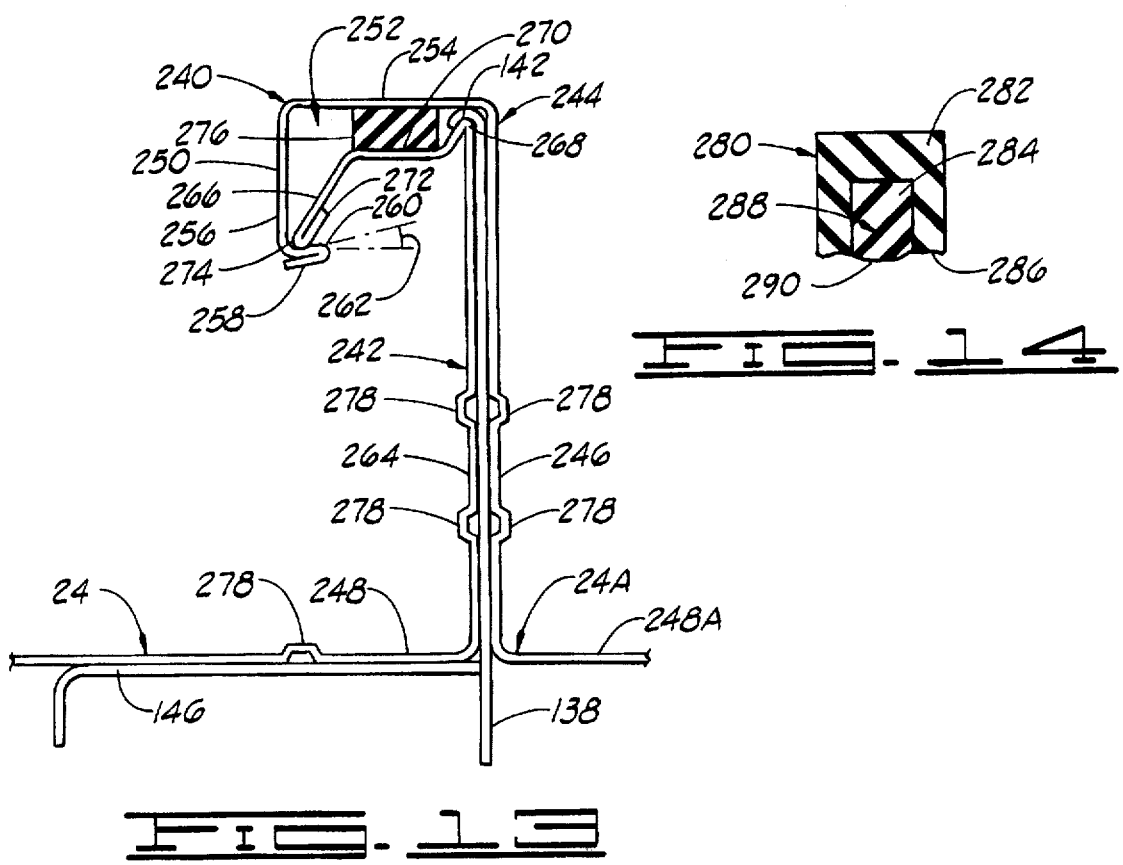
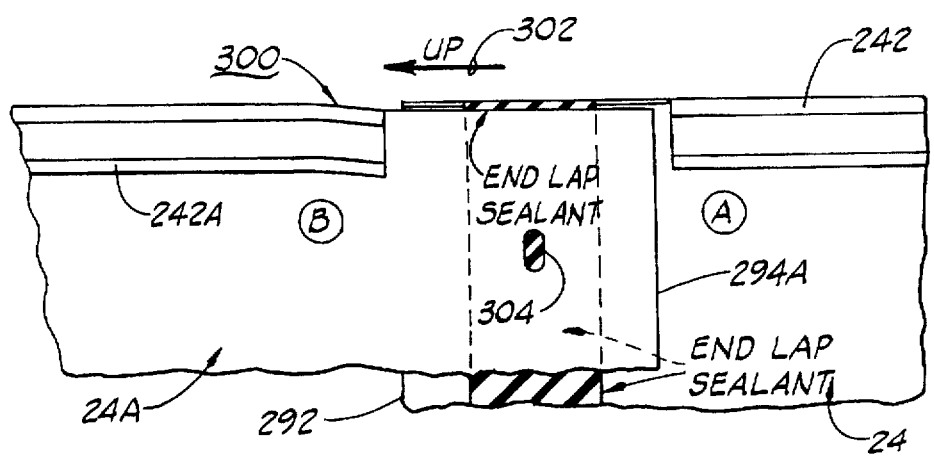

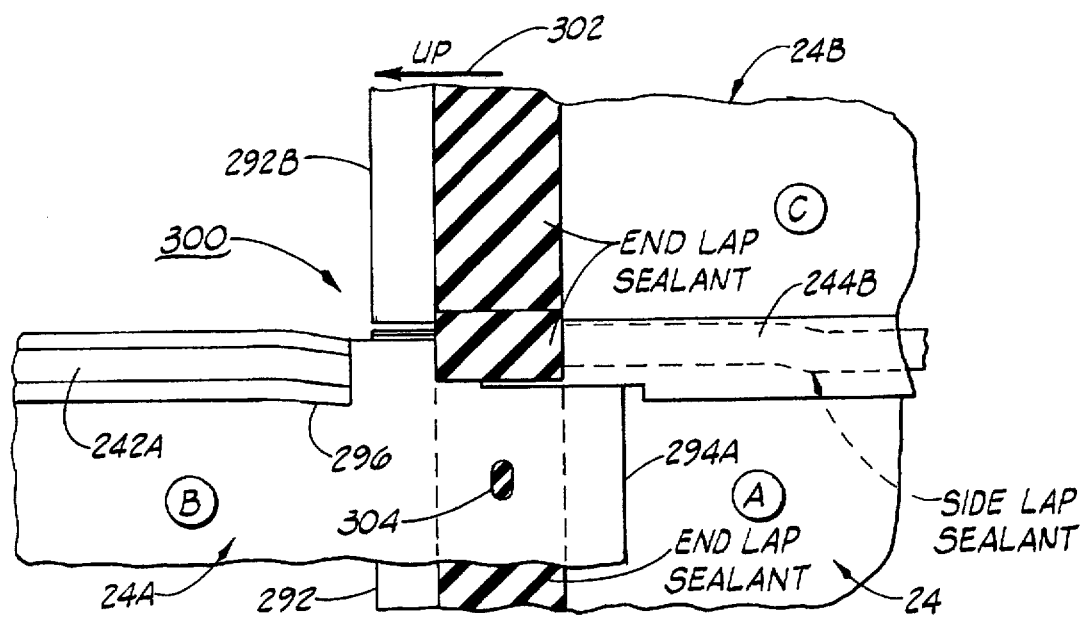
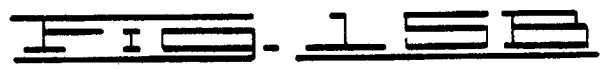
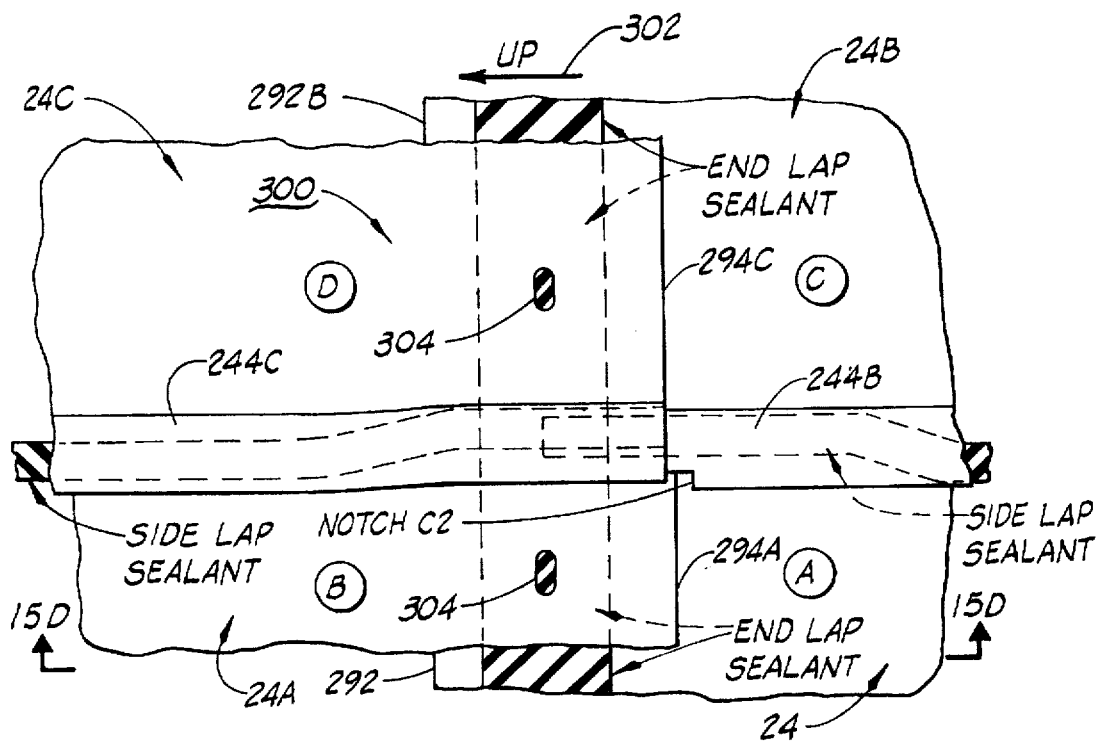
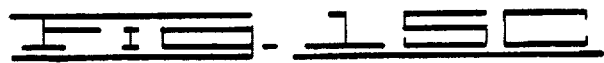

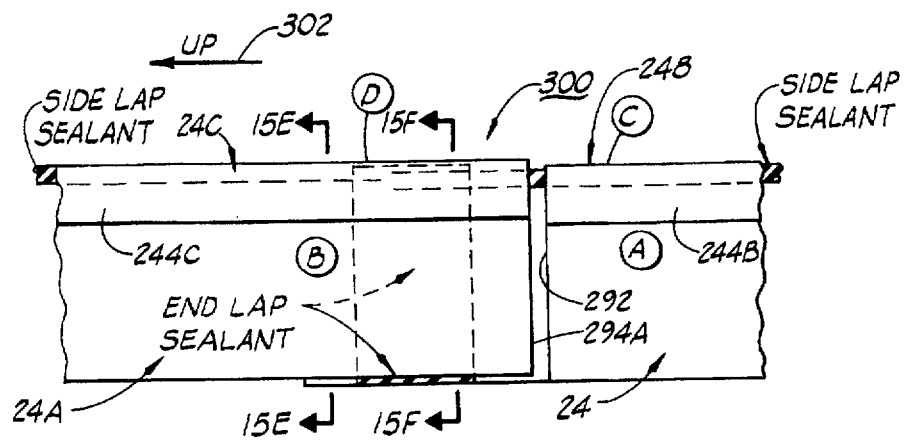
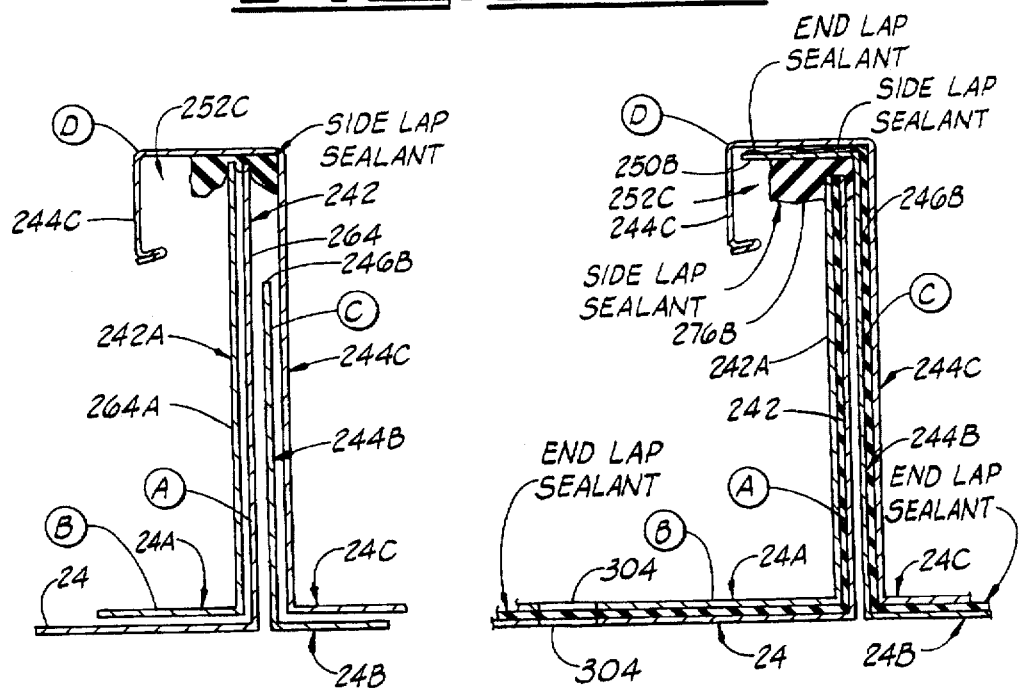

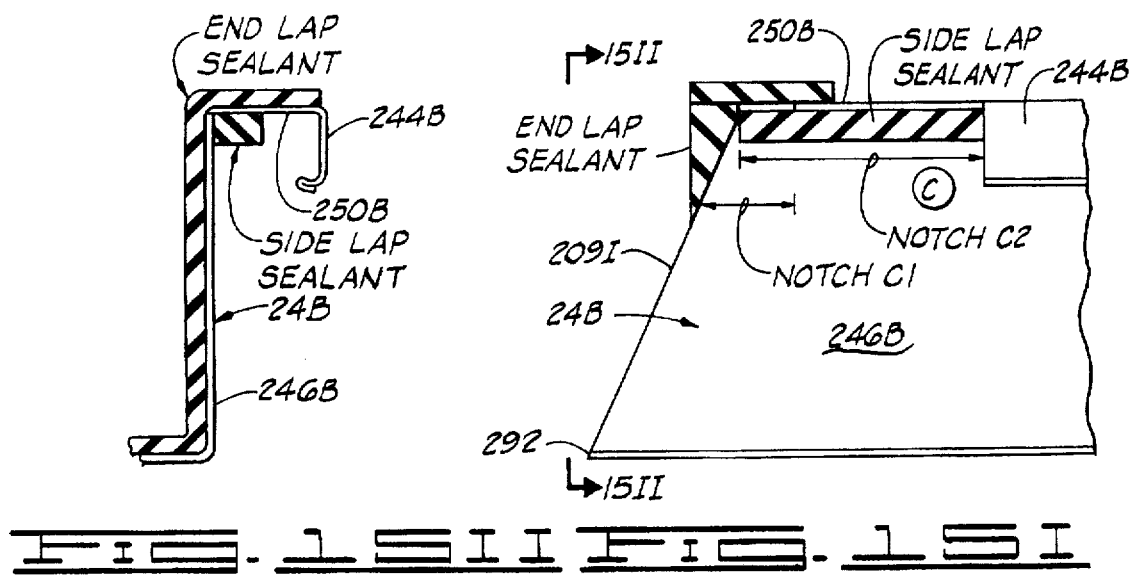
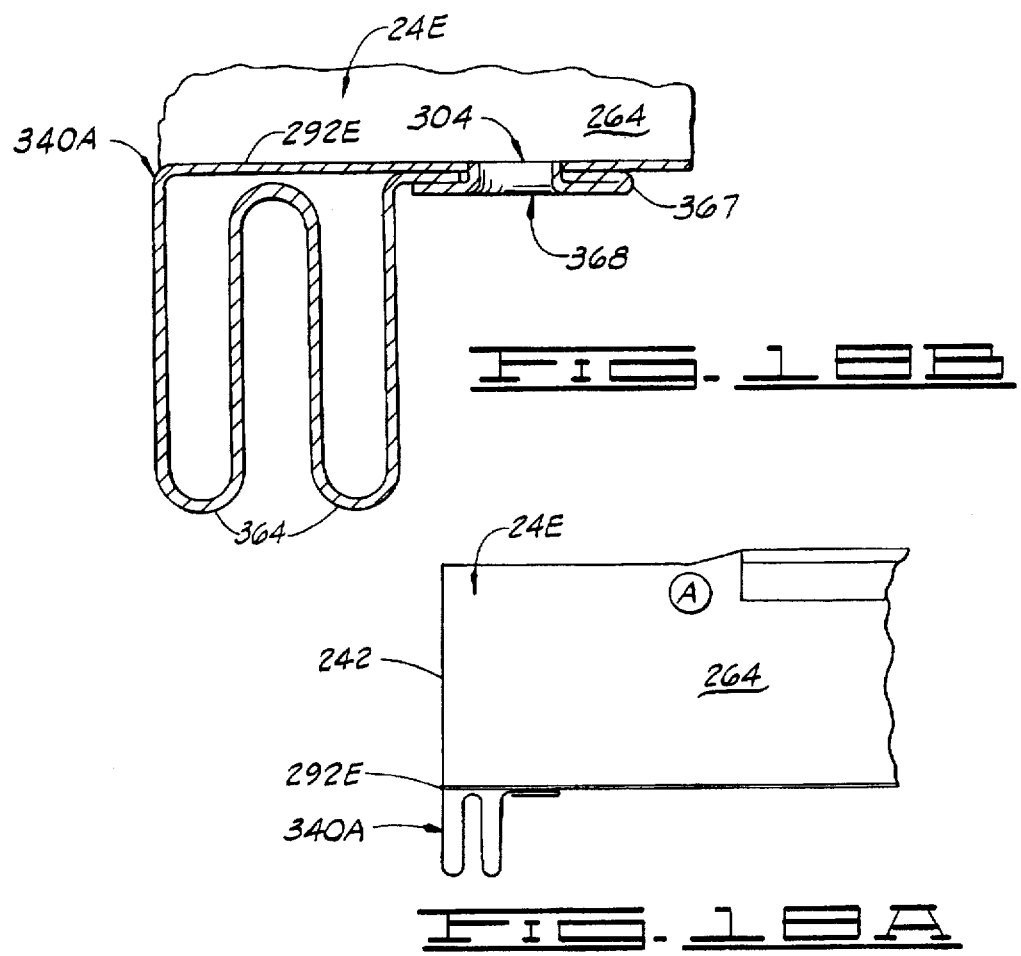

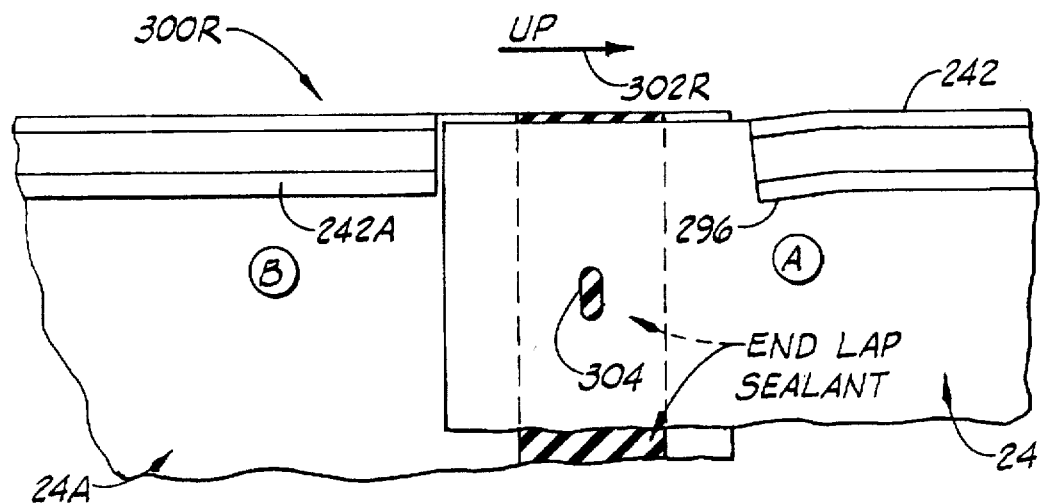
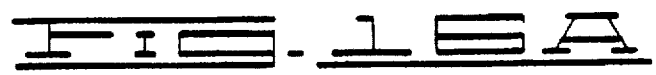
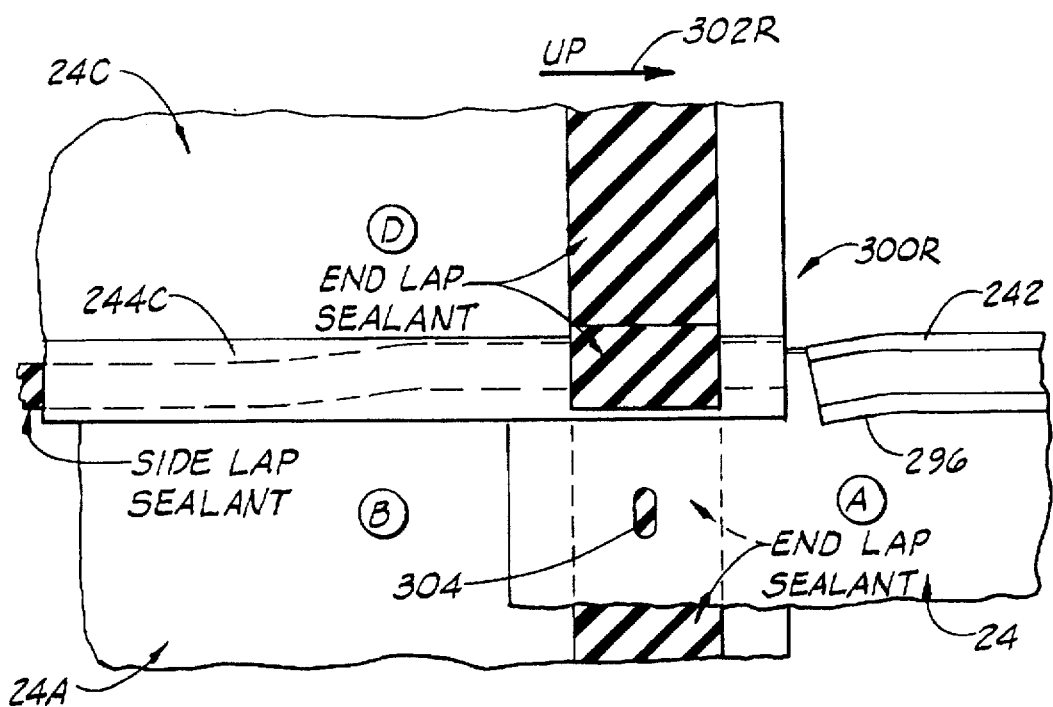
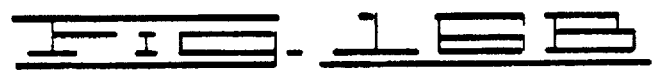

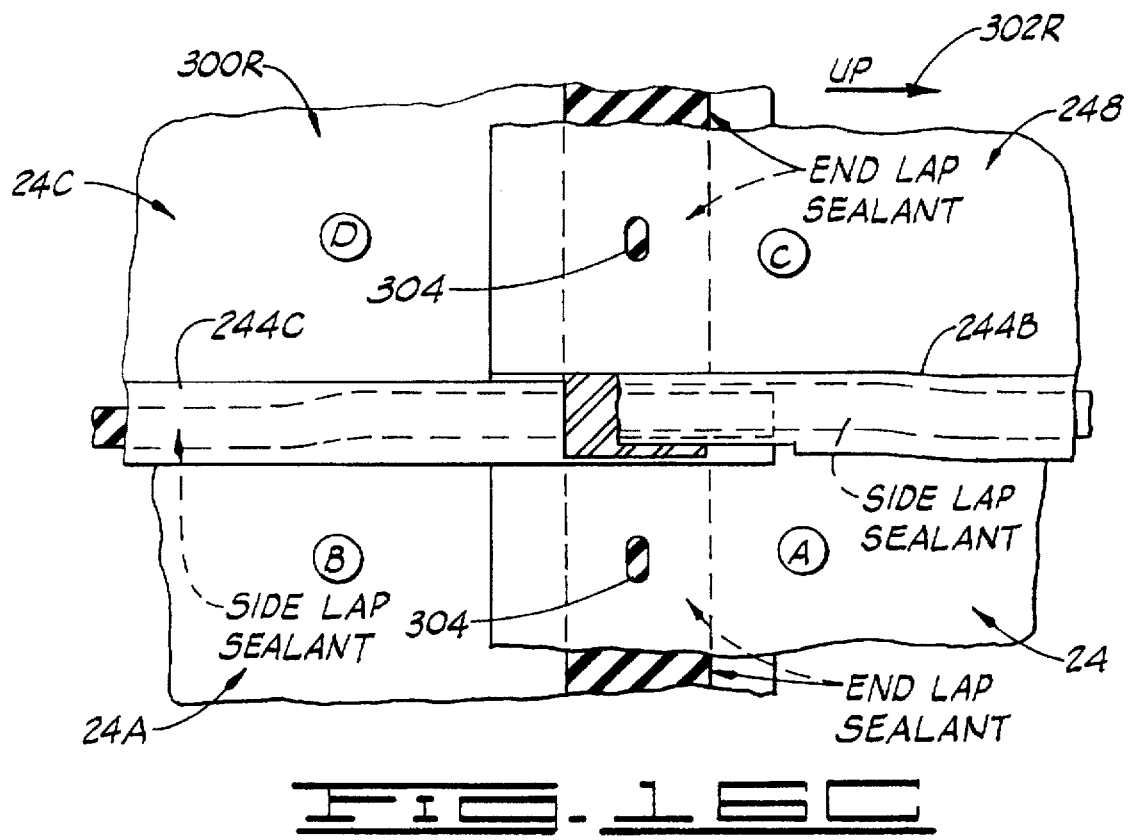
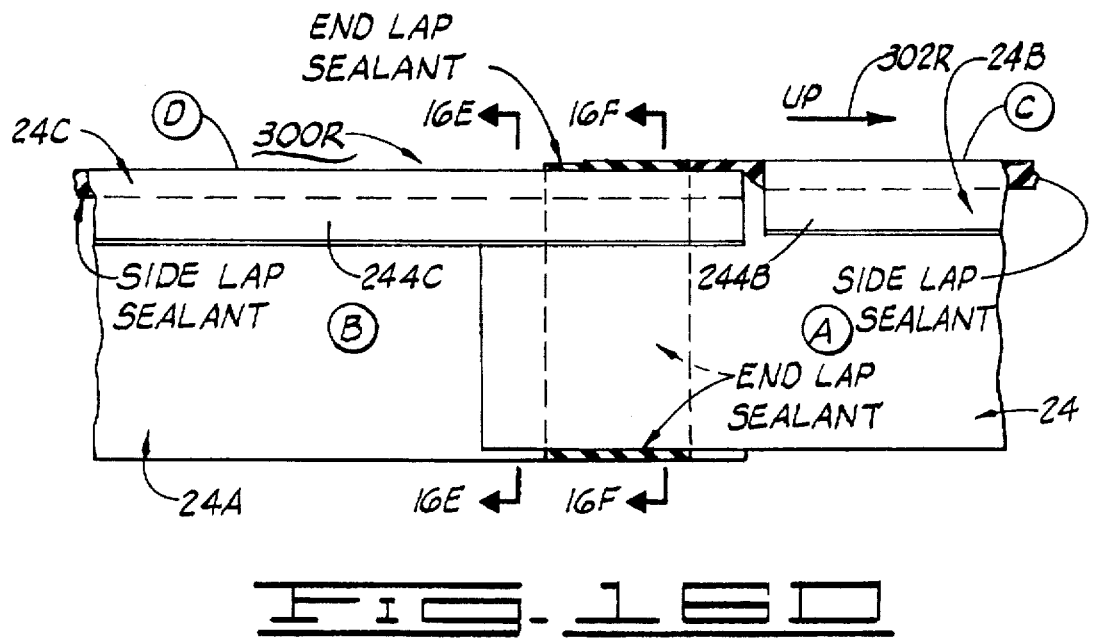

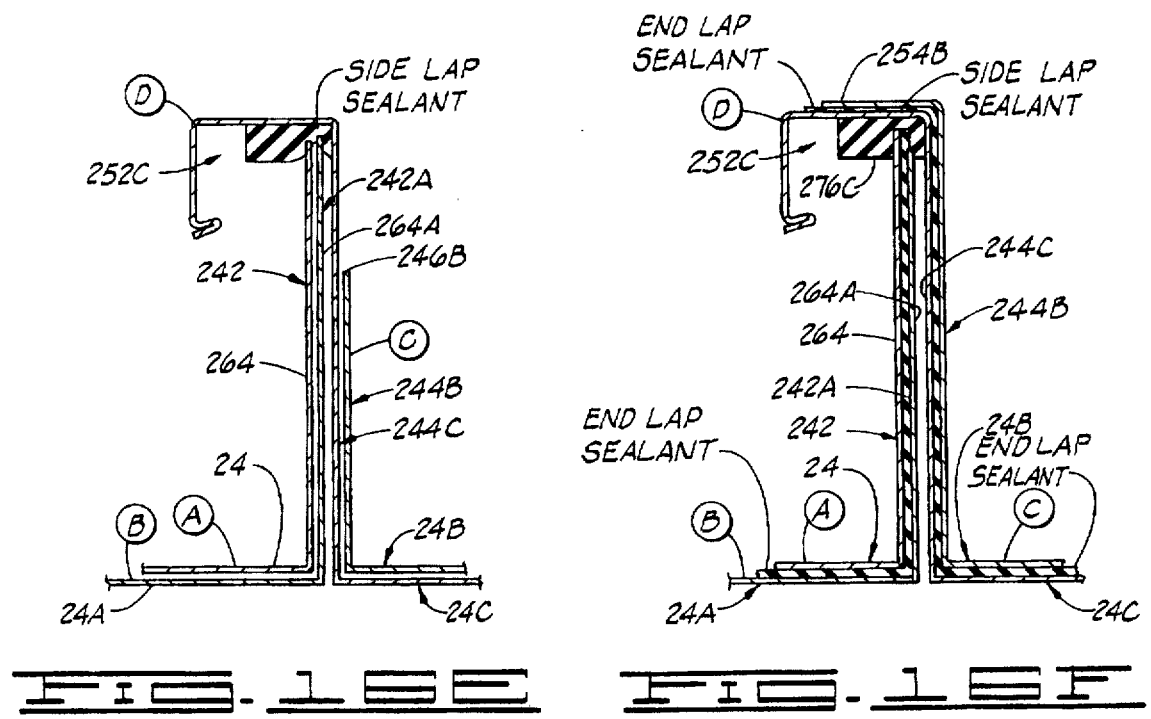
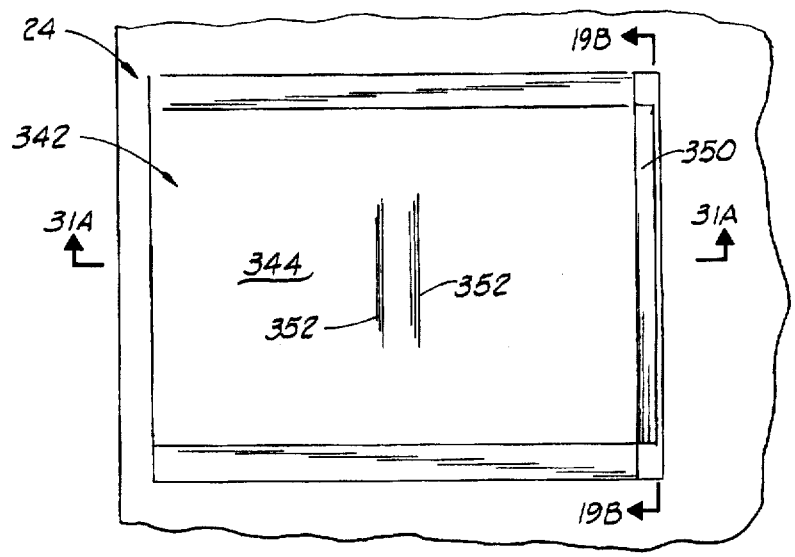

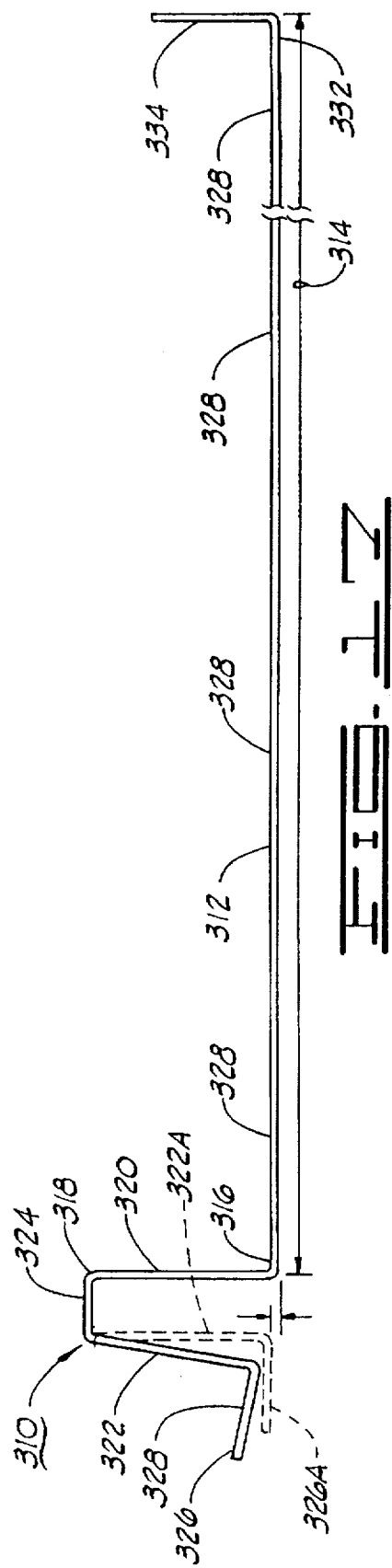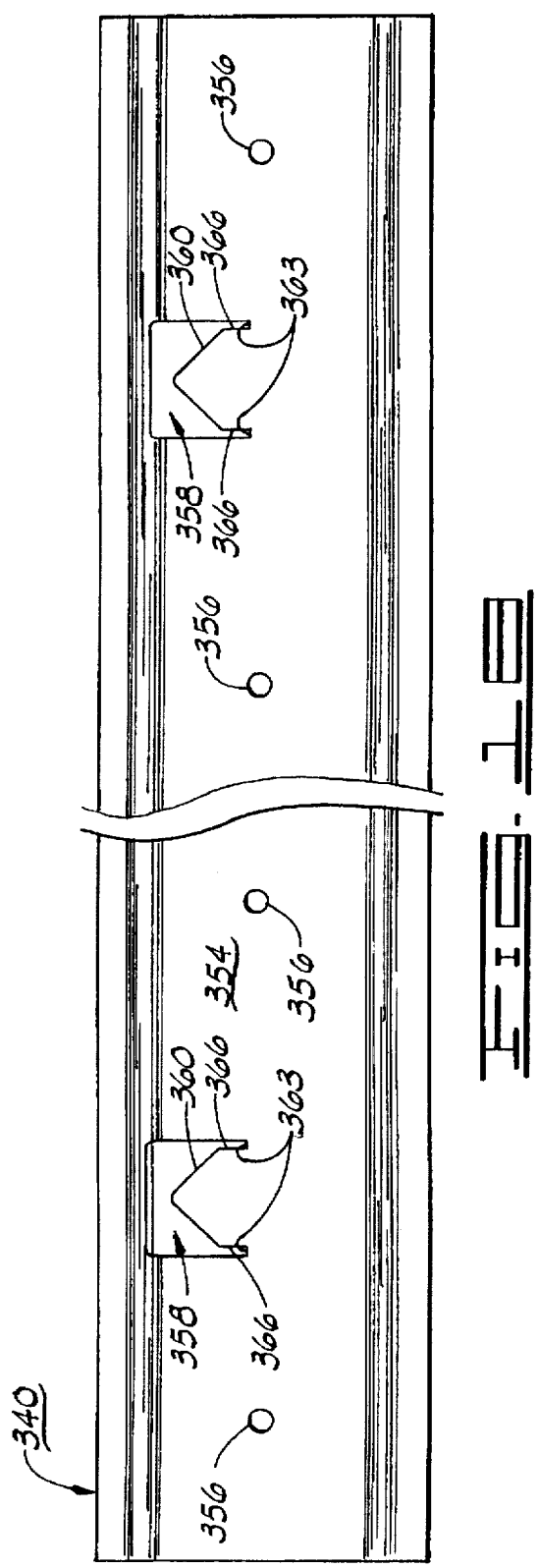

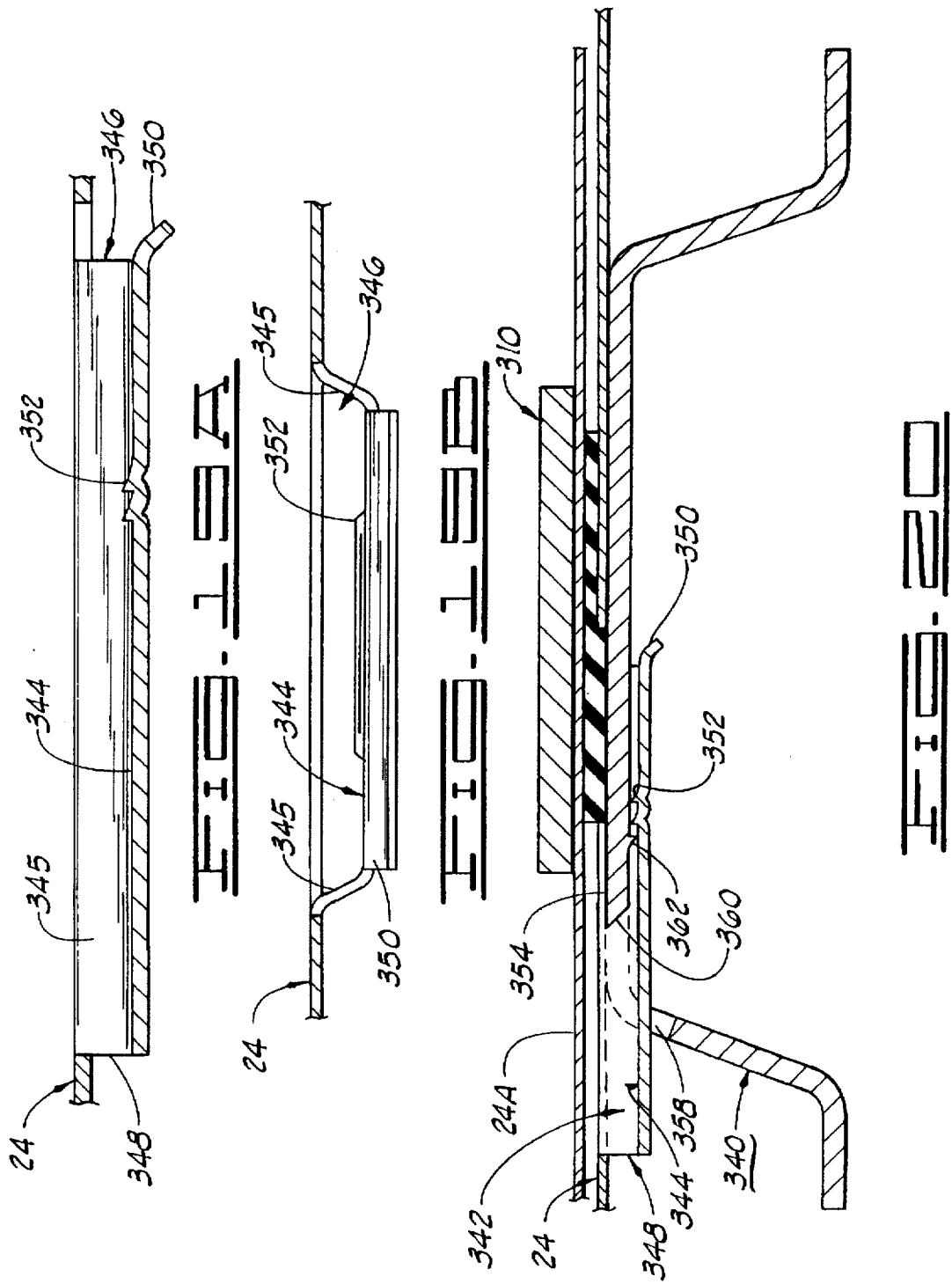

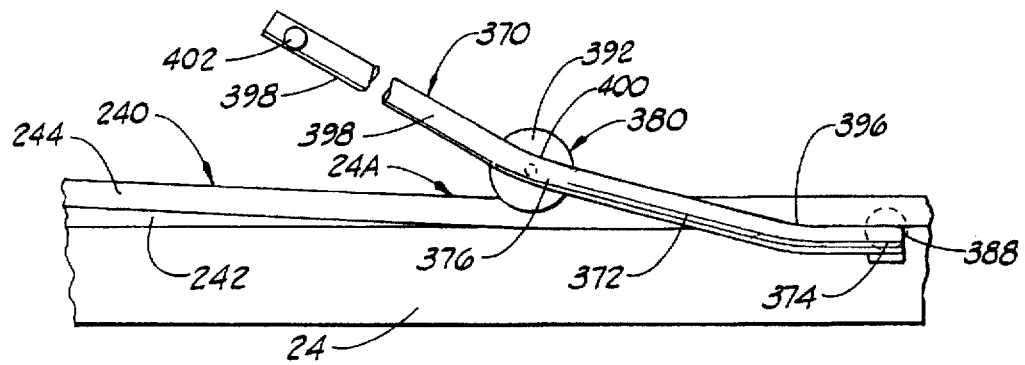
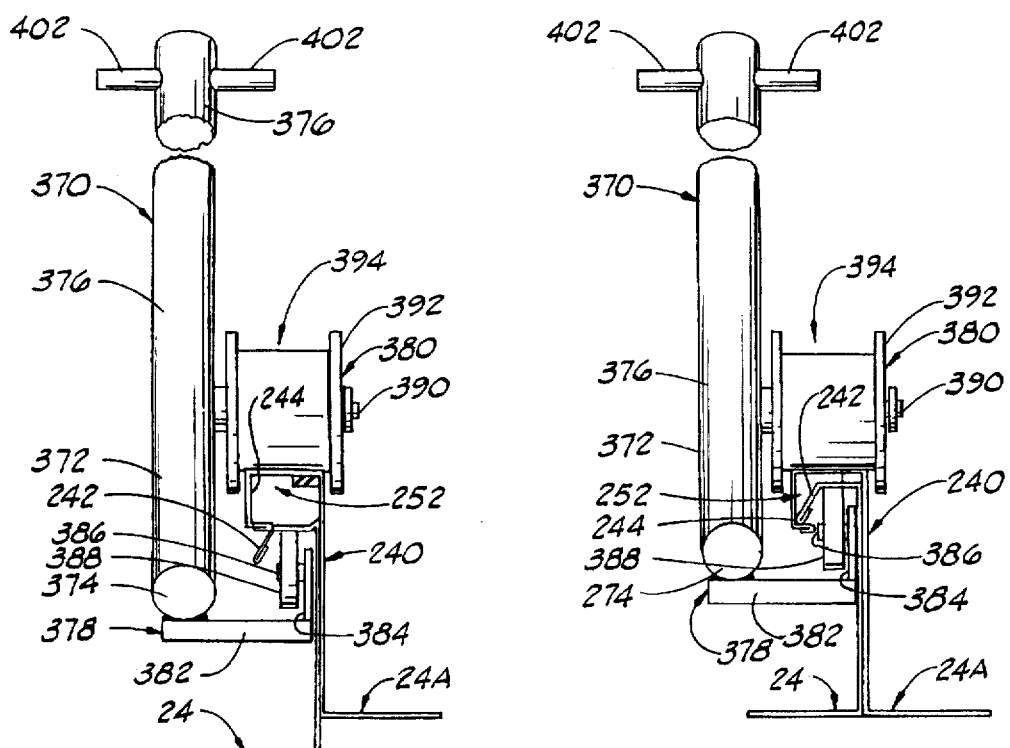

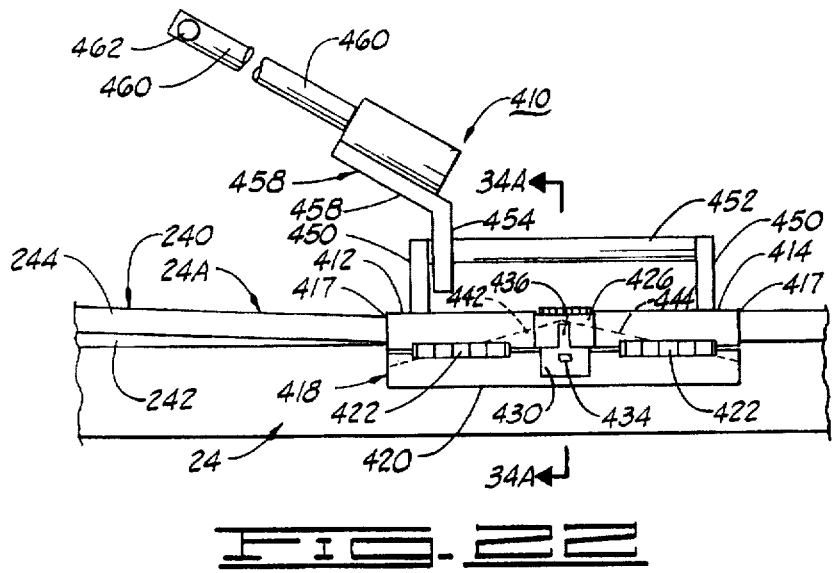
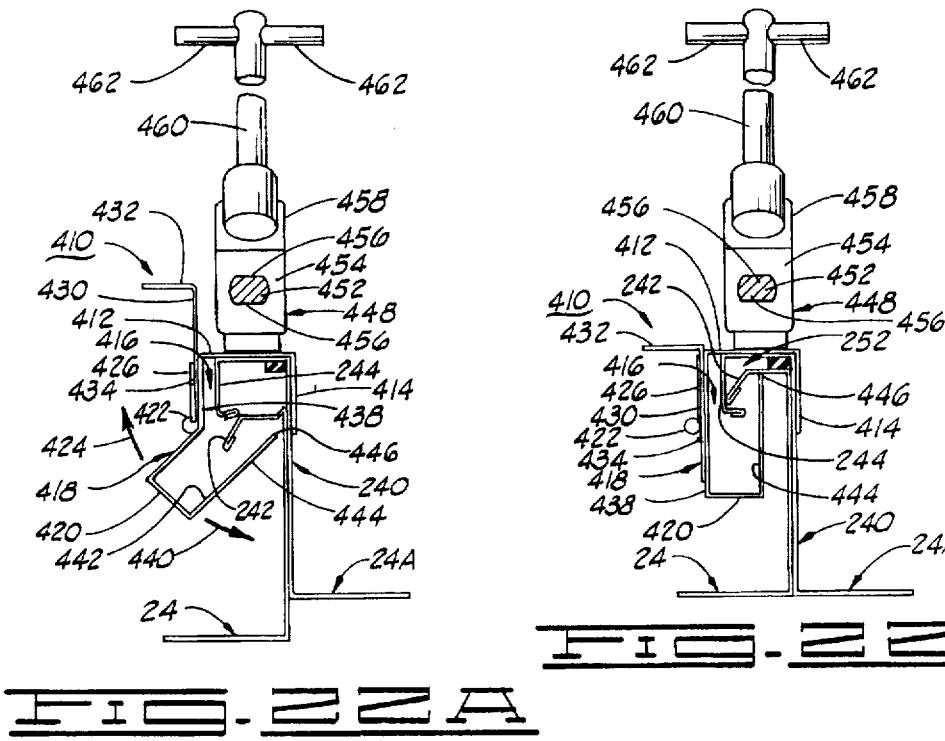
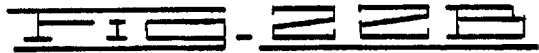

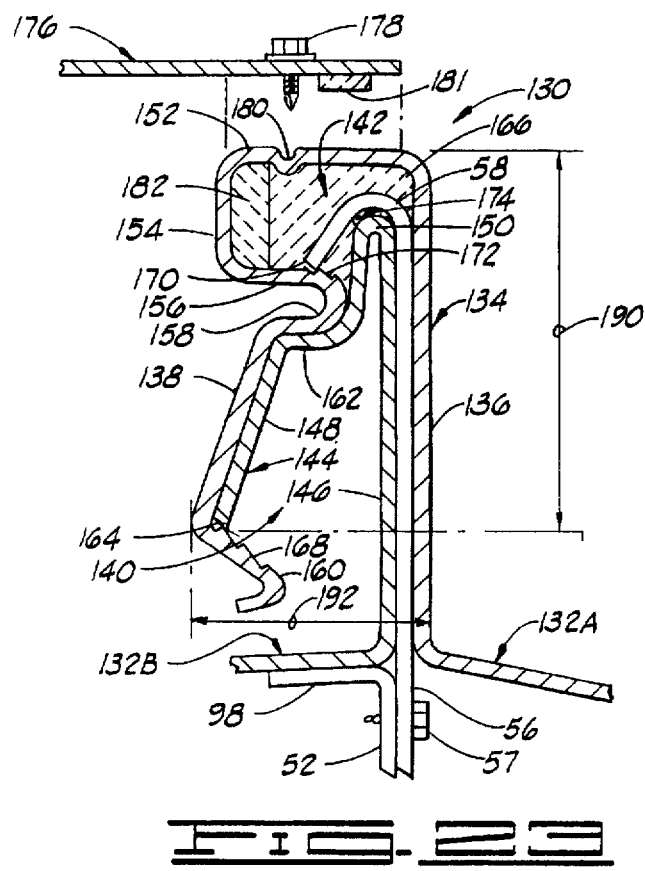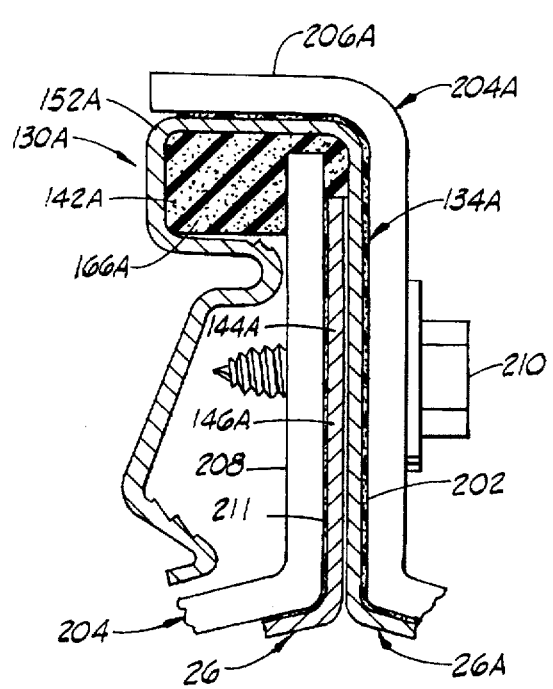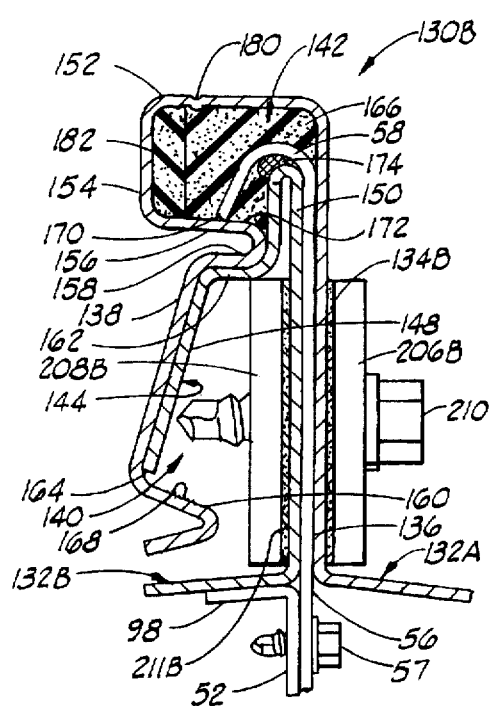

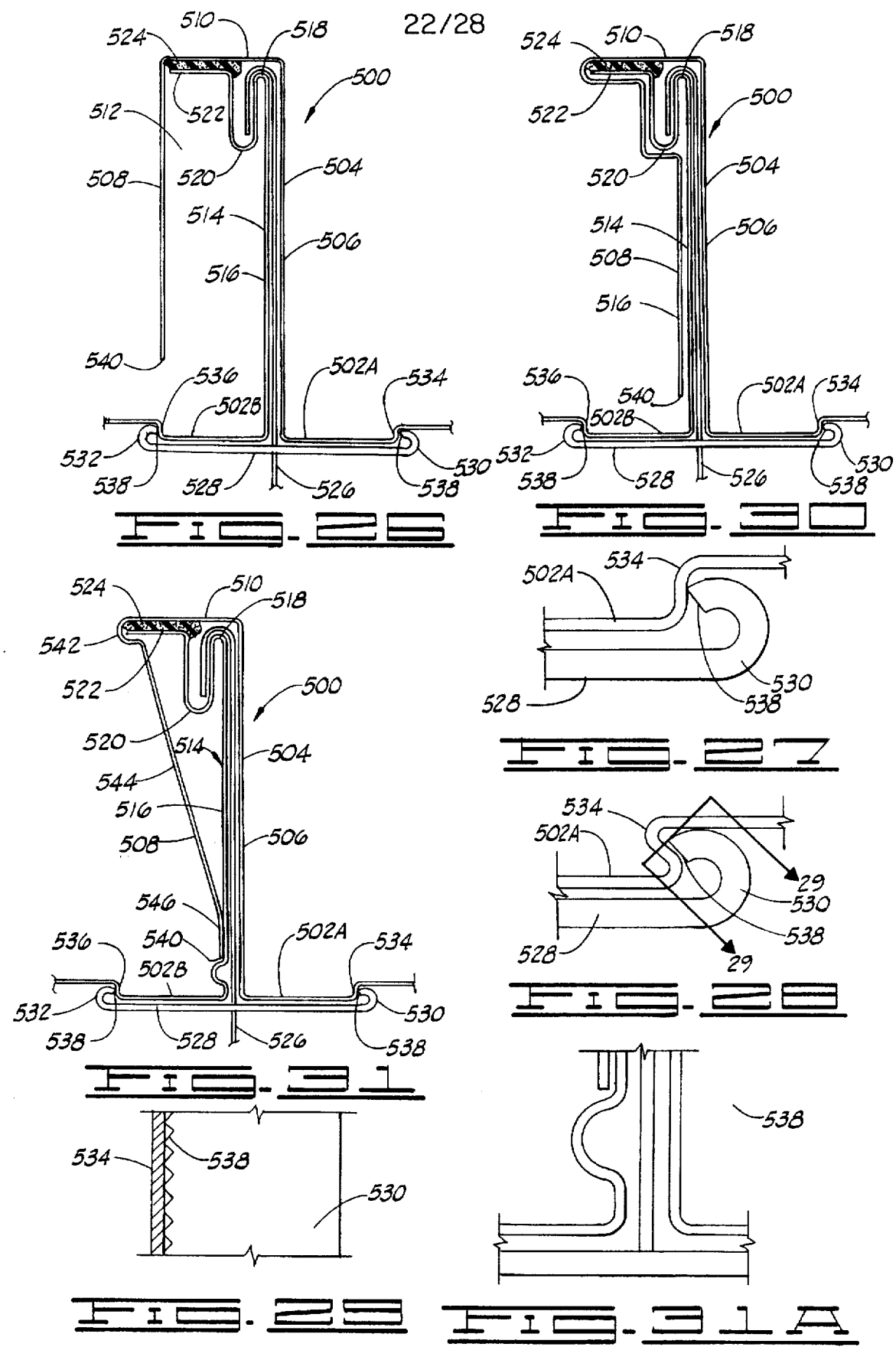

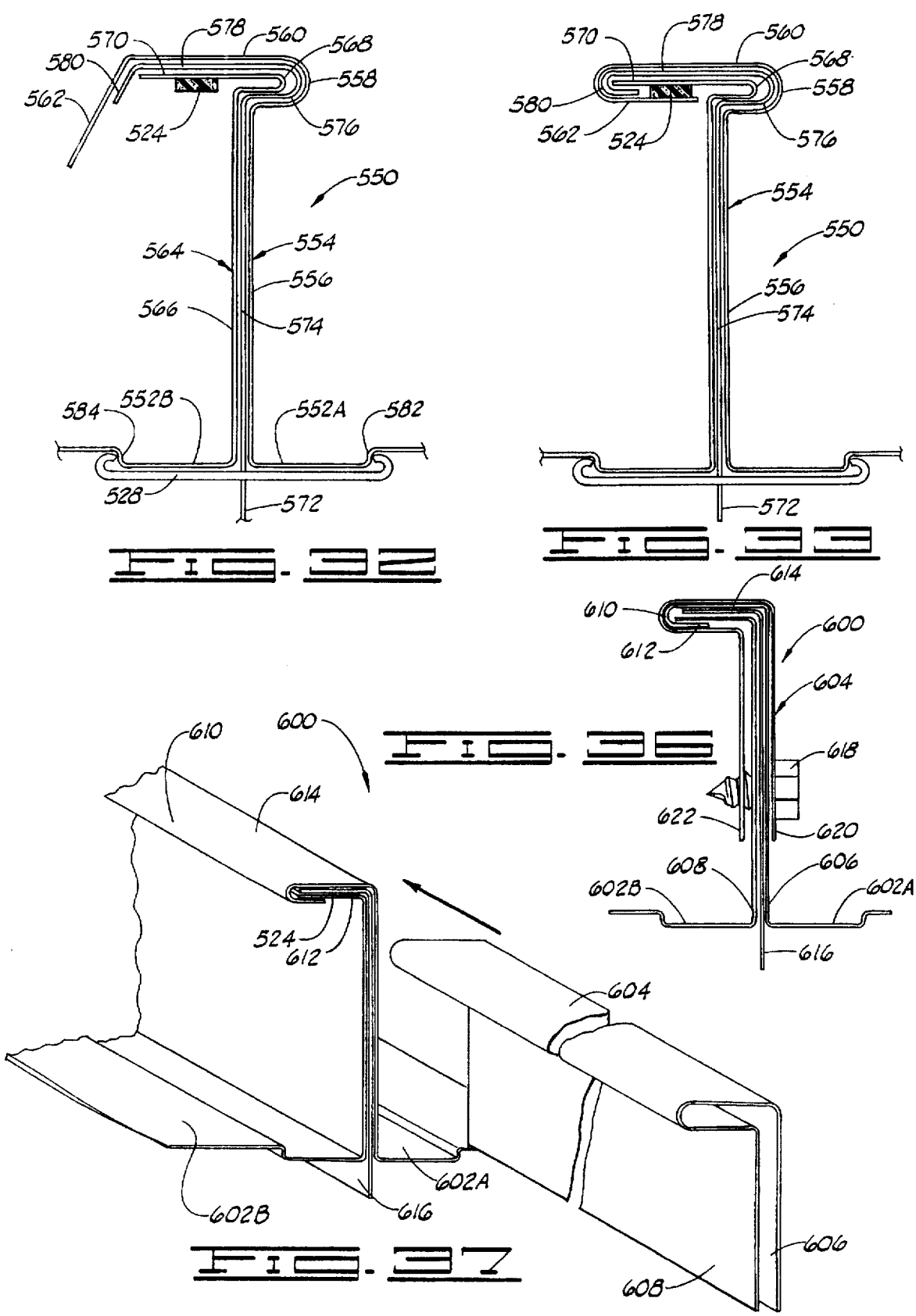

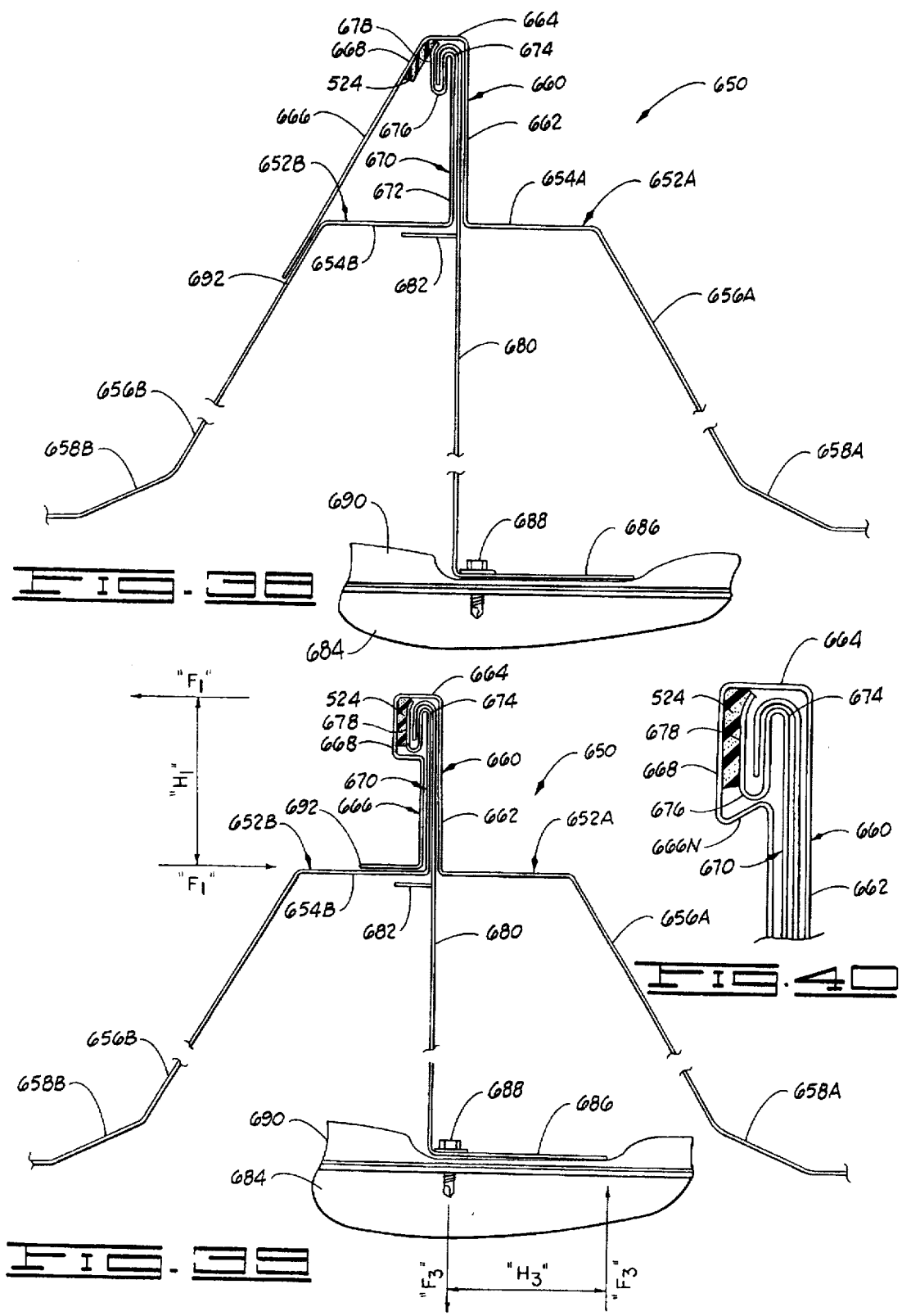

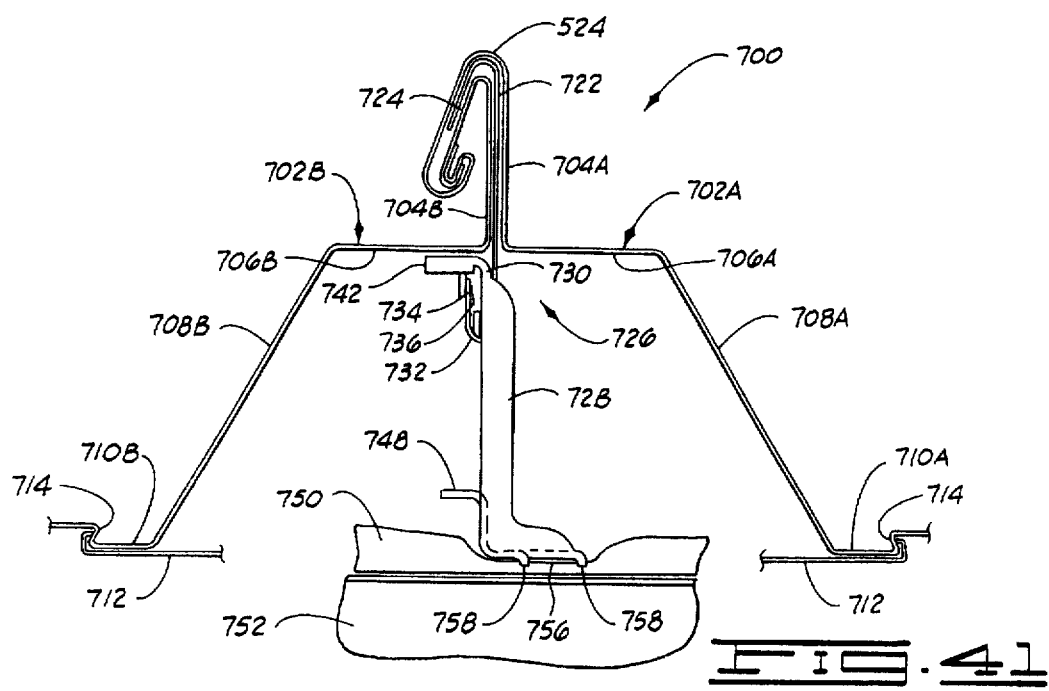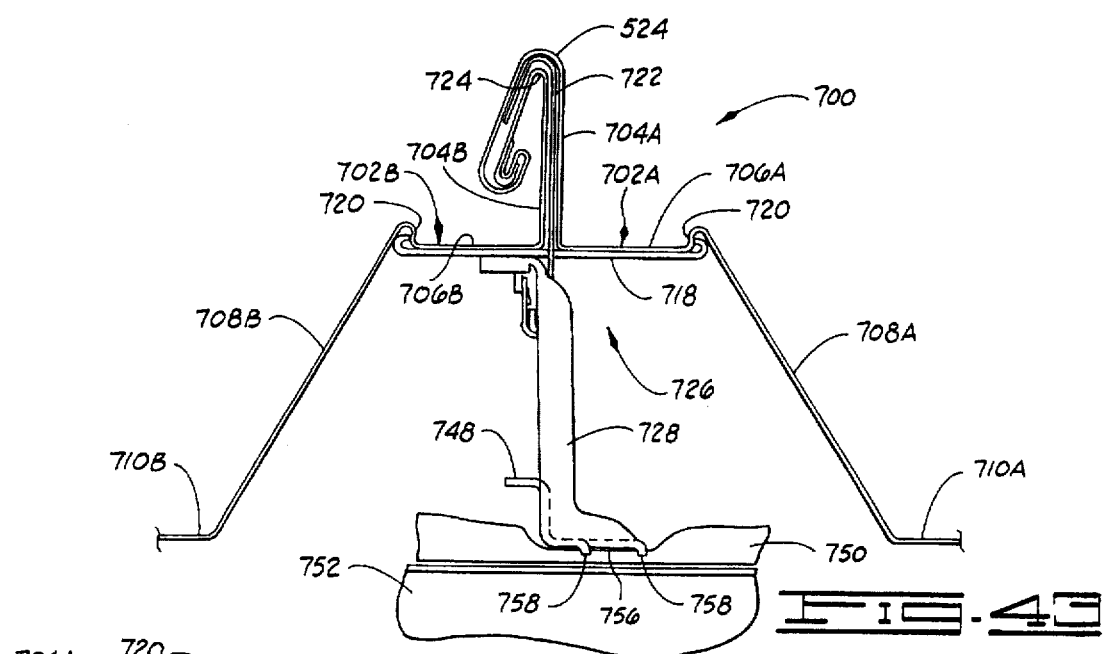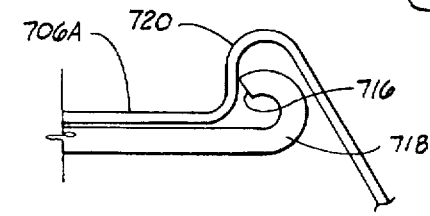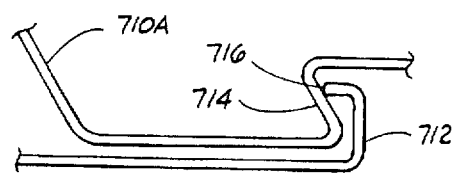

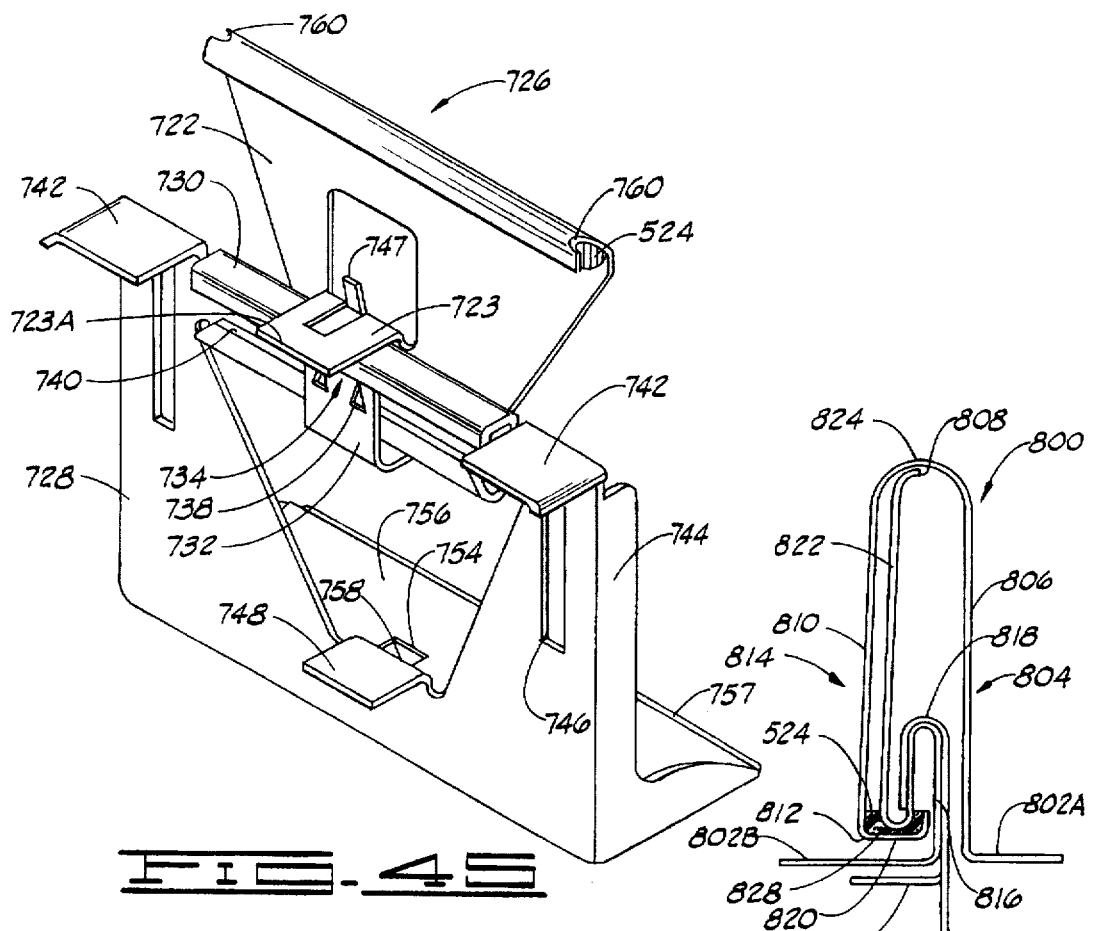
FIG. 45
FIG. 46
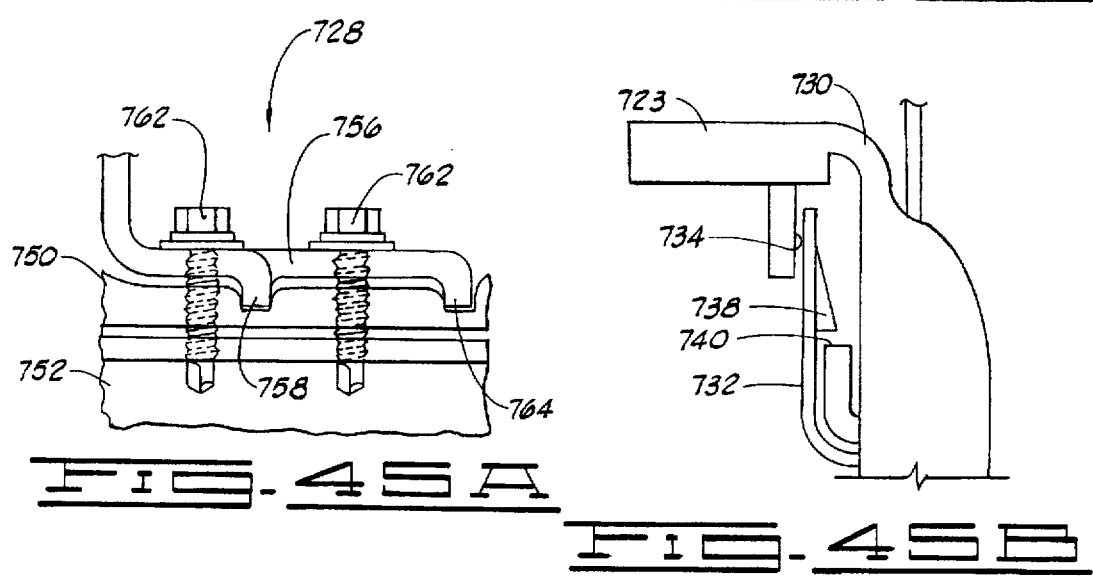
FIG. 45A
FIG. 45B

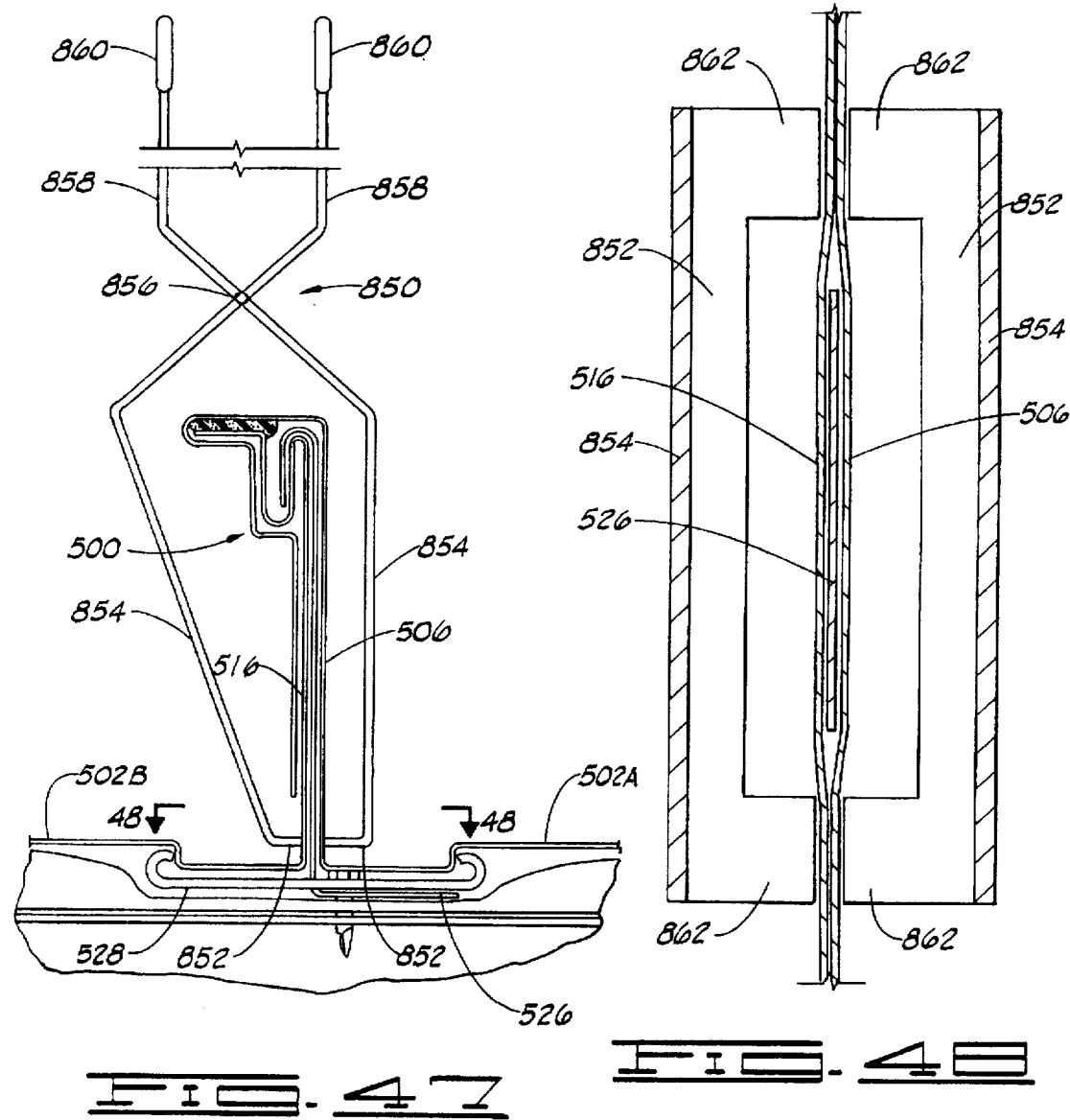

ROOF PANELS WITH STIFFENED ENDLAPS

CROSS REFERENCE TO RELATED APPLICATIONS

The present application is a continuation-in-part of the following United States patent applications and incorporates by reference each of the applications:

FREE ROOF ASSEMBLY, Ser. No. 185,480, filed Jan. 21, 1994, now pending, and

FREE ROOF ASSEMBLY FOR REROOFING A BUILDING STRUCTURE, Ser. No. 181,756, filed Jan. 21, 1994, now pending, which applications are continuations of the following:

STANDING SEAM ROOF ASSEMBLY AND SUPPORT APPARATUS, Ser. No. 846,278, filed Mar. 2, 1992, now U.S. Pat. No. 5,303,528, which is a Division of the following:

STANDING SEAM ROOF ASSEMBLY AND SUPPORT APPARATUS, Ser. No. 402,901, filed Sep. 1, 1989, now U.S. Pat. No. 5,142,838, which is a Division of the following U.S. patent application:

STANDING SEAM ROOF ASSEMBLY AND SUPPORT, Ser. No. 745,320, filed Jun. 14, 1985, abandoned, which is a continuation-in-part of the following:

STANDING SEAM ROOF ASSEMBLY, Ser. No. 568,083, filed Jan. 4, 1984 now U.S. Pat. No. 4,597,234; and a continuation of the following:

ROOF ASSEMBLY FOR REROOFING A BUILDING STRUCTURE, Ser. No. 604,884, filed Oct. 26, 1990, abandoned, which is a Division of:

FREE ROOF ASSEMBLY FOR REROOFING A BUILDING STRUCTURE, Ser. No. 136,246, filed Dec. 18, 1987, abandoned, which is a continuation-in-part of the following:

APPARATUS FOR SECURING A ROOFING SUPPORT SPACER TO UNDERLYING SUPPORT STRUCTURES, Ser. No. 090,689, filed Aug. 28, 1987, abandoned, which is a Continuation-in-part of the following:

STANDING SEAM ROOF ASSEMBLY AND SUPPORT, Ser. No. 745,320, filed Jun. 14, 1985, abandoned, which is a continuation-in-part of the following:

STANDING SEAM ROOF ASSEMBLY, Ser. No. 568,083, filed Jan. 4, 1984 now U.S. Pat. No. 4,597,234.

OTHER RELATED APPLICATIONS

The present application is related to the following simultaneously filed patent applications, each of which is incorporated herein by reference:

ROOF SPACER APPARATUS, filed Jun. 7, 1995

ROOF SUPPORT APPARATUS, filed Jun. 7, 1995

ROOF FRAMING SYSTEM, filed Jun. 7, 1995

APPARATUS FOR ROOF SUPPORT, filed Jun. 7, 1995

ROOF PANEL STANDING SEAM ASSEMBLIES, filed Jun. 7, 1995

STANDING SEAM ASSEMBLY RETENTION APPARATUS, filed Jun. 7, 1995

CLAMPING APPARATUS FOR STANDING SEAM ASSEMBLIES, filed Jun. 7, 1995

ROOF PANEL SYSTEMS, filed Jun. 7, 1995

STANDING SEAM ASSEMBLY, filed Jun. 7, 1995

BACKGROUND OF THE INVENTION

1. Field of the Invention

The present invention relates to a roof assembly for a building structure, and more particularly, but not by way of limitation, to standing seam roof systems.

2. Discussion of Prior Art

Numerous types of roof assemblies have previously been proposed for pre-engineered buildings in efforts to provide a watertight roof assembly, while at the same time enabling the roof assembly to expand and contract as changes in temperature are encountered. Typical of such prior art roof assemblies of considerable success in recent years is the standing seam roof assembly. The panel members of the standing seam roof assembly are joined along lapped together side edges forming the standing seams. The panel members of the standing seam roof are secured to the secondary structural members by either clips or through fasteners. Clips can be of two types: floating (one or two piece moveable); or fixed (one piece with no movement allowed between the panel and its supporting structure). Through fasteners attach the panels to underlying support structure and substantially fix or lock the panels and support structure together so that no differential movement can occur.

Roofs may be classified as shed roofs and low slope gasket roofs. Shed roofs are roofs that shed water because gravity pulls the water down and away from panel joints more effectively than wind or capillary action propel water through the joint. Shed roofs generally occur over slopes of three to twelve or greater. Low slope gasket roofs, on the other hand, provide roof joints that are made watertight by placing a gasket material between the panel joints and securing the gasket in place by, for example, encapsulating the gasket material or exerting pressure upon it. Generally, low slope gasket roofs are usually ¼ to twelve slope or greater.

Heretofore, field seamed gasket joints have been limited to using two piece clips wherein movement between the roof and its underlying structure took place within the clip. The reason for this is that in the past the line of sealant serving as a gasket and the top hook portion of the clip intersected and if the clip moved in relation to the panel which held the sealant, the relative movement deformed and destroyed the gasket seal. One piece clips have been used freely in shed roofs where a gasket seal was not required.

Standing seam metal roofs exhibit considerable diaphragm strength and it is desirable to use this strength by interconnecting the roof to its support frame to help stabilize the support frame, rather than to brace and stabilize the support frame by other means.

Past practices have been to stabilize the support frame by means of separate bracing and on gasket roofs to use a suitable two piece floating (moveable) clip to allow the brace and frame to remain fixed and for the panel to move in relation to the frame as it is subjected to temperature change or other forces, or to limit the length of the panel run to about 40 feet so that the movement of the panel as it expands and contracts is low and does not materially damage its connection to the underlying structure.

However, the desirable result of eliminating detrimental differential movement between the panel and its support structure on large roofs may also be achieved by constructing the underlying support so that it moves slightly to accommodate the movement of the roof as it is being subjected to movement because of temperature change or other forces. This means of construction is exemplified in a system produced by ReRoof America℠, Inc., referred to as the Flex Frame™ support system.

The interconnection of the panel members of the standing seam roof lend stiffness and strength to a flexible roof structure while allowing the roof structure to expand and contract as a function of the coefficient of expansion of the panel material and the temperature cycles of the roof panels.

If one of the means of using floating clips or if using a fixed connection between the panal and the flexible framing is not used, the repeated action of expansion and contraction of the panel members tends to weaken the panel-to-panel lap joints and the panel to framing connection and thus often causes panel separation, structural failure and roof leakage. Leaks are generally caused by the weakening of the fastening members and working or kneading of the sealant disposed at the joints. Prior art sealant for such roof assemblies required adhesion, flexibility and water repellency. Further, in many instances the pressure on the sealant varied greatly throughout the length of the sidelap and end lap joints of the panels, resulting in uneven distribution and voids of the joint sealant.

Many of the problems discussed hereinabove encountered in prior art standing seam roofs, such as structural failures and leaks, have been overcome by a standing seam floating roof assembly such as is disclosed in copending U.S. patent application Ser. No. 568,083, filed Jan. 4, 1984 by Harold G. Simpson. The standing seam floating roof assembly is formed of elongated metal panels, each of which is provided with a female member formed along one longitudinal edge and a male member formed along the opposed longitudinal edge, adjacently disposed panels being joined by interlocking female and male members thereof to form the standing seam joint. Clips interconnect the standing seam joints and the underlying secondary structure, with the upper portions of the clips hooking over the male members of the panels. Most such clips are of the sliding type which permits the hooking portion to move relative to a supporting base portion connected to the secondary structure, while relative motion between the clip hook and the metal panel is substantially prevented. A sealant material is disposed to form a moisture dam in the interlocking joint of the female and male members.

Panel members of pre-engineered roof systems are constructed of identical sheet metal panels that are laid end to end, as well as side by side as discussed above. Typically, these sheet metal panels are formed by either a factory or field roll forming process and are joined side to side in the field by means of engaging (locking) a male with a female sidelap using a process wherein the male and female, as they are interlocked, deform within their elastic range. Alternatively, a field roll form seaming machine may be used that employs inelastic deformation to secure the male and female in interlocking engagement. Such end to end engagement presents the problem of sealing the end or butt joints, especially at the "four corner" areas where four of the panels are interlapped to form a juncture area. Various butt joining techniques have evolved in the prior art, all of which involve selective notching and overlapping to achieve a close fitting juncture area, and liberal application of mastic to effect the best seal possible under the design circumstances. Serious deficiencies have been encountered in prior art lap joints, including water leaks, high costs, tooling complications, packaging, etc.

In addition to the use of standing seam roof assemblies on newly constructed pre-engineered buildings, standing seam roof assemblies are also finding increasing usage in another segment of the roofing industry, that of "built-up roof" replacement. Generally, a built-up roof is formed of a plurality of sections which are interconnected and overcoated with asphaltic composition to provide a watertight seal. While such substantially horizontal roof assemblies have generally served successfully, problems have nevertheless been encountered as a built-up roof ages, or when the building settles, or when construction errors result in water standing in pockets on the roof assembly. This standing water often results in deterioration of the roof, causing leaks and the like to occur.

A need has long been recognized for a means for replacing a built-up roof, as well as other conventional roofs, which does not require substantial modification to the preexisting roof and which is economical both in fabrication and on-site construction. Further, it is highly desirable that the new roof assembly be capable of providing a new roof surface independent to the variations in the surface of the preexisting roof assembly. Past repair methods, especially those capable of altering the slope of the roof surface to improve drainage characteristics, have required substantial destruction of the original roof assembly and extensive custom construction, thus exposing the building and its contents to damage by the elements during the reroofing process and being excessively time consuming.

SUMMARY OF THE INVENTION

The present invention provides a standing seam roof assembly with an improved four corner sealing assembly in which an upper pair of interlocking standing seam joint panels and a lower pair of interlocking standing seam joint panels meet in a lapped four corner juncture area. The upper ends of the two lower panels are overlapped by the lower ends of the two upper panels at the juncture area, and one panel of each of the upper panel pair and the lower panel pair have an upstanding male side lap portion that forms a male apex. The other panel of each of the upper panels and the lower panels have an upstanding female sidelap portion overlapping the respective male sidelap portions, with each of the female sidelap portions having a longitudinally disposed sealant cavity and a sidelap sealant strip that is predeterminedly disposed within the sealant cavity with the sealant strip veering at the juncture area.

The male sidelap portions are notched at the juncture area so as to abuttingly overlap the panel ends. The upstanding leg portions of the male sidelap portions are received within the insertion cavity of one of the female sidelap portions. Additionally, one of the female sidelap portions is notched so as to be aligningly interlapped and sealed with the other of the female sidelap portions. An endlap sealant is positioned between the overlapping lower ends of the upper panels and the upper ends of the lower panels, the endlap sealant being disposed to extend upwardly between the upstanding leg portions of the notched male sidelap portions and also between female upstanding leg portions so as to sealingly engage the sidelap sealant strip in the female sidelap portion. Additionally, a cinch strap and a backup plate provide additional stiffening of the panel endlap to resist uplift of the panels caused by environmental forces.

Accordingly, an object of the present invention is to provide a standing seam roof assembly with an improved four corner sealing assembly.

Another object of the present invention is to provide a standing seam roof assembly with improved sealing characteristics at the four corner juncture areas.

Yet another object of the present invention is to provide a standing seam roof assembly with a four corner sealing assembly that employs cinch straps and back up plates to provide improved sealing and stiffness to the panel endlaps.

Still yet another object of the present invention is to provide improved resistance to unfurling of the adjacent roof panels as a result of uplift forces exerted on the panels.

Other objects, features and advantages of the present invention will become apparent from the following detailed description when read in conjunction with the drawings and appended claims.

BRIEF DESCRIPTION OF THE DRAWINGS

FIG. 1 is a partial view in isometric of a roof system of the type served by the teachings of the present invention.

FIG. 2 is a perspective partial cross-sectional view of a roof system of FIG. 1.

FIG. 3A is an elevational front view of a roof support system shown in FIG. 2. FIG. 3B is an elevational side view of the roof support system of FIG. 3A.

FIG. 4 is an elevational view of a sidelap clip member utilized in a roof system of FIG. 1. FIG. 4A is an enlarged view of the hook portion of the sidelap clip member. FIG. 4B is a partial top plan view of the hook portion of FIG. 4. FIGS. 4C and 4D show another embodiment of the sidelap clip member. FIG. 4E provides a force diagram for the forces exerted upon the sidelap clip member when subjected to uplift loads.

FIG. 5 is an end schematic view of the profile of a roof panel member which can be utilized in the roof system of FIG. 1.

FIG. 6 is a partial side elevational view of an alternate attaching assembly for the roof panel member of FIG. 5. FIG. 6A is a view taken at 6A—6A in FIG. 6.

FIG. 7 is a partial side elevational view of yet another alternate attaching assembly for the roof panel member of FIG. 5. FIG. 7A is a view taken at 7A—7A in FIG. 7.

FIGS. 8 and 8A are side and elevational views, respectively, of a sidelap clip member which incorporates an insulation cutting feature.

FIG. 9 is one other attaching assembly for a modified roof panel member which is shown in schematic profile in FIG. 9A. FIG. 9B is a force diagram at one of the hooking clip members.

FIG. 10 is a partial side elevational view of another alternate attaching assembly for the modified roof panel member of FIG. 9A. FIG. 10A is a view taken at 10A—10A of FIG. 10. FIG. 10B is a side view of the panel and the elongated panel clip attached to the support structure.

FIG. 13 is an elevational view of the profile of the standing seam joint formed by interlocked adjacent roof panel members of the type shown in FIG. 11.

FIG. 14 shows an alternate sidelap sealant for use in the standing seam joint of FIG. 13.

FIGS. 15A through 15C are partial plan views of the interlapped panel corners depicting progression through assembly of the roof panel member of FIG. 11 at the four corner juncture area.

FIG. 15D is an elevational view in partial cutaway detail of the four corner juncture area depicting interlapped panel ends prior to installation of cinch strap and backup plate assemblies. FIG. 15E is a view taken at 15E—15E in FIG. 15D, and FIG. 15F is a view taken at 15F—15F therein.

FIG. 15GG is a view taken at 15GG—15GG in FIG. 15G.

FIG. 15I is a partial detailed, elevational side view of corner C of the FIG. 11 roof panel member. FIG. 15II is a view taken at 15II—15II in FIG. 15I.

FIGS. 16A through 16F are similar to corresponding views in FIGS. 15A–15F above but show the installation sequence of the roof panel members as used on an oppositely sloped roof structure.

FIG. 17 is an elevational view of the bar strip portion of a cinch strap assembly used to sealingly interconnect interlapped panel ends at the four corner juncture area. FIG. 18 is a top plan view of the backup plate portion of the cinch strap assembly.

FIG. 18 is a plan view of a companion backup plate to the roof panel member shown in FIG. 11. FIG. 18A provides an alternative backup assembly to be used in lieu of the backup plate of FIG. 18. FIG. 18B provides an enlarged partial cross-sectional view of FIG. 18A.

FIG. 19 is a plan view of a stirrup connector.

FIGS. 19A is an arc elevational views of a stirrup connector.

FIG. 19B is another elevational view of a stirrup connector.

FIG. 20 is an elevational view of the backup panel of FIG. 18.

FIG. 21 is an elevational view of the seam roller.

FIG. 21A is an elevational view of the seam roller before locking the roof panels together.

FIG. 21B is an elevational view of the seam roller after locking the roof panels together.

FIG. 22 is another elevational view of the seam roller.

FIG. 22A is another elevational view of the seam roller before locking the roof panels together.

FIG. 22B is another elevational view of the seam roller after locking the roof panels together.

FIG. 23 is an elevational view of the sidelap of the present invention.

FIG. 24 is an elevational view of the standing seam assembly.

FIG. 25 is a view of the standing seam assembly including a fastener constructed in accordance with the present invention.

FIG. 26 is an elevational view of the standing seam assembly before the field roll forming process.

FIG. 27 is an enlargement of the horizontal clip.

FIG. 28 is an enlargement of the horizontal clip.

FIG. 29 is a view taken along the 29—29 line.

FIG. 30 is an elevational view of the formed seam.

FIG. 31 is an enlargement of the formed seam.

FIG. 31A is an enlargement of the seat portion of the formed seam of FIG. 31.

FIG. 32 is a side view of another field roll formed standing seam assembly.

FIG. 33 is an elevational view of the standing seam assembly.

FIG. 36 is an elevational view of the standing seam assembly with an external clip.

FIG. 37 is an isometric view of the external clip.

FIG. 38 is an elevational view of the standing sidelap seam assembly.

FIG. 39 is a view of the standing seam sidelap assembly after completion of the field rolling process.

FIG. 40 is an alternate view of the standing seam assembly of FIG. 39.

FIG. 41 is an elevational view of the standing seam assembly with adjacent roof panels.

FIG. 42 is an enlarged view of a horizontal clip.

FIG. 43 is an elevational view of a horizontal clip.

FIG. 44 is another enlarged view of a horizontal clip.

FIG. 45 is a perspective view of the clip base.

FIG. 45A is an enlarged view of the base of the hold down clip on FIG. 45.

FIG. 45B is an enlarged view of a two-piece hold down clip assembly.

FIG. 46 is an elevational view of a standing seam assembly.

FIG. 47 is an elevational view of a clamping tool

FIG. 48 is a plan view of clamping jaws.

DESCRIPTION

Figure 11:
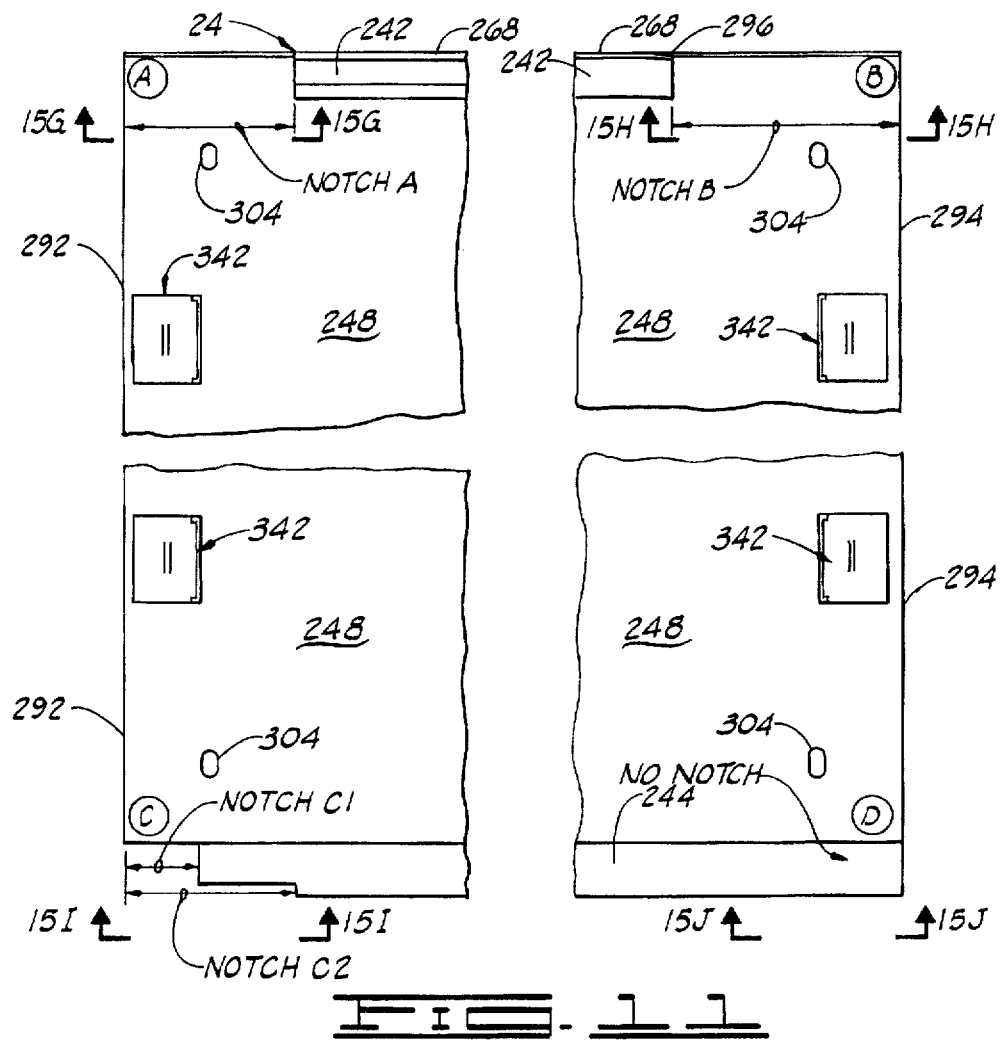
FIG. 11 is partial plan view of a roof panel member usable in the roof system of FIG. 1.

Standing seam metal panel roof systems of the functional gasket type are usually placed on relatively flat building slopes and as a result must be capable of resisting a standing head of water. Because such roofs are relatively flat, panel runs are often long and expansion and contraction joints are difficult to make watertight. Thus, panel attachment to the underlying secondary structural system must accommodate panel expansion and contraction. Steeper roof pitches, used with architectural panels, are shorter and require less end lap, sidelap and fastener watertightness.

To obtain watertightness at points of attachment of the roof panels to underlying structure, panels must be permitted to expand and contract in relation to the underlying structure or the panels and the underlying structure must be permitted to move in unison without unduly straining or fracturing the panel. This may be accomplished by limiting the length of the panels or by utilizing support structures sufficiently flexible to allow the attachment means to move with the expanding or contracting panel. The flexibility of the support structurals must be greater for longer panel runs because, other factors being equal, the expansion or contraction of the panels will be greater.

Past practice has been to attach the center and sidelap joints with either penetrating or non-penetrating fasteners. For non-penetrating clips, past clip practice has been to use either a fixed or sliding clip with a minimum length contact surface between the hold-down portion of the clip and the top of the male leg of the seam. The length of the clip has been held to a minimum, resulting in stress concentrations in the panel at the point of attachment, leading to severe distortion in the panel joints as the panels are subjected to wind uplift.

The standing seam clip bears only on the male seam portion of the panel inserted into the adjacent female seam portion. The female seam portion is not retained directly by the clip and as a result the load from the female seam portion must pass through the male seam portion and then into the clip where it can in turn pass to the secondary structural. This action tends to "unravel" the panel joint and allow distortions over the short section retained by the clip. This has resulted in premature panel failure when subjecting such panels to wind uplift.

A roof panel is usually attached to underlying supporting structure in a manner that causes the panel to act as a continuous beam. This arrangement substantially reduces the maximum moment occurring at any one point compared to the moment that would occur in a simple beam, other factors being equal. However, this means of construction causes a negative moment to occur at the attachment point. This negative moment peaks and drops off very quickly as the panel section under consideration moves from the center line of the attaching clip towards the point of inflection (P.I.), the P.I. being that point where the moment in the panel changes from positive to negative.

Past center hold-down practice has been to coordinate such usage with edge hold-down practice so that if through fasteners were used to attach the center of the panel to the underlying structural, then fixed clips or through fasteners were used to attach the edge of the panel to the underlying structural; and conversely, if the panel edge attachment consisted of a floating, (two-piece, moveable) non-penetrating attachment means, such as a clip, then the center hold-down was either totally eliminated or a floating, non-penetrating center hold-down device was utilized. However, past non-penetrating center hold devices heretofore have largely been ineffective and expensive.

The effectiveness of non-penetrating center hold-down devices is influenced by the number and height of corrugations formed in the panel and the width, thickness and strength of the metal laterally separating the corrugations. The configuration and number of panel corrugations in turn has a direct impact on the efficiency of material utilization, which in turn is a primary cost factor. Conventional standing seam roofs may only achieve a flat-width-to-coverage ratio as low as 1.25:1 where through fasteners exist only at panel end laps and do not occur at the panel centers. On the other hand, non-standing seam panels with center hold-down fasteners are commonly 36" wide and may achieve flat-width-to-coverage ratios as low as 1.17:1.

In summary, it is clear that panels with through fasteners, while having many disadvantages associated with the placement of fasteners through the panel, can achieve better material utilization and erection efficiency than can standing seam panels that utilize only non-penetrating fasteners. The primary reason for this is that the panel connector can be placed immediately adjacent to intermediate corrugations which greatly increases wind uplift resistance.

Thus, a panel design that can achieve the material utilization and erection efficiency of a panel having through center fasteners, without the disadvantages of structurally compromising the structural connections to underlying secondary support members, or a panel with simple non-penetrating center hold-down fasteners, would provide significant advantages over prior art panels. Disclosed herein is an improved panel design with a secondary support system having sufficient flexibility such that the panels and fasteners under the influence of expansion and contraction move the underlying structurals while still maintaining the structural integrity and watertightness of the overall system. Taught herein is an alternative approach to achieve this desirable effect by coordinating the shape, spacing and size of the intermediate corrugations and the standing seam sidelap corrugations so that panel fasteners capable of moving in relation to the panels is achieved, while at the same time minimizing the flat width to corrugated width coverage ratio.

The panel design provided herein serves to minimize panel material thickness. It is of no benefit to minimize the panel flat width to corrugated width ratio if accomplished at the expense of other benefits such as increasing the base material thickness. To the contrary, it is very desirable to also reduce the panel thickness to minimize the amount of material in each panel. Of course, these goals could be achieved by reducing the span between secondary support members, but this would lead to increased costs in other elements of the building structure.

FIGS. 1–4

Referring now to the drawings, and more particularly to FIG. 1, shown therein is a portion of a roof system 10 supported by a preexisting roof 12 of a building structure 14. The preexisting roof 12 of the building structure 14 can be any preexisting roof structure, such as a built-up roof, which is connected to and supported by conventional elements, such as a primary and secondary structural systems (not shown), and a plurality of wall members 18 (one shown). The primary structural system of a building structure will usually consist of a plurality of upwardly extending column members which are rigidly connected to a foundation and a plurality of primary beams which are generally horizontally disposed and supported by column members. The secondary structural system will usually consist of a number of purlin or joist members supported by the column members or other members, such as primary beams.

The roof system 10 is formed of a plurality of overlapping roof panels 24 interconnected to provide a roof plane for the roof system 10, and while generally flat panels (except for joints and stiffener ribs) are depicted, it will be understood that the present invention is also applicable to curvilinearly shaped panels sometimes preferred by certain architectural planners. Further, if desired, the roof sections of the roof system 10 can be disposed on the preexisting roof 12 such that interlocking adjacent roof sections form a multi-pitched roof. On the other hand, the roof sections can be joined such that the roof system 10 is provided with a substantially single roof plane having a unidirectional slope, as depicted in FIG. 1.

The roof panels 24 of the roof system 10 are supported by a plurality of adjustable roofing support spacers 26 of the type disclosed in copending patent application entitled ROOF SUPPORT SYSTEMS, Ser. No. 08/486,946, filed Jun. 7, 1995, incorporated herein by reference. Each of the adjustable roofing support spacers 26 extends upwardly from the preexisting roof 12 as required to support the roof panels 24 in a predetermined planar slope. Each adjustable roofing support spacer 26 is characterized as having one or more base support members 28, a spatially disposed upper beam 30 and an adjustable web assembly 32 interconnecting the base support members 28 and the upper beam 30 such over all assembly being adjustable. The base support members 28 provide for load distribution across the area of the base support members 28 onto the preexisting roof 12. The web assembly 32 of each of the adjustable roofing support spacers 26 is connected to the upper beam 30 and the base support members 28 at various positions so that the upper beam 30 of each of the adjustable roofing support spacers 26 is disposed a selected height above the base support members 28 (and thus above an upper surface 22 of the preexisting roof 12) independent of slope or irregularities that may be present in the preexisting roof 12.

The present invention presents a novel panel profile, and it will be clear that the adjustable roofing support spacers 26 are useable with other panel and insulation designs. While the panels of the present invention can be attached directly to the upper beams 30 as shown in FIG. 1, the panels can be supported in a number of ways, one of which is depicted in FIG. 2; described hereinbelow.

Roof panels 120, having the profile taught in U.S. Pat. No. 4,597,234 and referenced hereinabove, are supported on support assemblies 122 which are attached to the upper beam 30 of the adjustable roofing support spacers 26. The roof panels 120, only portions of which are shown, are depicted as being standing seam panels, with their interlocking edge seams being supported by clip portions of the panel support assemblies 122, as will become clear below.

A conventional, standing seam roof panel, on the average, is about 35 long and about 16 to 24 inches wide, although other lengths and widths are known. Typically, a standing seam roof panel member is made of 24-gauge sheet metal material, and because of this relative thin metal, corrugations are commonly formed running lengthwise in the panel to provide sufficient strength for load bearing. Further, typical prior art standing seam roof panels are secured at the interlocking sidelap joints and at the end overlap of contiguous panels.

Fastener penetration of the panels, except at the end overlaps, is generally avoided in large roofs having relatively fixed support systems in order to minimize leakage points. The reason for this is that with the connection of the panels directly to relatively rigid underlying structural members, thermal expansion has caused the panels to rip out around the fasteners. When used on short spans, or flexible secondary structural members, this usually does not occur, and the advantages of through center fasteners and an unsupported standing seam joint can be used advantageously. The medial portions of the panels located between standing seam joints are not normally secured to the underlying structural members. Such roof panels are inherently laterally flexible but longitudinally inflexible. Because the panels are usually disposed to extend transverse to the roof, if the panels are joined rigidly end to end and attached rigidly to underlying secondary structures and portions of the underlying structures are rigid, much damage can be caused by differential movement between the two.

The panel width and material thickness are dictated by the structural configuration of the panel and its support structure, as well as the inwardly and outwardly directed load requirements imposed by regulatory, insurance and good engineering practices. Other factors being equal, the material thickness that is required is normally greater for outwardly directed load than for inwardly directed load. The reason is that the panel is more fully supported by the underlying secondary supports for inwardly directed load than for outwardly directed load. The support points, other than at panel ends, for outwardly directed load were in the past located only at points of attachment of the panel of the secondary structural. Past practices limited these points of attachment to places such as those where the panel edge points pass over secondary structural members and where attachment could be made without causing additional holes in the panel.

Several attempts have been made to devise intermediate corrugation and corresponding clips to hold the center of the panel to the underlying structural. Such attempts have had limited success because the outwardly directed force bows the center of the panel outward as load is applied and causes the clip to become disengaged. As will be discussed more fully below, the present invention provides for attachment of medial panel portions to underlying structural members when subjected to uplift loads, while maintaining equivalent panel quality, of using thinner gauge material and wider panels while at the same time eliminating ripping of the panel around fasteners so as to reduce roof leak potential and the adverse effects of differential expansion and contractions. This presents considerable benefit in time and cost savings to the pre-engineered building art.

Continuing this discussion with reference to FIG. 2, a flexible membrane 124 is extended substantially tautly over an appropriate structural support member such as a box joist beneath the panel support assemblies 122 and secured thereby to the upper beams 30. A layer of compressible insulation, such as insulation 60, is supported by the flexible membrane 124 such as a built up roof membrane beneath the roof panels 120 in substantially its pre-installed state. As for the type of blanket insulation 60 to be used, it will be noted that such insulation is usually a laminated product that comprises a layer of compressible mineral insulation or chopped glass fiber insulation which is bonded via an adhesive to a flexible facing membrane. However, other types of insulation, such as blown shredded paper, glass fibers and foam, may be used advantageously. The flexible membrane 124 may consist of one or more thin layers of materials such as aluminum foil or vinyl plastic which serves to provide a vapor barrier for the building envelope. A typical blanket batt insulation is made by the Mizell Brothers Company of Dallas, Tex., which is a product comprising a laminated facing membrane made of a layer of vinyl, a layer of fiberglass scrim, and a layer of aluminum foil. Bonded to the facing membrane is a thick layer of compressible fiberglass material.

The flexible membrane 124 may also be a separate, independent structural member which provides a continuous membrane vapor barrier and also serves as a support platform for the insulation layer 60. An independent membrane preferably will be a steel or aluminum sheet or a facing flexible facing membrane about one to two mils in thickness with an embedded scrim, such as Fiberglass or nylon, capable of taking tensile load. The flexible membrane 124, if separate to the insulation, is placed over the upper beams 30 by attaching it between convenient support members, such as a building wall or roof structurals, so that the membrane extends substantially taut therebetween. Once the membrane is tautly in position, the insulation 60 is simply placed upon the membrane.

Of course, the positioning of the membrane 124 and insulation 60 over the upper beams 30 is intended as an optional treatment to the provision of a similar membrane and insulation directly upon the preexisting roof 12 as discussed above with reference to FIG. 1. Further, there will most likely be applications where both insulations are installed, or in which the insulation and/or membrane can be eliminated altogether.

The panel support assembly 122 shown in FIG. 2 comprises a plurality of base clips 126 each of which has a median web portion 128. At the lower end of the median web portion 128 there is formed a leg portion 130 through which self-drilling/self-tapping screws 132 extend to secure the base clip 126 to the underlying support spacers 26. As shown in FIG. 3A, the attachment of the base clips 126 serve to secure the flexible membrane 124 to the top of the upper support spacers.

The panel support assembly 122 also comprises a plurality of panel support beams 134 that are generally elongated channel shaped members arranged in overlapping, end-to-end relationship. As shown, the panel support beams 134 extend generally parallel to the underlying upper beams 30, but where desired, the panel support beams can be disposed to run perpendicularly to, or otherwise angularly to, the underlying upper beams 30. Preferably, the base clip 126 is formed as an integral portion of the panel support beam 134 to which it is attached. That is, each of the base clips 126 is formed as an extension of the web portion of its channel shaped panel support beam 134 and is press formed to extend downwardly therefrom to support one end of its respective panel support beam 134 at a predetermined distance above the underlying upper beam 30. This is for the purpose of providing clearance below the panel support beam 134 in order to provide space for the insulation 60 to be positioned thereunder, and further, each base clip 126 has the capability to flex to accommodate expansion and contraction of the roof panels 120.

The roof panels 120 are secured to the panel support beams 134 and rest on, and are connected to, upper support surfaces 136 thereof which provide support for the medial portions of the roof panel 120 members for both inwardly and outwardly directed load. As shown in FIGS. 3A and 3B (which show only the male sidelap joint of one roof panel 120 in order to display the clip), an upwardly extensive clip member 138 is secured to the upper support surface 136 of the overlapped panel support beams 134 and panel support beams 134A via a screw 140. An upper hook portion 142 of the clip member 138 is formed to hook over the apex portion of the male sidelap joint of the roof panel 120.

Once the flexible membrane 124 is tautly secured to selected anchoring points and stretched over the support spacers 26, the base clips 126 are secured in place via the screws 132, and the panel support beams 134 are overlappingly aligned along each of the support spacers 26. The standing seam roof panels 120 are snapped into overlapping and interlocking relationship over the clip member 138.

FIG. 4 shows an enlarged view of the clip member 138 which has an upwardly extending web portion 144 which supports the hook portion 142 and a laterally extending male joint support shelf 146. The support shelf 146, which has a downwardly turned lip portion 148 for strength, is disposed to extend beneath the male joint portion of the roof panel 120 as shown in FIG. 3B. This feature of the clip member 138 is a unique feature of present invention in that support of the male edge portion assists in increasing joint sealing integrity as the snap on female edge portion of the contiguous roof panel is laid in place and interlocked to the male edge portion. Another unique and advantageous feature of the clip member 138, as shown in FIG. 3B, is that the screw 140 connecting the clip member 138 to its underlying support structure is located close to the web.

A force diagram that results from the clip's resistance to wind uplift on the panel is shown in FIG. 4E. Placing the fastener close to the centerline of the clip hook (resultant P1) and at a distance from a fulcrum (force P3 at the toe of the clip) about which the base of the clip rotates as upward load is applied, reduces the prying action on the clip base, thus reducing the bending load in the clip base and the pull out force exerted on the fastener located at force line P2.

If the distance L1 equals L2, then force P2 is twice the uplift load P1. If L1 equals ¼ L2, then P2 is only 1¼ times P1. This is a very significant reduction in the load on the fastener and bending in the base thus allowing a more efficient clip base plate and smaller fastener to be used.

Other features of the clip member 138 include a provision of embossed strengthening ribs 150 in a base leg portion 151. Further, the base leg portion 151 is provided with downwardly extending cleat members 152 from its under surface 154 that serve to dig into the upper surface of the panel support beam 134 to assist in seating the base leg portion 151 and prevent its rotation with the torquing of the screw 140. This latter feature assures that the hook portion 142 is maintained in proper alignment on the upper part of the male joint being pinned thereby. Finally, the outer surfaces of the clip member 138 are selectively treated with a lubricant or friction reducing coating 156 as depicted in FIG. 4A which is a further enlargement of the hook portion 142. The coating 156 is also provided on the support shelf 146, another bearing surface area of the clip member 138. The purpose of the coating 156 is to reduce frictional contrast between the stationary clip members 138 and the supported roof panels 120 during expansion and contraction of same. Further, end edges 158 of the hook portion 142 are curved or rounded slightly, as depicted in the partial top plan view of FIG. 4B, and are made smooth so as to prevent the end edges 158 from digging into the joint portions of the supported roof panel 120 during relative movement thereof.

FIGS. 4C and 4D show another embodiment of clip member 138A. Portions of the clip member 138A are identical to corresponding portions in the clip member 138 of FIGS. 4, 4A and 4B, and such portions bear identical numerical designations in FIGS. 4C and 4D, to wit, the hook portion 142, the strengthening ribs 150, the base leg portion 151, the cleat members 152 and the lubricant coating 156. In the clip member 138A, the support shelf is cut directly from web portion 144A and form bent along form intersection 146B to position support shelf 146A extending generally normal to the web portion 144A. Lip portion 148A is angularly extensive from the distil edge of the support shelf 146A, and lower edge 148B of the lip portion 148A is caused to be supported by a pair of supporting ear members 144B that are form bent portions of the web portion 144A that (prior to form bending) extend into profiled hole 149 left in the web portion 144A once the support shelf and lip portion are broached and form bent as described. Because of the weakening of the web portion 144A by the profiled hole 149 therein, it is desirable to provide a pair of embossed strengthening ribs 150A in the web. The thus described clip member 138A provides an exceptionally stable yet inexpensive clip complement for the roof system 10.

FIGS. 5–10

The present invention provides a number of improvement features for the roof system 10 of FIG. 1, many of which are applicable to various roofing panel profiles such as those shown in the drawings discussed hereinabove. The invention shown in FIG. 5 through 10A is a new and unique panel incorporating features which enables one to manufacture and use a wider, light gauge, more water tight and more wind resistant standing seam metal panel than heretofore possible. This is accomplished by incorporating edge standing seam corrugations, an optional number of center panel ribbed corrugations and an optional center panel hold-down assembly that allows the panel to perform exceptionally well for a specific range of end use applications. More particularly, disclosed herein are two alternative methods of achieving a panel and panel support system that achieve, through either the use of through fasteners or clips, adequate structural stability and at the same time accommodating panel expansion and contraction without roof performance being adversely affected.

For such a wide panel to perform satisfactory it is necessary to suitably stiffen the panel longitudinally and to connect the edge and center portion of the panel to the underlying structure. The connection best suited to connect the edge and center portion of the panel to the underlying structure will depend on a number of factors relating to the overall nature of the building, its supporting structure and the insulation system used.

This unique metal standing seam roof panel system possesses superior material utilization and erection economy. The flat width of 26 gage (0.019 inch) material utilized to roll form the panel may be as low as 117% of the coverage of the panel after forming and being attached to the roof while achieving the benefits of continued watertightness, superior wind uplift resistance and easy low-cost erection. The panel sidelap may incorporate any one of a number of sidelap configurations as disclosed herein or as utilized in other designs.

Shown in FIG. 5 is an end schematic view of the profile of a roof panel member 160 which incorporates the unique features just described. It should be noted that this discussion entails the use of several figure sets and the item numbers used in each figure set may only apply to the items in that set.

In order to illustrate the profile geometry, the roof panel member 160 is shown interlocked with a contiguous roof panel member 160A on one side and with contiguous roof panel member 160B on the other side thereof. The roof panel member 160 has a vertically extending male sidelap joint portion 162 formed along one side thereof, and a vertically extending female sidelap joint portion 164 formed along the other side thereof. In like fashion, the roof panel member 160A has vertically extending male and female sidelap joint portions formed along its sides, with only a female sidelap joint portion 164A depicted in FIG. 5. Similarly, the roof panel member 160B has vertically extending male and female sidelap joint portions formed along its sides, with only a male sidelap joint portion 162B being depicted in FIG. 5. In each of these roof panel members, the male sidelap joint portion is supported by the underlying support structure and is lockingly receivable in the insertion cavity formed by the snap together female sidelap joint portion of a contiguous panel. In FIG. 5, the male sidelap joint portion 162 is interlocked with the female sidelap joint portion 164A. Also, the male sidelap joint portion 162B of the roof panel member 160B is interlocked with the female sidelap joint portion 164 of the roof panel member 160.

The roof panel member 160 has a number of parallel structural corrugation crowns (two of which are illustrated and numerically designated as 166 and 168) formed in the medial portion of the panel. The size, shape and number of the structural corrugation crowns 166 and 168 are generally coordinated with the required geometry of the panel and the use condition. It will be readily understood that the structural corrugation crowns 166 and 168 are distinguishable from minor ribs which are often employed to eliminate "oil canning" effects or rippling of the panels. The structural corrugation crowns 166 and 168 will typically have depths in excess of ½ inch and will be formed running the length of a roof panel in a conventional manner to add load bearing strength to light gauge sheet metal.

It will be noted that the roof panel 160 may be placed directly on top of the insulation 60 and that attaching screws 170 secure the panel directly to the underlying upper beam 30 of the support spacer 26. In the embodiment shown, three screws are employed and are inserted adjacent to the female sidelap and each of the structural corrugation crowns 166 and 168 to provide adequate restraint to the corrugations which form spanning members between underlying support structure. It being desirable for attaching screws 170 to be located immediately adjacent the structural corrugation crowns 166 and 168 and the female sidelap joint portion 164 to minimize deflection in roof panel member 160. It being understood additional screws and screw locations may be utilized to minimize distortion. Furthermore, the standing seam joint formed by the interlocking male/female sidelap joint portions 162B, 164 and 162, 164A are not secured via clip members as is conventional. Thus the roof panel member 160 and its attaching means provides a panel having the water tightness afforded by a snap together field roll formed standing seam sidelap joint while having an unlimited panel width securable to the underlying support structure. Because of the vertically rising sidelap joint portions when the sidelap utilizes a snap together joint, the panels can be effectively snapped together without a seaming tool because backup support is accorded to the joint during seaming connection by the supporting structure itself. Alternatively, the sidelap may be overlapped and then seamed with a separate field seaming machine.

As shown in FIGS. 6 and 6A, the roof panel member 160 can alternately be attached to the underlying support spacer 26 by the placement of a semi-rigid foam spacer 172 over the insulation 60 with extended screws 174 extending therethrough to attach the upper beam 30. The spacer 172 may be provided with a more rigid upper surface via stiffener members 176, optionally adhered to the spacer 172, to prevent fastener indentation upon insertion and torquing the screws 174. If desired, each such screw member may be provided a standoff sleeve 178 to provide a positive stop of the screws 174; alternatively, the standoff function provided by the standoff sleeve 178 can be achieved by using a self-drilling screw having an enlarged shaft, or by using dual diameter threading which assures proper dimensional standoff as thread engagement occurs. Also, longitudinal sides 179 of the foam spacer 172 can be sloped to correspond generally to the crushed shape of the insulation 60.

FIGS. 7 and 7A show yet another alternate means for supporting and attaching the roof panel member 160 to the underlying support spacer 26. A rigid panel support member 180 is supported directly on the upper beam 30 and the screws 174 extend downwardly through the roof panel member 160 to attach to the upper beam 30. No standoff member is necessary for the screws 174 as opposing walls 182 of the channel shaped panel support member 180 exert countering forces to the screws 174, the roof panel member 160 being supported on upper portion 184 of the panel support member 180. Bottom knife edges 186 of both walls 182 are tapered to present a relatively sharp knife edge profile which serves to cut through the insulation 60 with installation of same. Disposed along the lower most portion of the bottom knife edges 186 are standoff tip 188 portions which are brought to rest upon the vapor membrane of the insulation 60 (if said insulation is provided with such membrane) or upon the flexible membrane 124 if it is disposed to support the insulation 60 as described above. The standoff tips 188 serve to prevent the bottom knife edges 186 from severing the vapor membrane.

While the panel support member 180 is shown as extending continuously along the supporting spacer 26 in FIG. 7, it will be apparent that the length and configuration of such panel support members is one of design choice for a particular application. That is, it may be desirable to provide a plurality of shorter panel support members at spaced apart intervals beneath the roof panel member 160, and while it is generally thought best to pass each screw 174 through an underlying panel support member, there may be instances where such fasteners will be placed at panel areas not directly over a panel support member. It may be desirable to equip such individual fasteners with standoff sleeves 178 such as shown in FIG. 6.

Shown in FIGS. 8 and 8A is a clip member 190 which incorporates the supporting and insulation cutting features of the panel support member 180. The clip member 190, a joint hold-down clip that serves the same panel attaching function of the clip member 138 shown in FIG. 2, has an upstanding web portion 192 with an upper hook portion 194 that engages the male sidelap joint of a standing seam panel such as at male sidelap joint portion 162 shown in FIG. 5. The clip member 190 has a base leg portion 196 extensive from and supporting the web portion 192, and a support shelf 198 is also extensive from the web portion 192. As shown, the base leg portion 196 and the support shelf 198 extend in opposite directions from the web portion 192, and if desired, the support shelf 198 is cut from the central part of the web portion 192 and form bent into the configuration shown, leaving a profiled hole 200 therein. If desired, strengthening ribs 202 can be provided in the web portion 192.

The base leg portion 196 is channel shaped and has a pair of clip supporting opposing walls 204 extending downwardly from an upper portion 206 having one or more strengthening ribs 207 as shown. Bottom knife edges 208 of both walls 204 are tapered to present a relatively sharp knife edge profile which serves to cut through insulation (not shown) in the manner discussed for the panel support member 180 of FIG. 7. Disposed along the lower most portion of the bottom knife edges 208 are multiple standoff tip portions 210 which are brought to rest upon the vapor membrane so as to prevent shearing of same by the bottom knife edges 208 and to prevent the clip from mining on the surface supporting same.

The support shelf 198 is disposed to support the male sidelap joint portion of a standing seam roof of the type shown in FIG. 5, and although no clip is shown in FIG. 5, the use of clip member 190 is presented as an alternate to, or addition to, the panel attaching means disclosed in that figure. As shown, the support shelf 198 is supported by the web portion 192 and by a leg portion 212 which also has the bottom knife edge 208 with standoff tip portions 210 that serve the purpose discussed above.

The clip member 190 permits the placement of insulation, such as glass fiber batting or foam, for example, directly over the underlying support structure, be that purlins, joists or support spacers, while yet accommodating direct joint attachment with substantially full insulation integrity thereat. The attachment of clip member 190 is achieved via screw fasteners (not shown) which extend through apertures (not viewed) in the upper portion 206 of the base leg portion 196 and which attach in the manner described above with regard to the screws 174 (FIG. 7). The clip member 190 can be used in combination with other attachment means, such as, for example, the foam spacers 172 (FIG. 6), the panel support members 180 (FIG. 7) or with many other configurations.

To further improve the structural strength of the panel, while at the same time maintaining its watertightness, the panel is attached to the underlying supporting structure in such a manner that the stress concentrations that normally occurs in the panel at the points of attachment are minimized. Because the negative moment in the panel at the attachment is high, but drops off very rapidly, it is possible to gain a superior benefit at a minimum cost by extending the length of the clip past present practices. This results in a substantial reduction in the maximum moment that must be resisted by the panel and at the same time reduces the tendency of the male portion of the panel to pull out of, or unroll, the retaining portion of the female. The present clip may be used to do this economically and effectively. The reason for this is that the upper portion of the clip is an integral part of the lower portion of the clip, and the complicated slide mechanisms required in many past solutions are avoided. This enables the length of the clip to be extended economically. A clip equal to, or longer that 0.083 of the panel span between supports has been found to be very advantageous and to greatly improve the performance of the panel under wind uplift conditions.

A yet further alternate panel attaching means is shown in FIG. 9 wherein is shown a panel 160C which is intended to be of the same construction features as those of the roof panel member 160 (FIG. 5) except for modification to corrugation crowns 166C and 168C. This pair of corrugation crowns 166C, 168C have oppositely facing hook portions 220, 222 respectively, and oppositely facing hooking clips 224 and 226 are hooked therein as shown. Each of the hooking clips 224, 226 has a base leg portion 228 through which extends a screw fastener 229 that secures same to the underlying structure.

The spaced apart relationship of the standing seam joint and the structural corrugation crowns 166C and 168C should be established so that, when the panel 160C is subjected to upwardly directed load, the catenary forces created as the panel 160C bows up under load will pull the panel corrugations more tightly against the hooking clips 224, 226. This effect will be discussed more fully hereinbelow with relation to FIGS. 9A and 9B which are semi-detailed schematical representations dealing with the forces on the panel 160C. At this point it is sufficient to note that, as the medial portion of the panel 160C is securely attached to the underlying structure, load conditions increase up to the point of metal failure of the hooking clips 224, 226, a condition well within predictable control of the designer.

The panel 160C is also shown in FIG. 10, but with an alternate attaching means securing it to the underlying structure. An insulation board assembly 230 comprises a semi-rigid foam insulation board 232 overlaying and may be previously (factory) adhered to a metal support plate 234. Hooking clips 224A and 226A are partially cut from the support plate 234 and form bent to extend upwardly from the remaining portion of the support plate through holes 236 in the insulation board 232 to engage the hook portions 220 and 222, respectively, of the corrugation crowns 166C, 168C. FIG. 10A, a partial cross section, shows this form bent configuration of the hooking clip 224A more clearly. Plural screw fasteners 229A are supported by the insulation board 232 (as shown in broken line view) until placement of the board onto the insulation 60; then the fasteners 229A are secured to the underlying structure as shown, with the heads of the fasteners 229A being finally securely against the support plate 234. Sides 238 of the insulation board are preferably tapered upwardly to generally conform to the crushed portion of insulation 60 over the underlying structure.

With regard to the center hold-down described in FIGS. 9 and 10, this is a unique system not previously used in the metal roofing industry. While center hold-downs have been utilized with non-standing seam panels, such prior art devices have had numerous defects. One principal benefit of the center hold-down described herein is that the panel 160C is drawn more tightly against the underlying hooking clips 226 (or 226C) as the panel is subjected to wind uplift. The reason for this is that the panel is proportioned in such a way that as wind creates a suction over the panel and the panel bows upward, the center span, which is longer than the two outside spans exerts a net force counter to the direction the clip points. That is, when the panel is subjected to a uniform outwardly directed load, as would be encountered in wind uplift, the panel flat areas between the center and side hold-down clips bow upward because the transverse flats of the panel have virtually no transverse bending resistance and the panel forms a catenary between panel hold-down clips.

As the panel 160C bows upward, it will exert both a horizontal and vertical force on the side clips as well as on the center clips. The horizontal force is developed because the flat of the panel becomes a catenary and a catenary requires its end supports to exert both horizontal and vertical forces to resist only a vertical load. This is different than normal beam action which requires that the end of the beam resist only equal and opposite loads to be in equilibrium. Other factors being equal, a longer catenary will exert a greater horizontal and vertical force than a shorter one. Also, the greater the curvature the less the horizontal load required to keep the system in balance.

With reference to FIG. 9A, as flat areas A, B and C of panel 160C bow up as indicated by A1, B1 and C1, this results in a very stiff structurally strong panel in the longitudinal direction. The load delivered to the panel hold-down connector while in this configuration can be divided into components or vectors which are deemed to act both horizontal (parallel to the original panel flat in a transverse direction) and vertical (perpendicular to the original panel flat). The amount and relationship between these two force components or vectors will be determined by the relationship between the spans between panel hold-down connectors and the initial relative tightness of the catenaries, provided other factors such as unit upwardly directed load, material thickness, etc. are constant.

The greater the unit uplift load, the greater the bow between panel hold-down fasteners will become. As the unit uplift load increases, the horizontal component at the end of each bowing panel flat will increase. Since the panel is continuous over the center, non-penetrating, hold-down fasteners, these loads will be off-setting to the extent of the lesser load. The difference between the greater and the lesser loads will be resisted by the non-penetrating, center hold-down fastener. Since the width WB of center span is greater than the widths WA and WB of the two outside spans, the net between the two loads will always be directed in such a way as to pull the panel against the non-penetrating center, hooking clips 224, 226.

Because the center span B between the attachment points is wider than the outside spans A and C, and the three sections composing the panel are joined at the juncture over the center hold-down clips, the net force inward at the center hold-down clips will always be greater than the net force out, thus pulling the panel more tightly against the clips. This is depicted in FIG. 9B where H1 represents the horizontal force that results from the outwardly directed load being applied to flat A of the panel. H2 represents the horizontal load resulting from the outstanding directed load applied to panel flat B. In this configuration H2 will always exceed H1 during uplift and this difference must be offset by the force H3 developed in the center hooking clip 226. Thus, H3 which is opposite to H2 will increase as the load increases, thus forcing the panel 160C more securely against the center hooking clip 226. The opposite effect will occur at the center hooking clip 224 located between WB and WC, and the pair of hooking clips 224, 226 will cooperate to hold the panel 160C securely to the underlying structure.

The total outward force on the center hooking clip 226 resulting from its connection to panel 160C is represented by V1 and will be equal and opposite to the hold-down force V2 required to be exerted by the hooking clip 226. Thus, since forces V1 and V2 are balanced, and the difference between forces H1 and H2 is offset by force H3, the joint is seen to be in equilibrium with the net force holding the panel against the clip.

Although the center hold down mechanism, when properly located, will reduce the force tending to separate the male from the female panel corrugation at the assembled sidelap, the panel female sidelap may still separate from the panel male sidelap as the panel flats A and C bow upwardly to form A1 and C1. If the length of the panel flats A and C are reduced sufficiently in relation to the length of flat B, the forces on the panel sidelap will be reduced accordingly and separation will be minimized.

In summary, FIGS. 5 and 9A both possess similar benefits relating to the strength, watertightness, and economy of the respective roof systems disclosed therein. However, the roof panel member 160 shown in FIG. 5 is rigidly attached to the underlying support structure by means of conventional fasteners such as self-drilling, self-tapping screws. By contrast, the panel 160C shown in FIG. 9 and FIG. 9A is allowed to move longitudinally in relation to the underlying support structure as a result of the clip member 190 and hooking clips 224 and 226.

The roof panel member 160 in FIG. 5 is attached to the underlying support structure with a through fastener in such a manner that the panel and the underlying support structure are rigidly attached. In other words, the roof panel member 160 cannot move in relation to tits underlying support structure at the points of attachment. The benefit of this is that the diaphragm strength of the panel may be used to support the underlying support structure and hold this structure in place. Furthermore, if the underlying support structure is constructed to have sufficient rotational flexibility about its lower point of fixity, or the top of the support structure is not braced so that it can move in the direction of the panel's length, the underlying structure will be allowed to "float" as the panel expands and contracts in response to environmental forces. This is further described in copending U.S. patent application entitled FREE ROOF ASSEMBLY FOR REROOFING A BUILDING STRUCTURE, Ser. No. 08/181,756, filed Jan. 21, 1994, incorporated herein by reference. Further, the roof panel member 160 and the underlying support structure form a cooperative mechanism in which the underlying support structure supports the roof panel member 160 while the roof panel member 160 is free to change length when subjected to temperature changes without detrimentally affecting the performance of the overall mechanism.

The center panel flat B shown in FIG. 9A, by contrast, is attached to its underlying structure in such a manner that the panel is prevented from separating or moving away from its underlying support structure at the center points of attachment. However, the panel may still move longitudinally in relation to its underlying support by means of a sliding mechanism, which is the hereinabove described clip member 190 and hooking clips 224, 226), as illustrated in FIGS. 4, 4A-E, 8, 8A, 9, 9B, 10 and 10A.

FIGS. 11–20

Turning now to a description of the roof panels 24, and consequently of the alternate roof panels discussed above, shown in FIG. 11 is a partial plan view of the roof panel 24 in which the four corners of same are depicted as corners A, B, C and D, respectively. In FIG. 12A, a semi-detailed schematic of the roof panel 24 shows the position of the end lap sealant which is preferably factory installed prior to delivery to a job site. Together with such end lap sealants, the sidelap sealants form selective perimeter preplacement of the panel sealants, the advantages of which will be discussed hereinbelow.

The profiles of the sidelap edges of roof panel 24 are depicted in FIG. 13 in which the male sidelap edge of roof panel 24 is depicted in interlocked relationship with the female sidelap edge an identically constructed roof panel 24A. A description of panel corners A, B, C and D depicted in FIG. 11 will be provided hereinbelow following a discussion of the unnotched sidelap edges shown in FIG. 13. It will be understood that the sidelap seam described with reference to FIG. 13 relates to factory-formed male and female sidelaps that are assembled by elastic deformation, but that other sidelap seams having configurations with similarly advantageous features, such as offset clips that do not intersect the sidelap sealant and which have field roll formed seams may be substituted for the factory roll formed seam described in FIG. 13.

In like fashion to the roof panel member 160 of FIG. 5 discussed above, the mating side edges of the roof panels 24 and 24A of FIG. 13 form a standing seam joint 240. Vertically extending male sidelap portion 242 of roof panel 24 is engaged by vertically extending female sidelap portion 244 of the roof panel 24A. More specifically, female sidelap portion 244 extends along one longitudinal edge of the roof panel 24A and has a first female leg portion 246 which extends upwardly from a medial portion 248A of the panel 24A. Also, the female sidelap portion 244 has a second female leg portion 250 extensive from the first female leg portion 246 and forming an insertion cavity therebetween. The second female leg portion 244 has an upper flat portion 254 and a downwardly extending portion 256. Lower edge portion 258 of the downwardly extending portion 256 is folded and bent inwardly to form an edge retaining lip 260 which has an incline (measured from a plane parallel with the medial portion 248A) as indicated by an arrow at incline 262. The incline 262 can vary over a wide range, and is preferably between about 0 degrees and about 45 degrees.

The male sidelap portion 242 extends along one longitudinal edge of the roof panel 24 and has a first male leg portion 264 which extends upwardly from a medial portion 248 of the roof panel 24. Also, the male sidelap portion 242 has a second male leg portion 266 extensive from the first male leg portion 264 and forming a male apex portion 268 therebetween. Another portion of the second male leg portion 266 is substantially parallel to the upper flat portion 254 of the female sidelap portion 244, thus forming a sealant engaging ramp 270. Lower edge portion 272 of the second male leg portion 266 is folded to form a male exterior edge 274.

The profile of the male sidelap portion 242 is determined in dimensional configuration to be received in an insertion cavity 252 of the female sidelap portion 242. A sidelap sealant 276, which may be factory installed, is adhered to the inner surface of the upper flat portion 254 of the female sidelap portion 244, and upon entry into the insertion cavity 252, the sealant engaging ramp 270 of the male sidelap portion 242 is brought into pressing engagement with the sidelap sealant 276. This is a unique feature of the standing seam joint 240; not only is the sidelap sealant removed from the male apex portion 268 to avoid sealant contact with the clip hook portion 142, the spring like configuration of the male leg portion 266 assures superior performance in sealant to male member contact.

The disposition of the edge retaining lip 260 of the female sidelap portion 244 requires overdriving of the male leg portion 266 during insertion so as to clear the uppermost tip of the edge retaining lip 260, after which the male exterior edge 274 is brought to rest on the edge retaining lip as shown. The closing force required to accomplish this is preferably supplied by a seam roller such as will be described hereinbelow. Also provided hereinbelow with discussion of the seam roller is a discussion of the interaction of the component parts of the standing seam joint 240 during assembly and seaming.

Meanwhile, it will be noted that the configuration of the male leg portion 266 coacts with the female leg portion 250 as leaf like springs that flex during insertion, and once the male exterior edge 274 clears the tip of the edge retaining lip 260, these springing members return to the configuration shown in FIG. 13. However, due to the relative large insertion cavity 252 and the provision of the sealant engaging ramp on the flexible male leg portion 266, there is always adequate space for non-interfering fit of the components of the standing seam joint to correctly join without causing improper bulging joint interference. Improper bulging is caused when the male presses on the sealant so as to cause the sealant to develop sufficient pressure to in turn cause the sidelap sealant 276 to be displaced laterally outwardly and prevent the male exterior edge 274 and the edge retaining lip 260 from seating properly. Furthermore, the springing characteristic of the male leg portion 266, together with the rolling of the lower edge portion 272, facilitates manufacturing of the standing seam joint 240 as these design characteristics greatly diminish dimensional criticality, thus allowing larger rolling tolerances during the sidelap forming.

The standing seam joint 240 is shown in FIG. 13 with one of the clip members 138 positioned such that its upper hook portion 142 is hooked over the male apex portion 268 of the male sidelap portion 242. Also, support shelf 146 of the clip member 138 is shown in underlying support of the roof panel 24 so as to back up the male sidelap portion and hold same in a stable position as the female sidelap portion 244 is placed thereover. The clip member 138 is attached to underlying structure as described hereinabove.

The roof panels 24, 24A are shown having a number of strengthening ribs 278 (only two such strengthening ribs 278 being shown in FIG. 13), the purpose of which is to stiffen the panels, especially in the vertically extending portions and to increase the strength of the section when subjected to longitudinal bending. Strength increase may come from both the stiffening effect of the rib and the work hardening of the material so as to effectively increase its tensile or compressive strength. The panel strengthening ribs, if they do not interfere with other panel functions, may be retained as shown herein, or if their retention interferes with other functions of the panel, the work hardening benefit may be achieved by first forming the panel with the strengthening ribs 278 and then immediately roll forming the panel to remove the strengthening ribs. This selective localized work hardening increases the strength of the panel at critical areas and improves its performance when subjected to live load conditions. This strengthening is also useful in assuring joint snapping integrity, especially when self snapping is the sole form of closing pressure exerted, and the same is still helpful with the employment of a seaming tool.

The insertion cavity 252 of the standing seam joint 240 is especially efficacious in obtaining joint sealant integrity. The substantially parallel upper flat portion 254 and sealant engaging ramp 270 serve to secure the sidelap sealant in abutting engagement to form a sealing dam all along the standing seam joint. At the end lap regions where the sidelap sealant 276 is predisposed to veer to contact the end lap sealants at one side of the insertion cavity 252 with sufficiently arranged space to accommodate this veering. It will be readily understood that the veering of the sealant may be achieved by increasing the effective width of the sealant areas by means of adding filled or factory applied sealant at the end lap areas. This will become more clear in the discussion of the four corner juncture area below, and it is sufficient to note that the sidelap sealant comprises a longitudinal strip of sealant which is supported alternately in a male joint abutting mode in which mode the sealant strip is in abutting engagement with the sealant engaging ramp 270, and in a juncture mode in which the sidelap sealant 276 is in a position to abut the end lap sealants. Further, the sidelap sealant 276 in its male joint abutting mode, is positioned at clip locations to avoid contact with the male apex portion 268 so that the stationary clip members 138 do not tear the sidelap sealant 276 as relative movement occurs between the roof panels 24 and the clip members 138.

This simple, yet important, sealant arrangement is a significant departure from prior art treatment of joint sealant placement. In most cases, the placement of sealant is almost an after thought of the designer, since mastic type sealant is disposable at will in the joint. However, water tightness of the joint suffers from such design treatment, as can be verified by ordinary observation of roofs; roof leaks are probably the most common complaint and certainly one of the least appreciated. In the standing seam joint 240, the design accommodates the longitudinal extension of the sidelap sealant 276 with minimal disturbance (excepting the aforementioned veering at the four corner juncture areas), and with this preestablished disposition of the sidelap sealant strip, the abutting components of the joint uniformly interact therewith to enhance water tightness integrity.

The sidelap sealant 276 preferably is comprised of a resilient material such as closed cell foam, but it may also consist of a flowable (butyl type) material. Both of these sealants are conventionally employed in the building art, and are thus well known to a person of ordinary skill in this art. FIG. 14 shows an alternate and unique combination sealant 280 in which both a resilient foam and flowable materials are utilized. A first foam sealant portion 282 has a channel 284 formed in its bottom surface 286. The channel 284 is filled with a second sealant portion 288 which is a flowable type of sealant material. The second sealant portion 288 may have a protruding exterior meniscus 290 for wetting contact with abutting joint components. The advantage of the combination sealant 280 is that the body of the sealant is readily maintained in resilient damming action while the flowable sealant portion assures contact even should compressive forces diminish in any given zone along the joint. Another, and perhaps the principal, reason for the combination sealant 280 is that the closed cell foam retains a more nearly constant durometer throughout a wide temperature range while the flowable sealant does not. On the other hand, the flowable material will flow into cracks and crevices at a panel joint to seal off these channels while the closed cell foam will not.

Figure 12:
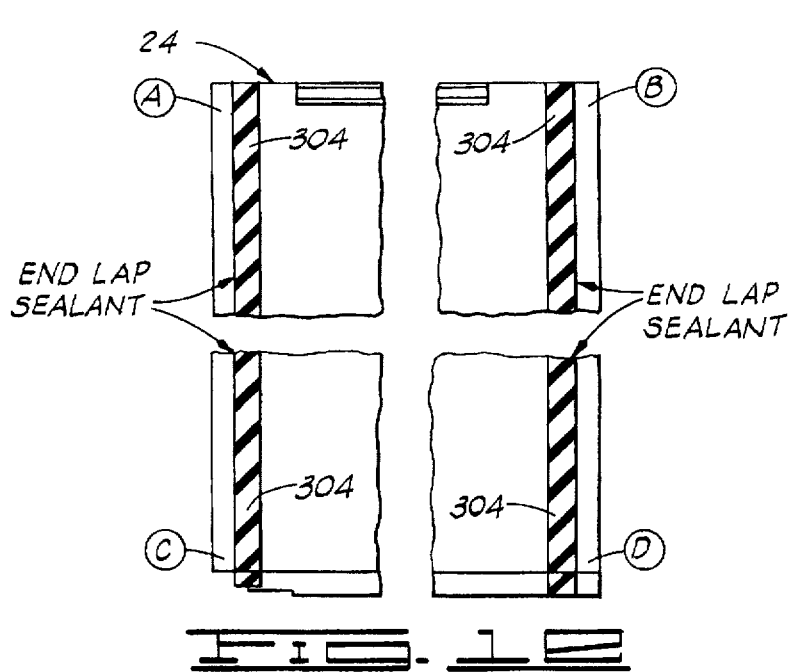
FIG. 12 is a partial plan view of a roof panel member usable in the roof system of FIG. 1, showing the position of a portion of the endlap sealant.

Returning now to FIG. 11, wherein is shown portions of the roof panel 24 in plan view, along one longitudinal edge is disposed the upstanding male sidelap portion 242, and along the opposing longitudinal edge there is disposed the upstanding female sidelap portion 244. Selective notching of the male and female sidelap portions occur at the corners A, B, C and D in order to facilitate interlapping with contiguously disposed roof panels. FIG. 11 displays this notching, as follows: at corner A, notch A extends from lateral edge 292; at corner B, notch B extends from opposing lateral edge 294, and external side edge 296 of the male sidelap portion is swaged to feather it slightly inward; at corner C, notches C1 and C2 extend from the lateral edge 292; and at corner D, there is no notch. Notch B is shown in FIG. 11 before optional swaging and in FIG. 15A after same. The elevational profile of these notches will become clear with the discussion below. Sealant may be factory applied across one end of the roof panel 24 as indicated in FIG. 12, which shows the positioning of same.

FIGS. 15A through 15C depict the placement of four contiguously disposed and interlapped panels at a four corner juncture area 300; these interlapped panels will be designated 24, 24A, 24B and 24C, all of which are of similar construction. The roof panel 24 has the unique ability of being installed both in a left to right or a right to left laying progression. It also possesses the unique ability of being attached with a one piece clip that slides on or moves in relation to the top of the male corrugation. This feature is a unique advantage but requires a special configuration be incorporated in the end lap joint and may be utilized in other standing seam panel side laps in which the top of the male corrugation and the side lap sealant do not coincide. (i.e. the sealant is moved outside of the top of the male corrugation so the clip may slide on the top of the male without breaking the side lap sealant seal such as occurs in FIGS. 30, 31, 33 and 34.) Returning to FIGS. 15A through 15C, an upslope direction 302 is indicated by the arrow thusly marked, and corner A of roof panel 24 is downslope on the first panel installed in this instance. (FIG. 15A) Corner B of roof panel 24A is lapped over corner A of roof panel 24, which has an optional factory applied end lap sealant placed thereon as shown. Corner B has a slotted hole 304 that is disposed over slotted hole 304 of Corner A. Next (FIG. 15B), corner C of panel 24B is positioned to interlock its female sidelap portion 244B over the male sidelap portion 242 while placing corner C adjacent to the panel 24B as shown. Then (FIG. 15C), panel 24C is positioned to interlock its female sidelap portion 244C over male sidelap portion 242A of roof panel 24A and over substantially all of the notched portion (C2) of the female sidelap portion 244B of panel 24B, and to position corner D adjacent to corner B while overlapping corners A and C as shown.

As shown in FIGS. 15C and 15D, notch C2 of panel 24B is slightly longer than the overlapping portion of corner D of panel 24C which when assembled is designed to line up with corner B. That is, a lateral edge 294C of panel 24C (at corner D) will theoretically line up with lateral edge 294A of roof panel 24A (at corner B). However, in actual practice, the underlying supporting structure is often misaligned or out of square, and it may be necessary to move the position of corner D so that lateral edge 294C is out of line with lateral edge 294A by as much as about one eighth of an inch or more. The extra length of notch C2 permits this adjustment without metal interference, and the slotting of holes 304A an 304B permits this positioning while yet lining up these holes sufficiently to permit the passage therethrough of the connecting screw fasteners.

FIG. 15D is an elevational view of the four corner juncture area 300 showing portions of each of the corners A, B, C and D as these corners interlap. FIGS. 15E and 15F depict views taken as indicated in FIG. 15D. In FIG. 15E, the notches in roof panels 24 and 24A (corners A—notch A and corner B—notch B) in the male sidelap portions 242 and 242A, respectively, have removed the upper parts of these sidelaps so that the first male leg portions 264, 264A extend into sealant 276C carried by the over extending female sidelap portion 244C. The notch C1 in panel 24B has cut a first female leg portion 246B of the panel in noninterfering disposition as shown. In FIG. 15F, notch C2 has removed a small portion of a flat portion 254B and a downwardly extending portion 256B of a second female leg portion 250B so that a substantial portion of upper flat portion 254B is received in an insertion cavity 252C. In this latter view, it will be seen that a sealant 276B is indented by the male leg portions 264, 264A. The other sealants also are displayed, denoting the complete sealant damming that is effected.

Figure 15G:
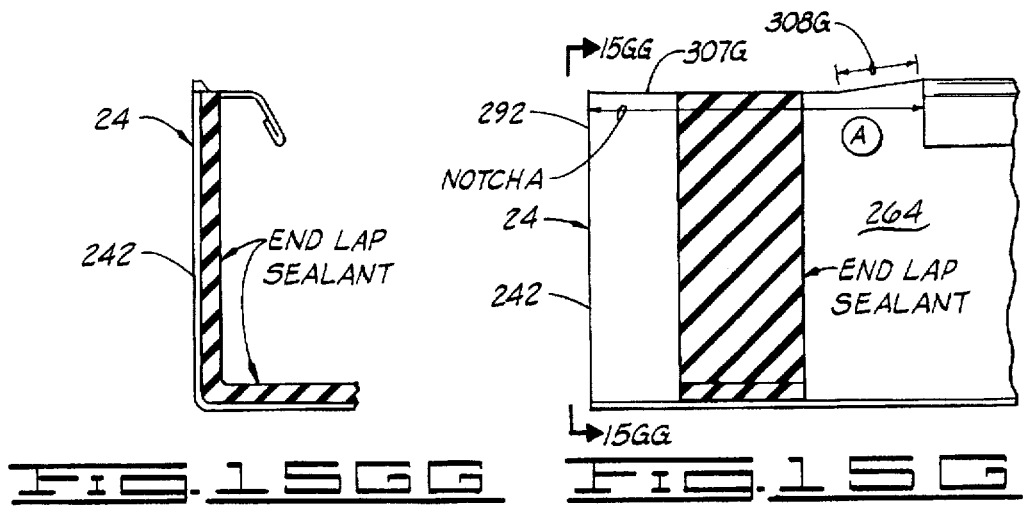
FIG. 15G is a partial detailed, elevational side view of corner A of the roof panel member of FIG. 11.

Another view of the sealant placement and notching is depicted in FIGS. 15G through 15J. FIG. 15G is a partial side view of corner A of the roof panel 24 in which is shown the end lap sealant extending along the vertical male leg portion 264 of the male sidelap portion 242, also shown in the end view of FIG. 15GG. Notch A, extending as shown, has a horizontal edge 307G, and an angularly disposed sealant fillet 308G extends from the edge 307G upwardly, thereby serving as a transition between horizontal edge elevations of notch A. This is an important feature of the present invention in that the sealant fillet 308G avoids the open areas that result in the abrupt edges found in prior art corner notching wherein the sealant, unable to make sharp turns, is often unsupported (separated from the panel) at notch corners and creates an opening through which water can pass to the interior of the building. Contrary to such prior art notching, the sealant fillet 308G provides continuity of sealant contact, leading to water tightness enhancement at the four corner juncture area 300.

Figures 15H, 15J:
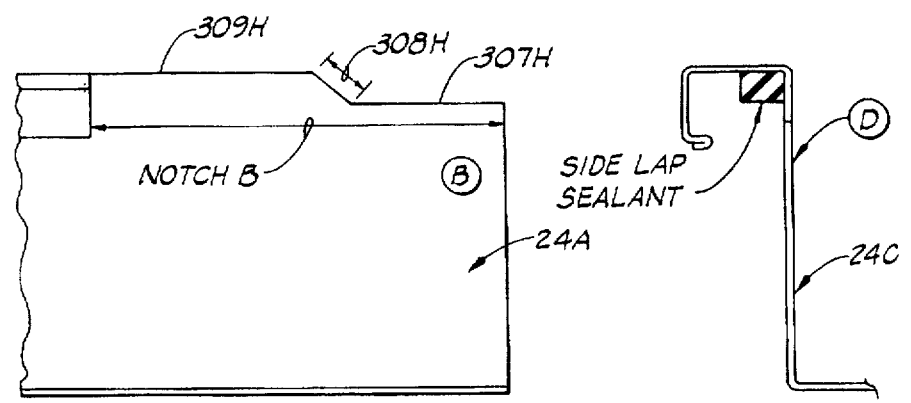
FIG. 15H is a similar view of corner B of the FIG. 11 roof panel member.
FIG. 15J is a partial detailed, elevational end view of corner D of the FIG. 11 roof panel member.

FIG. 15H shows a similar view of the corner B of roof panel 24A. Notch B, extending as shown, has a lower horizontal edge 307H and an upper horizontal edge 309H, with an angularly disposed sealant fillet 308H that serves to transition between the horizontal edge elevations of Notch B. The sealant fillet 308H serves the function discussed above with regard to the sealant fillet 308G (FIG. 15G).

FIG. 15I shows a partial end view of corner C of panel 24B, with an end view there shown in FIG. 15II. Notch C2, extending as shown, exposes the sidelap sealant of panel 24B, and the end lap sealant is adhered along the panel to extend up the female leg portion 246B of the female sidelap portion 244B and on the female leg portion 250B (actually, the end lap sealant is only partially supported at the female leg portion 250B as the sealant partially extends without support above leading sloping edge 209I.

FIG. 15J is a partial end view of corner D of panel 24C showing sidelap sealant veered to its edge engaging mode in order to be sealingly contacted with the upstanding male leg portions (as at 264 and 264A in FIG. 15E).

FIGS. 16A through 16F, to be explained more fully below, display the installation sequence when the roof panel 24 is used on the opposite roofing slope. Meanwhile, completion of the four corner juncture area 300 will be described by referring to cinch strap 310 assembly shown in FIG. 17 which comprises a bar strip 312 that has a length dimension 314 which extends between the male and female sidelap portions of the roof panel 24. For simplifying this discussion, the bar strip 312 is depicted as a straight member, but it will be understood that the medial portion of the bar strip will be configured to fit over any corrugation crowns that the roof panel 24 (or appropriate panel) may have. The first end 316 of the bar strip 312 has a joint strap 318 portion that is shaped to fit over the standing seam joint 240. The joint strap 318 has a first leg portion 320 and a second leg portion 322 interconnected by a generally horizontal portion 324. The second leg portion 322 has an angular set as shown, and base leg portion 326 extends from the distil end thereof. A plurality of holes 328 are disposed along the cinch strap 310 which are predetermined to overset the slotted holes 304 in the ends of the roof panel 24. When the joint strap 318 is placed over the standing seam joint 240, the leg portion 326 is forced against the medial portion of roof panel 24, and as indicated by the dashed lines 322A and 326A, which depict the final position of the joint strap 318 (just before attachment), the leg portion 322 is shorter than the leg portion 320 by a distance 330 which is greater than the thickness of the bar strip 312. Thus, when the base leg portion 326 is forced against the medial portion of the roof panel 24 by screw fasteners, the joint strap 318 will be caused to compress the standing seam joint 240 whereupon sealing integrity is enhanced. Finally, at the other end 332 an upstanding lapped leg portion 334 is disposed. When the cinch strap 310 is overlapped by the joint strap 318 of a contiguous cinch strap of identical construction, the lapped leg portion 334 is secured therein.

To secure the cinch strap 310 in place over the four corner juncture area 300, a companion backup plate 340, shown in FIG. 18, is provided. When installing the cinch strap 310 assembly, the screw fasteners that are placed through the holes 328 and 304 of the cinch strap 310 and roof panels 24 respectively, a nut plate is provided since the thin gage panel material is not usually suitable to distribute the screw fastener compression load over the desired compression area or retain long term compression integrity of the juncture area 310. This nut plate must either be held in place by a worker under the panels, which is usually not feasible, or it must be held in position by mechanical means. The present invention presents a novel mans of placement and retention of the backup plate 340 prior to installing the cinch strap 310.

Returning to FIG. 11, a plurality of stirrup connectors 342 are disposed near the lateral edge 292 or the lateral edge 294 of the roof panel 24. While the stirrup connectors 342 are shown at both ends of the roof panel 24, this is illustrative only, and it will be understood that such stirrups may occur only on the bottom one of the end lapping panels. An enlargement of one of the stirrup connectors 342 is shown in FIG. 19, this connector comprising a support platform 344 which is partially cut from the panel metal and embossed downwardly. As shown in FIGS. 19A and 19B, the support platform 344 has a pair of supporting side walls 345 and is open at ends 346 and 348, with end 346 having an entry lip 350 turned slightly downward. A pair of detent ribs 352 are embossed to extend upwardly from the upper surface of the stirrup connector 342.

With further reference to FIG. 18, the backup plate 340 comprises an angularly profiled member having an upper planar surface 354 with plural guide holes 356 disposed to align with slotted holes 304 that are disposed near the ends of roof panels 24 and 24A. The length of the backup plate 340 is sufficient to back up the cinch strap 310 assembly. As also shown in FIG. 20, relief areas 358 are cut in the backup plate 340 to expose a pair of extensive stirrup engaging tabs 360 that are spatially determined to be slidably received by the pair of extensive stirrup connectors 342 supported beneath roof panel 24 near lateral edge 292. Each such stirrup engaging tab 360 has an embossed detent rib 362 as is viewable in FIG. 20. When the stirrup engaging tab 360 is moved into the opening at end 346, it passes unrestrictedly and its detent rib 362 passes over the detent ribs 352. These latter mentioned detent ribs 352 serve to resist removal of the stirrup engaging tab 360 once it is in support engagement with the support platform 344, thus assuring retention of the backup plate 340 beneath the lower most roof panel 24 at the four corner juncture area 300. The stirrup engaging tabs 360, having an arrow point shape as shown, serve to guide the backup plate 340 during assembly into its proper position. The dimensions of the relief area is determined such that tab edges 363 are brought to rest against the ends of the side walls 345 of the stirrup connectors 342. Further, tab edges 366 of the stirrup engaging tabs 360 are disposed to be in near proximity to the side walls 345 of stirrup connectors 342 once the backup plate 340 is installed, thus disposing the backup plate with a degree of precision placement that assures proper alignment of the guide holes 356 (of backup plate 340), slotted holes 304 (of the lapping panels) and 328 (of the bar strip 312 of the cinch strap 310 assembly). This aligning feature of the present invention facilitates the installation of the cinch strap 310 assembly and assures quality end lap sealing.

With the backup plate 340 in place, screw fasteners are placed through the holes 328 (in the cinch strap 310 assembly) and slotted holes 304 (in the overlapping roof panels), and threadingly engaged with the guide holes 356 in the backup plate 340, which, like the bar strip of the cinch strap, is of sufficient thickness to endure the compressive force generated on the four corner juncture area to ensure water tightness integrity. It will be understood that the backup plate may be used at sidelaps as well as endlaps, as desired, to increase the stiffness of the roof panels and to provide resistance to unfurling and unzipping of the standing seam.

An alternative backup assembly to be used in lieu of the backup plate 340 is shown in FIG. 18A. The backup plate 340 is a separate component which is supported beneath the bottom panel at the lapping area via the stirrup connectors 342 formed in the roof panel 24 as required. A backup assembly 340A is formed integrally with the modified roof panel 24E shown in FIG. 18A. The panel 24E is the same as described above for roof panel 24 with the exception that a lateral edge 292E of the panel flat is extended and is form bent to have a plurality of stiffening runs 364 beneath the end of the panel 24E, as shown more clearly in the enlarged cross sectional view of FIG. 18B. A nut platform 367 is shaped to extend from the stiffening runs 364 just beneath the panel flat, and holes 368 are formed therein just below, and registered with, the slotted holes 304 in the panel 24E. Preferably, the holes 368 are punched and tubulated into, or with, the slotted holes 304 so that the walls of the holes 368 project into the slotted holes 304 in the manner shown. The stiffening runs 364, provided in the number, shape, and dimension necessary, serve to strengthen the panel flats at the four corner areas, and the holes 368 are appropriately sized such that the nut platform 367 serves as an integrally formed nut for the screw fasteners that secure the cinch strap 310 assembly to the four corner juncture area.

As mentioned above in the discussion of the four corner juncture area 300, FIGS. 15 through 15F depicts the lapping sequence of installing the roof panels 24 with the roof upslope direction being that indicated by the upslope direction 302 arrow. The roof panels are unique in that progression of panel installment can also proceed in similar fashion when the roof upslope direction is reversed, as when dealing with the roof section on the other side of the roof ridge. FIGS. 16A through 16F depict this lapping procedure when the upslope direction is that indicated by arrow 302R. The same numerical designations will be used in FIGS. 16A–16F to indicate identical components appearing in FIGS. 15A–15F.

In FIG. 16A, the upslope direction of the underlying support structure is depicted by arrow 302R, and corner B of roof panel 24A is now downslope. Corner A of roof panel 24 is lapped over corner B and on top of the end lap sealant that is preferably factory installed on roof panel 24A in the position shown. Next (FIG. 16B), corner D of panel 24C is positioned to interlock its female sidelap portion 244C over the male sidelap portion 242A at corner B. End lap sealant is disposed on panel 24C as shown, preferably at the factory. Then (FIG. 16C), panel 24B is positioned to interlock its female sidelap portion 244B over the male sidelap portion 242 of roof panel 24 and over the female sidelap portion 244C of corner D (panel 24C).

FIG. 16D is an elevational view of a four corner juncture area 300R showing portions of each of the corners A, B, C and D as these corners interlap. The notching of the panels is the same as discussed above with regard to four corner juncture area 300, so it is sufficient to note only the differences thereof relative to comparing the view of FIG. 16E to that of FIG. 15E, and the same is true relative to a comparison of FIGS. 16F and 15F. It will be noted that the bottom panels in FIG. 16E are roof panels 24A and 24C, and that the first female leg portion 246B (corner C of panel 24B) is now outboard to the female sidelap portion 244C (corner D of panel 24C). The notched first male leg portions 264, 264A (of corner A and corner B, respectively), although reversed in order, still abut the sealant 276C in the insertion cavity 252C of panel 24C. As depicted in FIG. 16F, the notched upper flat portion 254B (corner C, panel 24B) overlaps the female sidelap portion 244C (corner D, panel 24C) with sealant 276B therebetween. After sealant is placed over the juncture area 300R, the above described cinch strap 310 and backup plate 240 are joined via appropriate screw fasteners to cooperatively compress the lapped area.

FIGS. 21-22B

As mentioned hereinabove for factory roll formed panels, in reference to assembling the standing seam joint 240, the closing force required to achieve the interlocking of the male and female sidelap portions 242, 244 of the roof panels 24, 24A (as shown in FIG. 13) is preferably supplied by a seam roller 370 such as shown in FIG. 21. The closing, or seaming, of the standing seam joint 240 will be discussed following a description of the seam roller 370 and an alternate thereof. It will be understood that a field roll seaming machine, which configures the panel to the desired shape, may be employed for panels whose shape incorporate configurations as shown hereinbelow with respect to FIGS. 30, 31, 33, and 39.

With reference to FIGS. 33, 33A and 33B, the seam roller 370 comprises frame member 372 having a forward end 374 and a rearward end 376. A male insertion assembly 378 is supported by the forward end 374, and a female backup assembly 380. The male insertion assembly 378 comprises a first support arm 382 preferably welded to extend normally to the frame 372 and supporting an upstanding second support arm 384 that supports a shaft 386. A male insertion wheel 388 is rotatingly mounted on the shaft 386 and is disposed for engagement with the underside of the male sidelap portion 242 as shown in FIG. 21A which is an end view of the seam roller 370.

The female backup assembly 380 has a support shaft 390 which is supported by the frame member 372 near its rearward end 376 to extend generally parallel to the first support arm 382. A female backup wheel 392 is rotatingly supported by the support shaft 390 and has a tracking groove 394 which is dimensioned to accept and track the female sidelap portion 244 of the roof panel 24A as shown in FIG. 21A.

The frame member 372 preferably is a tubular member having a minor angular bend 396 generally near the forward end 374, and a handle member 398 (partially shown in the drawing) extends from the rearward end 376 at an annular disposition or bend 400. The handle member 398 extends a selected distance and has a pair of hand grips 402 extensive from each side thereof.

Once the female sidelap portion 244 has been positioned over the male sidelap portion 242 (in the assembly process of installing adjacent roof panel members), interlocking of these female and male portions is achieved as follows. A workman, holding the handle member 398, causes the male insertion wheel 388 to be placed beneath the male sidelap portion 242 in the manner depicted in FIG. 21A. Next, the workman, by rotating the handle member 398 toward the standing seam joint 240, causes the female backup wheel 392 to bear upon the top of the female sidelap portion 244 as shown in FIG. 21B. The relational positions of the male and female backup wheels 388, 392 are determined such that the leverage of the handle rotation causes the male sidelap portion 242 to be forced into the insertion cavity 252 of the female sidelap portion 244, as shown, above the male insertion wheel 388. Finally, the workman need only pull or push the handle member 398 along the length of the standing seam joint 240 with the handle member 398 in this position to force sealing interlocking of the male and female sidelap portions 242, 244. Once this has been achieved, disengagement of the seam roller 370 is accomplished by the workman rotating the handle member 398 away from the standing seam joint 240 and removing the male insertion wheel 388 from under the male sidelap portion 242.

Figure 34:
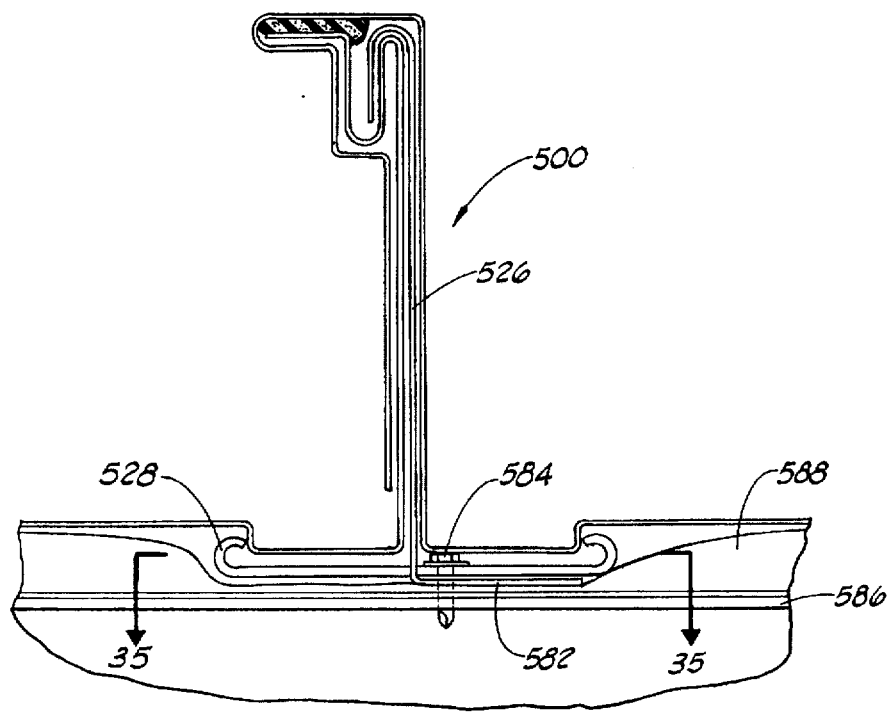
FIG. 34 is an expanded view of the standing seam assembly.

Another embodiment of a seam roller constructed in accordance with the present invention is shown in FIGS. 34 and 34A-34B wherein seam roller 410 comprises a frame member 412 having an upper channel shaped member 414 having a tracking groove 416 and having upturned flared edges 417 at the ends thereof. The tracking groove 416 is dimensioned to accept and track the female sidelap portion 244 of the roof panel 24A. The member 414 serves as a backup assembly similar to that of the female backup assembly 380 described above the seam roller 370 (FIG. 21). A male insertion assembly 418 comprises a generally channel shaped member 420 and a pair of spring biased hinges 422 which interconnect the member 420 and the member 414, the hinges 422 being biased to rotate the member 420 in the direction indicated by arrow 424.

The male insertion assembly 418 also comprises a latch assembly 426 which is supported by the frame member 412 generally between the hinges 422. The latch assembly 426 forms a groove between itself and the frame member 412 and a bolt plate 430 is disposed for sliding therein, the bolt plate 430 having ag ripping portion 432 formed to extend generally normal to its body portion and having an extending tab 434 that is clearingly received in a slot 436 such that the movement of the bolt plate 430 is selectively permitted between a downward locking mode shown in FIGS. 22 and 22B, and an upward unlocking mode shown in FIG. 22A. The lower edge 438 of the bolt plate 430 is beveled to reduce interfering contact with the member 420, the member 420 being rotatable in a direction indicated by arrow 440 as a workman forces the bolt plate 430 downward to its locking mode via the gripping portion 432. In the locking mode, the bolt plate 430 extends below the lower edge of the member 414. When a workman pulls up on the gripping portion 432, the bolt plate 430 is retracted from engagement with the member 420, thus permitting the biasing hinges 422 to rotate the member in the direction shown by arrow 424.

The channel shaped member 420 has a male insertion portion 442 that is supported for engagement with the underside of the male sidelap portion 242 as shown in FIG. 22B when the bolt plate 430 is placed in its locking mode. The male insertion portion has an upper edge 444 as depicted by the dash lines in FIG. 22, with a rounded apex 446 being the contact with the male sidelap portion 242.

The seam roller 410 further comprises a handle assembly 448 that connects to the frame member 412 as follows. A pair of upwardly extending support plates 450 support a support rod 452 therebetween, and an apertured slide member 454 is slidably supported on the support rod 452. Preferably, the support rod 452 is as at flatted 456, as is the aperture in the slide member 454, in order to orient the slide member as depicted in FIG. 22. The slide member 454 has an angular upper portion 458 to which a handle member 460 is attached. A pair of hand grips 462 extend from opposite sides of the uppermost portion of the handle member 460.

Once the female sidelap portion 244 of a panel, such as roof panel 24A, has been positioned over the male sidelap portion 242 (such as of panel 24), interlocking of these members to form the standing seam joint 240 is achieved as follows. A workman, places the frame member 412 of the seam roller 410 over the female sidelap portion 244, causing the tracking groove 416 to rest on top of the female sidelap portion. Next, the workman forces the bolt plate 430 into its locking mode which rotates the male insertion assembly 418 so as to cause the apex 446 of the male insertion portion 442 to drive the male sidelap portion 244 into the insertion cavity 252 of the female sidelap portion 244. As the workman pulls or pushes, the seam roller 410 along the length of the standing seam joint 240 using the handle 460, the cooperative effort of the male insertion portion 442 and the tracking groove 416 of the frame member 412, which serves as a female backup member, causes sealing interlocking of the male and female sidelap portions 242, 244. Once this has been achieved, disengagement of the seam roller 410 is accomplished by the workman simply pulling the bolt plate 430 into its unlocking mode which frees the male insertion assembly 418 to be rotated, via its spring hinge members 422, out of engagement with the standing seam joint 240, and the seam roller is then lifted therefrom.

Having now described the unique standing seam joint 240 (FIG. 13) and the seam roller 370 (FIG. 21), together with alternate seam roller 410 (FIG. 22), attention will now be directed to the dynamics of seam rolling as it relates to the present invention. With typical snap-together, standing seam joints it is possible to apply considerable force to the top of the female portion of the corrugation and the bottom of the male corrugation to force the male and female components into seating engagement. However, in the standing seam joint 240 of the present invention, the only force available to cause the male exterior edge 274 and the edge retaining lip 260 to become properly engaged is the residual elasticity in the male and female leg portions 266, 250. Sometimes the residual elasticity of these components is not sufficient to cause them to seat properly because of imperfection in the formation or assembly of the panel and the fact the forward portion of the panel not yet joined is elastically holding the joint apart so as to prevent these components from seating properly.

As shown in FIG. 21, there is a point where one joint edge actually crosses the other joint edge at an angle. It is only as the snap together process passes this point that the male edge may actually become seated or fully engaged by the female edge. As the snapping process continues, and as the resistance to nesting lessens as the cross-over point proceeds down the panel, the male exterior edge 274 begins to slide down the edge retaining lip 260. By this time the two vertical forces driving the joint together has likewise moved down the length of the panel and it remains for the residual forces to seat the male and female edges properly. However, at this point, there is a force exerted by the sidelap sealant 276 which tries to separate the joint components, and there is a mutual residual elasticity trying to force the male exterior edge 274 into nesting engagement with the edge retaining lip 260.

By having the inclination of the male leg portion 266 greater than the edge retaining lip 260 of female leg portion 250, it is possible to minimize the continued frictional engagement of the contacting portions of these two components and greatly encourage them to seat properly. If this is coordinated with an appropriate but limited amount of oversnap, it is possible to achieve a very desirable configuration with favorable seaming, or joining, characteristics. This will become clear as seaming of the standing seam joint 240 is considered.

With continued reference to FIG. 13: during the seaming operation, as the male exterior edge 274 clears the upper most part of the edge retaining lip 260, compression on the sidelap sealant 276 caused by the seam roller 370 is at the maximum. As soon as the male exterior edge 274 begins to slide down the incline of the edge retaining lip 260, the compressive force on the sidelap sealant 276 begins to diminish and the force required to drive the male exterior edge 274 along the incline of the edge retaining lip 260 begins to diminish. However, if the angle 262 of the edge retaining lip 260 is more than about 30 degrees, the sidelap sealant 276 must be too severely over compressed and friction between the male exterior edge 274 and the edge retaining lip 260 is increased accordingly, thus preventing initial movement of the male exterior edge 274 past the upper most portion of the edge retaining lip 260. This process is facilitated if both edges of these engaging components are smooth and rounded, as shown, to enhance movement therebetween.

FIG. 23

Turning now to FIG. 23, depicted therein is an improved interlocking sidelap joint assembly 130, shown in partial cross-sectional, elevational view and which is a female/male interlock seam assembly formed by the interlocking engagement of contiguously placed roof panels 132A and 132B. The roof panel 132A has a female sidelap joint 134 formed along one side thereof, the female sidelap joint 134 having a first leg portion 136 and a second leg portion 138 extending therefrom and forming an insertion cavity 140 therebetween. A mastic cavity portion 142 is formed at the apex juncture of the first leg portion 136 and the second leg portion 138, the mastic cavity portion 142 having communication with the insertion cavity 140.

Along the opposing side (not shown) of the roof panel 132A there is formed a mating male sidelap joint which is identical in construction to that shown in FIG. 23 as male sidelap joint 144, it being understood that the female sidelap joint along one side of the roof panel 132A being matingly interlocked with the male sidelap joint of the contiguously placed roof panel 132B. Accordingly, a description of the male sidelap joint 144 in relation to the roof panel 132B will be as well a description of the male sidelap joint disposed along the opposing side of the roof panel 132A. Further, it will be understood that the roof panel 132A has a medial panel portion (not shown) as previously described for the roof panel, and as shown in FIG. 23, the first leg portion 136 of the female sidelap joint 134 extends substantially normal (at about a 90 degree angle) to the medial panel portion. Also, the male sidelap joint 144 has a first leg portion 146 that extends substantially normal to the medial panel flat portion (not shown) of the roof panel 132B, and a second leg portion 148 extends angularly from the first leg portion 146 and forms an apex portion 150 at the juncture of the first and second leg portions 146, 148. As will be discussed below, the apex portion 150 is formed for entry into the upper mastic cavity portion 142 when the male sidelap joint 44 is inserted into the insertion cavity 140 of the female sidelap joint 134.

Returning to the female sidelap joint 134, it will be noted that the second leg portion 138 extends normally to the first leg portion 136 to provide an upper flat portion 152 to the female sidelap joint 134; also, another downwardly extending portion 156 are provided, with the latter portion 156 forming a shoulder stop 158. The second leg portion 138 has an edge engaging ramp 160 which extends generally toward the first leg portion 136 and partially blocks the opening to the insertion cavity 140. Further, it will be noted that the second leg portion 148 of the male sidelap joint 144 has a shoulder engaging portion 162 shaped to nest against the shoulder stop 158, and the end of the second leg portion 148 defines a ramp engaging edge 164.

When assembled, the female sidelap joint 134 of the roof panel 132A is positioned over the male sidelap joint 144 which has been previously positioned to rest upon several clip support members 52 along the side of the roof panel 132B, and supported by upper portions 98 thereof, which serve to backup the flexible sheet metal of the male sidelap joint 144. As the male sidelap joint 144 is caused to enter the insertion cavity 140, the first leg portion 146 of the male sidelap joint 144 is disposed substantially parallel to the first leg portion 136 of the female sidelap joint 134; and the second leg portion 138 of the female sidelap joint 134 is caused to flex open as the ramp engaging edge 164 presses against the edge engaging ramp 160, causing the mouth of the insertion cavity 140 to enlarge to receive the male sidelap joint 144. As the male sidelap joint 144 is caused to be received into the insertion cavity 140, the apex portion 150 of the male sidelap joint 144 is projected into the mastic cavity portion 142, which is partially filled with a first mastic material 166, such as a bituminous material.

As this is occurring, the ramp engaging edge 164 is sliding along the edge engaging ramp 160 and finally, the shoulder engaging portion 162 is brought into abutting engagement with the shoulder stop 158. The dimensions of the second leg portion 138 and the second leg portion 148 are predetermined such that the shoulder engaging portion 162 is in abutting engagement with the shoulder stop 158 when the ramp engaging edge 164 is at or near the center of the edge engaging ramp 160. The ramp engaging edge 164 and the edge engaging ramp 160 are positioned so that at least one edge of ramp engaging edge 164 bites into edge engaging ramp 160 as environmental forces tend to disengage the two. Further, the edge engaging ramp 160 may be provided a knurled top surface 168 so as to resist disengaging movement of the ramp engaging edge 164 and ramp engaging edge 164 may be sharpened to bite into the edge engaging ramp 160. Once assembled, the second leg portion 138 and the second leg portion 148 return to substantially their nonflexed positions after the male sidelap joint 144 is matingly received within the insertion cavity 140 of the female sidelap joint 134. Configuring the second leg portion 148 so that theoretically it is fully engaged with the second leg portion 138 when the ramp engaging edge 164 is at or near the mid point of the edge engaging ramp 160 allows the male sidelap joint 144 and the second leg portion 138 to be fully engaged and locked together even through minor manufacturing imperfections cause some deviation from theoretical and locking can occur above or below the mid point.

The above described arrangement provides a standing seam assembly whereby the apex portion 150 of the male sidelap joint 144 is caused to penetrate the mastic cavity portion 142 and to reside therein at a position determined by the locking engagement of the shoulder engaging portion 162 and ramp engaging edge 164 of the second leg portion 138 between the shoulder stop 158 and the upper portion of the edge engaging ramp 160, respectively. This locking engagement prevents relative movement between the female sidelap joint 134 and the male sidelap joint 144, preventing fretting of the first mastic material 166 with the movement that occurs because of thermal expansion and contraction or roof loading that occurs to the roof panels 132A and 132B.

As discussed hereinabove, a plurality of hold down clips 56 are supported by the underlying building structure and disposed to interlock over the apex portions of the male sidelap joints in order to connect the standing seam assembly to the building structure. Such hold down clips 56 are usually hooking members of about three to four inches in length. Accordingly, the female/male sidelap joint assembly 130 must accommodate the intrusion of such clips at every bar joints or purlin intersection. Shown in FIG. 23 is one such location as the upper portion 58 of the hold down clip 56 is hooked over the apex portion 150 of the male sidelap joint 144. The placement of such hold down clips 56 is performed prior to interlocking the female and male sidelap joints 134, 144, and as insertion is completed, upper portion 58 is caused to project into the mastic cavity portion 142 and thus into the sealing engagement with the first mastic material 166.

As further insurance against this disengagement of the assembled female and male sidelap joints 134, 144, end portion 170 of the upper portion 58 is disposed to come into near proximity to a knurled clip retention surface 172 on the inwardly extending portion 156 of the second leg portion 138 of the female sidelap joint 134. By "nearing proximity" it is intended herein to denote that the several elements under consideration in the assembled position are dimensionally predetermined such that the end portion 170 is caused to be brought into close proximity (that is, either directly abutting or clearing same by a very small gap) so that the end of end portion 170 will bite into the surface 172 as uplift forces tend to separate one panel from the other. During insertion, the opening action of the second leg portion 138 of the female sidelap joint 134 relative to the first leg portion 136 has permitted entry of the male sidelap joint 144 with its accompanying hold down clip 56; however, once the portions of the female and male sidelap joints 134, 144 are relaxed in the assembled position thereof, any force tending to cause separation of these two joints will cause the end portion 170 to be brought into engagement with the clip retention surface 172, thereupon providing another force that resists disengagement of the female and male sidelap joints 134, 144. An encapsulating seal 174 is disposed in the inner cavity of the upper portion 58 which encapsulates the apex portion 150 in the assembled position to provide a positive seal between the upper portion 58 and the apex portion 150 of the male sidelap joint 144.

The top of the female/male sidelap joint assembly 130 is believed unique in that the mastic cavity portion 142 is relatively large as compared to prior art mastic cavities and prior art standing seam assembly joints. Further, the final assembled position of the apex portion 150 (and its accompanying upper portion 58) within the mastic cavity portion 142 is offset from the center of the mastic cavity portion 142 so that screw attachment of a flashing sheet 176 is possible where required, such at roof or gutter edges. The sheet metal flashing sheet 176 can be supported on the upper flat portion 152 of the female sidelap joint 134, and a conventional sheet metal screw 178 can be used to secure it thereto. Sufficient space is provided in the mastic cavity portion 142 that, together with the offsetting of the apex portion 150, the screw 178 can penetrate the top of the female sidelap joint 134 without risk of penetrating the apex portion 150 or the upper portion 58. Further, a locator groove 180 can be provided in the upper flat portion 152 as an aid in positioning and guiding the screw 178, and a mastic bead 181 can be placed on the underside of the flashing sheet 176 so as to be sealingly adhered to the upper flat portion 152 when secured thereto.

Another feature of the mastic cavity portion 142 is the provision of a second mastic material 182 within the mastic cavity portion 142 under the locator groove 180 so as to contact and seal about the penetrating screw 178. The difficulty with most prior art standing seam joint assemblies is that with most prior art standing seam joint assemblies is that hydraulic pressures are generated on the mastic during joint assembly as the mastic is being penetrated by the male sidelap joint, which often causes joint opening, especially at the clip attachment points. In prior art joints, if the mastic is caused to fill the entire mastic cavity, hydraulic pressure is built up with the insertion of the male joint member. That is, the displacement of the mastic in such prior art joints, especially at lower ambient temperatures at which the mastic becomes viscous, can and often does force the female and male sidelap joints to separate. On the other hand, if the movement of the male joint member in the mastic cavity caused by environmental influences causes the mastic to be worked out of the joint with the fretting action of the male joint member. In the present invention, the provision of a second mastic, namely a highly compressible mastic such as one of the foam variety, permits the flowing first mastic material 166 a place in which to expand while maintaining the seal that must be effectuated within the mastic cavity portion 142. Of course, it will be possible in some applications to simply omit the second mastic material 182 and leave this portion of the mastic cavity portion 142 vacant, which still provides for the expansion and displacement of the first mastic material 166.

In addition to the nonfretting feature of the female/male sidelock joint assembly 130 discussed above with regard to the mastic material, the positive interlocking feature of the female/male sidelock joint assembly 130 offers important advantages with regard to resisting joint separation, sometimes referred to as "unzipping" which results from rotational forces imposed on the joint by windlift on the medial portions of the panels. Of course, the non-penetrating attaching assembly of the present invention provides for anchoring of a medial panel portions 68 of roof panels 26 to the underlying building structure, and this prevents most of the rotational movement imparted to the joints, but when the nonpenetrating attaching assembly is not used, or even when it is used, there will still be uplift on some portions of the roof panels, the result of which is to place some, if not a good deal, of rotational moment on portions of the female/male sidelock joint assembly 130.

The interlocking feature of the dual point gripping function of the shoulder stop 158 and the edge engaging ramp 160 abuttingly engaging the shoulder engaging portion 162 and the ramp engaging edge 164, respectively, serves to resist moment forces of disengagement imposed by relative rotation of the roof panels 132A and 132B. Further, the interaction of the end portion 170 (of the hold down clip 56) with the clip retention surface 172 also helps resist rotational forces.

It has been observed that the height and the width ratio of the female/male sidelock joint assembly 130 is also important. For the purpose of unzipping considerations, the distance indicated by arrow 190 will be referred to as the height (H) of the female/male sidelock joint assembly 130, and the distance indicated by the arrow 192 will be referred to as the width (W) of the female/male sidelock joint assembly 130. It will be appreciated that these distances measured from the point of upward rotation (that is, from the point of contact of the ramp engaging edge 164 with the edge engaging ramp 160), represent the moment arms applied during rotation that spring the leg portions of the female and male sidelap joints 134, 144 apart. Practical observations have indicated that the ratio (R) of H to W has a direct bearing on the ability of the joint to transfer force from the clip to the panel and from one panel to the other. As a result the unfurling and unzipping characteristics of the female/male sidelock joint assembly 30 are greatly improved. If R is less than about 1.0, and for values up to about 1.0 (that is, low and wide joints), there is more of a tendency for the joint to separate as the roof panel 132A is rotated relative to the roof panel 132B. For values of R greater than about 1.0 (that is, for high, narrow joints), the tendency to unlock during rotational moment load is decreased. At a value of R of approximately 2.0 very good locking stability was observed during tests to separate the roof panels 132A, 132B.

FIGS. 24 and 25

As previously described hereinabove, the unfurling and unzipping of the panel sidelaps is undesirable and may be prevented in two ways. One way to prevent unfurling and unzipping is to construct the sidelaps so as to possess sufficient rotational restraint to prevent a female panel from rotating in relation to an adjacent male panel. A second way to prevent unfurling and unzipping is to reduce or eliminate the forces that tend to separate the male and female panels from their interlockingly joined relationship.

Insofar as constructing sidelaps to possess sufficient rotational restraint to prevent a female panel from rotating in relation to an adjacent male panel, various prior art approaches have been formulated, such as the use of an external clip as disclosed in U.S. Pat. Nos. 5,228,248, 5,282,340, and 3,312,028. These prior art approaches, however, have met with limited success as a result of consumer concerns relating to aesthetics, corrosion induced by dissimilar metals and the retention of water between such a clip and the panels. On the other hand, restraint mechanisms such as disclosed above with respect to FIG. 23, and hereinbelow with respect to FIGS. 24, 25, 26, 30, and 31 have been found to provide sufficient rotational restraint without these and other associated problems.

As to the second way to prevent the unfurling and unzipping of adjacent panels, that is the reduction or elimination of forces tending to cause the unfurling and unzipping of the panels, mechanisms disclosed hereinabove with reference to FIGS. 5 and 9A have been found to be advantagous for that purpose. Furthermore, mechanisms to be described hereinbelow with respect to FIGS. 26, 27, 28, 30, 31, 32, 33, 34, 35, 41, 43, 42, 44, 47, and 48 wherein a restraining mechanism is applied across at least a portion of the panel flat or the panel joint may be employed to reduce the force tending to separate the panels to an acceptable level.

Referring now in particular to FIG. 24, shown therein is a view of a standing seam assembly 130A, similar to the sidelap joint assembly 130 previously described, but containing compression plates on either both or one side of the steel roll formed interlocked sidelap joint assembly 130 and a fastener extending through a compression plate 208, the female first leg portion 136, the male first leg portion 146, the sealant and optionally, the clip. Item 208A serves as a nut for item 210 and plate 208B is optional. Connections may be made by self-drilling and self-tapping fasteners, or with a field drilled hole in the assembled corrugation and a bolt inserted therethrough.

Assembly may consist of sliding item 208A up inside the corrugation from the end of a panel or by sliding item 208A in under the distal end of item 160. Optionally, the item 208A may be inserted before the female is snapped over the male. The assembly may occur at an endlap or at any location throughout the sidelap.

Sealant under the head of the bold, the compression plate under the head of the bolt or the nut on the other side of the corrugation will have sealant to prevent leaks. The purpose of the assembly is to prevent the corrugation from opening when subjected to wind uplift.

FIG. 25 shows a sidelap joint assembly 130B, which has the same construction as the sidelap joint assembly 130 shown in FIG. 23, with the addition of fastener, or compression plates 206B and 208B similar to those shown and previously described with reference to FIG. 24. As with the sidelap joint assembly 130A shown in FIG. 24, the sidelap joint assembly 130B in FIG. 25 allows the fastener plate 208B to serve as the nut for the fastener item 210, which may be either a self-drilled, self-tapped fastener, or a bolt used with a pre-drilled hole. Further, assembly may be performed in a similar fashion as that described hereinabove for FIG. 24.

It has been known for some time that certain forms of panel sidelaps tend to unfurl and unzip when subjected to wind uplifts and other forces that cause them to deform into loaded shapes similar to that shown in FIG. 9A. When panels containing substantially flat areas are subjected to uplift loads, the sidelaps tend to separate and the overlapping female corrugation rotates in relation to the underlying male. This is the result of the overlapping female not engaging or gripping the underlying male sufficiently to prevent unfurling and then unzipping.

External clips, such as BRS Clamp Clip 102 and other similar clips have been applied externally to the corrugation in an attempt to prevent such unfurling and unzipping, but have met with limited success.

When unfurling and unzipping are to be prevented by constructing the female so that it does not rotate in relation to the corresponding male, one associated problem is that the female does not grip the male tightly and offers little rotational restraint to unfurling. This phenomenon is addressed in the sidelap shown in FIG. 23, wherein it is noted that the moment arm between the rotational points shown should be extended to prevent the top of the female from rotating in relation to the top of the male thus allowing the panel sidelap to open between the male and the female as the flat of the panel bows up and at least a portion of the panel flat forms a catenary across the panel.

The proper restraint to prevent or minimize this action may be achieved by shaping the corrugation so rotational resistance between the male and the female is achieved. Such rotational restraint may be achieved by the female and male forming similar equal and opposite counter-acting couples at those points where the female contacts the male. As unfurling and unzipping forces act upon the seam, the panels exert forces against each other, resulting in the opposite counteracting couples that tend to resist the unfurling and unzipping of the panels. Such couples may be seen in FIGS. 23 and 39.

FIGS. 26-35

Referring now to FIG. 26, shown therein is a schematic side view of a standing seam assembly 500, similar to the sidelock joint assembly 130 previously described with reference to FIG. 23, but having certain improvements over them. In contrast to the previously described interlocking seams, however, the seam assembly 500 provides a field roll formed seam between adjacent contiguously placed roof panels 502A and 502B wherein a conventional field roll forming tool (not shown) is applied to form and complete the seam. It should be understood that the panel, prior to seaming, may be formed in the field or in the factory and shipped to the field in its formed shape. The seam assembly 500 shown in FIG. 26 illustrates roof panels 502 in a condition prior to the application of the field roll forming tool, so that FIG. 26 shows a before-field roll formed configuration.

FIG. 26 provides a first roof panel 502A with a female sidelap joint 504 having first and second leg portions 506 and 508, respectively, which are formed in a direction generally normal to the first roof panel 502A and separated by a connecting portion 510. A cavity 512 is formed thereby and into which extends a male sidelap joint 514 comprising a first leg portion 516 formed in a direction extending from the adjacent roof panel 502B. The first leg portion 516 is placed so as to extend adjacently to the female first leg portion 506 as shown. The male sidelap joint 514 further comprises first and second radiused portions 518 and 520 as shown and a mastic contact portion 522, extending beyond the second radiused portion 520. The mastic contact portion 522 contacts a mastic material 524 that is sandwiched between the mastic contact portion 522 and the connecting portion 510 of the female sidelap joint 504.

A hold down clip 526 supported by the underlying building structure (not shown) is disposed to interlock over the first radiused portion 518 of the male sidelap joint 514. The hold down clip 526 provides a hooking mechanism whereby the seam may be anchored to the underlying building structure. For clarity of illustration, the hold down clip 526 is shown in FIG. 26 to not contact the male sidelap joint 514, but generally contact will exist between the hold down clip 526 and the first radiused portion 518 in similar manner as for seams that have been previously described herein. The hold down clip 526 does not contact the mastic material 524 or the connecting portion 510 so that as inwardly directed load causes the panel to settle slightly as tolerances are taken up and as the underlying support material settles slightly, the top portion of the clip is free to slide on the first radiused portion 518 easily, allowing relatively lateral movement between the hold down clip 526 and the first radiused portion 518 without damaging the mastic material 524.

Additionally, FIG. 26 shows an optional horizontal retaining clip 528 that provides additional resistance to the "unfurling" or "unzipping" of the two roof panels 502A and 502B, as a result of environmental forces. It should be noted that the discussion previously provided hereinabove with reference to FIGS. 9, 9A, 9B, 10 and 10A in regards to the prevention of unfurling and unzipping are equally applicable to the discussion and figures presented hereinbelow. Additionally, it will be readily observed that the horizontal retaining clip 528 is a variant on the hooking clips 224 and 226 as shown in FIG. 9, in that the horizontal clip 528 provides a one-piece clip and the hooking clip 224 and 226 in FIG. 9 attach to underlying support structure which extends to the next panel, so that clip 224 in one panel, clip 226 in an adjacent panel, and the underlying support structure therebetween are functionally equivalent to the horizontal clip 528.

The edges of the horizontal retaining clip 528 are formed so as to provide radiused portions 530 and 532, wherein the radiused portion 530 is disposed to contact a corresponding clip surface 534 in the first roof panel 502A and radiused portion 532 likewise contacts a corresponding clip surface 536 in the roof panel 502B as shown. The clip surfaces 534 and 536 are sized and spaced so that the horizontal retaining clip 528 may be snapped into place and retained without the need for securing hardware. The clip surfaces 534 and 536 may be provided with a generally vertical shape, as shown in FIG. 27, or may be provided with an S-shape, as shown in FIG. 28. As shown in FIG. 29, which is the view taken along the 29—29 line in FIG. 28, the edges of the horizontal retaining clip 528 may be provided with a knurled clip retention surface 538 for providing improved contact between the radiused portions 530, 532 and the clip surfaces 534, 536.

FIG. 30 provides a view of the standing seam assembly 500 after completion of the aforementioned field rolling process. As shown in FIG. 30, the second leg portion 508 of the female sidelap joint 504 is rolled so as to generally follow the contours of and be in near proximity to the male sidelap joint 514. The length of the second leg portion 508 may be varied, but should be sized so that an end point 540 of the second leg portion 508 is located far enough down the male first leg portion 516 in the direction of the roof panel 502B to prevent unfurling of the corrugation as it is subjected to upwardly directed load generally perpendicular to the panel. Locating the end point 540 towards the roof panel 502B provides additional resistance to the unzipping of the roof panels 502 by providing a spring force between the end point 540 and the first leg portion 516 of the male sidelap joint 514 as the roof panel 502B is lifted as a result of the previously described environmental forces.

FIG. 31 provides an alternative view of the standing seam assembly 500 after completion of the field rolling process, in which the second leg portion 508 is brought generally at an angle towards the male sidelap joint 514, instead of generally following the contours of the male sidelap joint 514, as shown in FIG. 30. As with the field roll formed seam shown in FIG. 30, the end point 540 of the second leg portion 508 in FIG. 31 is located so as to be sufficiently near the roof panel 502B at the base of the male sidelap joint 514 so as to prevent unfurling and unzipping of the seam. The second leg portion 508 may be roll formed so as to provide a radiused section 542, an angled section 544 and a vertical section 546, the angle and length of the vertical section 546 largely determined by the overlap required to prevent seam unfurling and unzipping.

In addition, the corrugation's resistance to unfurling and unzipping may be further enhanced by the addition of a seat 541 formed into the first leg portion 516 to prevent the end point 540 from being forced downward as the panel is subjected to uplift or outwardly directed load that tries to rotate the male in relation to the female and the male and female sidelaps attempt to separate one from the other (in other words, the seat 541 acts as a latch). FIG. 31A provides an enlarged view of the seat 541.

Turning now to FIG. 32, shown therein is a schematic side view of another field roll formed standing seam assembly 550. As with the standing seam assembly 500 shown in FIG. 26, it should be understood that the seam assembly 550 shown in FIG. 32 illustrates the seam in a condition prior to the application of a conventional field roll form tool, so that FIG. 32 shows a before-roll formed configuration.

FIG. 32 includes roof panels 552, denoted as a second roof panel 552A and a second roof panel 552B which are brought together as shown during assembly. The first roof panel 552A comprises a female sidelap joint 554 having a first leg portion 556 extending from the first roof panel 552A, a radiused portion 558, a portion 560 that is generally parallel to the direction of the first roof panel 552A, and finally a second leg portion 562 that extends toward the first roof panel 552A at an angle. The second roof panel 552B has a male sidelap joint 564 that is brought into near proximity with the female sidelap joint 554 as shown.

The male sidelap joint 564 comprises a first leg portion 566 that extends generally in the direction of the first leg portion 556 of the female sidelap joint 554, with the first leg portion 556 connected to a radiused portion 568 that fits within the radiused portion 558. The male sidelap joint 564 further comprises a mastic contact portion 570, that extends generally in the same direction as the portion 560 and has the mastic material 524 attached thereto.

Between the female sidelap joint 554 and the male sidelap joint 564 is a hold down clip 572, which secures the standing seam assembly 550 to an underlying building structure (not shown) in a manner similar as other hold down clips previously described hereinabove. The hold down clip 572 has a first leg portion 574 juxtaposed between the first leg portions 556 and 566, a radiused portion 576 juxtaposed between the radiused portions 558 and 568, a portion 578 juxtaposed between the horizontal portion 560 and the mastic contact portion 570, and a second leg portion 580 juxtaposed adjacent to the second leg portion 562.

The standing seam assembly 550 further comprises the horizontal retaining clip 528 previously described with reference to FIG. 26 and FIG. 30, for providing additional resistance to the disengaging of the two roof panels 552A and 552B as a result of environmental forces. Similarly, the male and first roof panels 552A, 552B are provided with clip surfaces for accommodating and securing the horizontal retaining clip 528.

Referring now to FIG. 33, shown therein is a view of the standing seam assembly 550 after completion of the aforementioned field roll forming process, after which the second leg portion 580 of the hold down clip 572 and the second leg portion 562 of the female sidelap joint 554 are radiused around the end of the mastic contact portion 570 of the male sidelap joint 564. The second leg portion 562 contacts the mastic material 524 so as to provide a weathertight seal. The second leg portion 580 of the hold down clip 572, however, does not fracture the mastic material 524, allowing the roof panels 552 to move relative to the hold down clip 572 during thermal expansion and contraction without damaging the mastic material 524. Once roll formed, the hold down clip 572 thus serves to anchor the roof panels 552 by restricting upward movements of both the female and male sidelap joints 554 and 564, respectively.

Turning now to FIG. 34, shown again in an expanded view is the standing seam assembly 500 previously described with reference to FIG. 30. FIG. 34, however, more fully illustrates one method for securing the hold down clip 526 to the underlying building structure.

As shown in FIG. 34, the hold down clip 526 is shown to further comprise a flange portion 582 that turns and runs parallel to the first roof panel 502A. The flange portion 582 contains a hole (not shown) through which a screw 584 extends, securing the flange portion 582 to the underlying structure, such as a purlin 586. The effect of the screw 584 is to secure the hold down clip 526 to the puffin 586 so as to anchor the hold down clip 526, and thus the standing seam assembly 500, to the building structure in a vertical direction while allowing the roof panels 502 to expand or contract relative to the hold down clip 526 in a substantially horizontal, longitudinal direction (i.e., the direction of the seam).

Also shown in FIG. 34 is the horizontal retaining clip 528 which secures the roof panels 502 in a manner described hereinabove. The horizontal retaining clip 528 may compress a layer of thermal insulation 588 at the location underneath the standing seam assembly 500 as shown. As previously described, the thermal insulation 588 runs as a compressed layer between the roof panels 502 and the purlin 586 and serves to thermally insulate the building structure from the roof panels and the outside environment.

Figure 35:
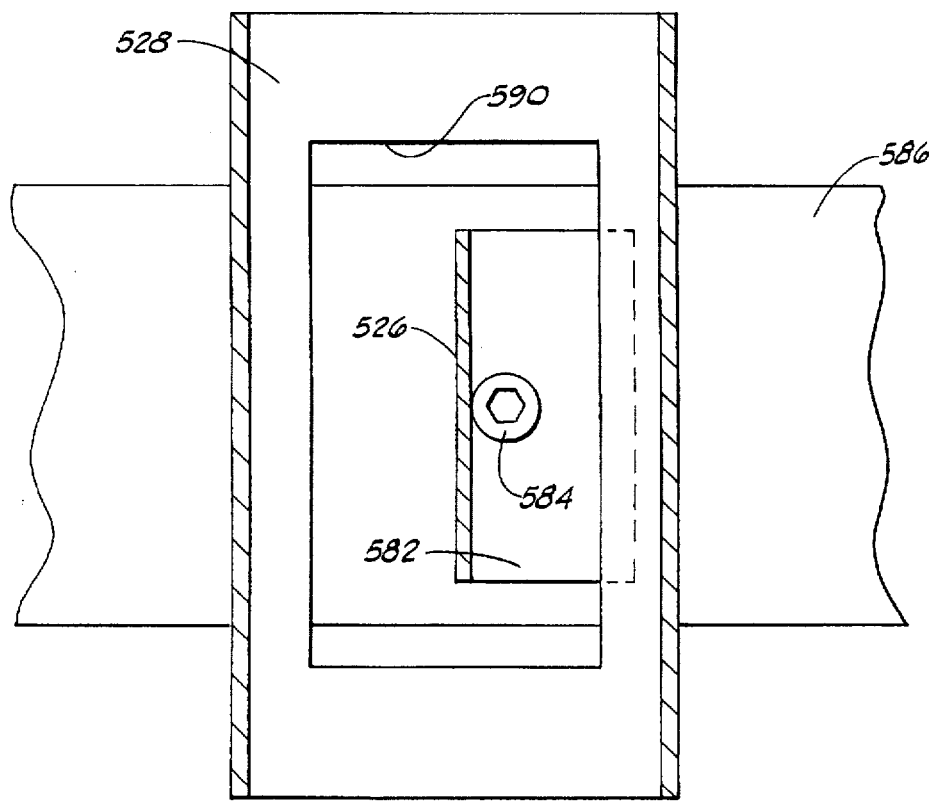
FIG. 35 is a plan view of the horizontal clip having rectangular shape.

It should be noted that the hold down clip 526 and the horizontal retaining clip 528 independently operate to secure and resist disengagement of the standing seam assembly 500. FIG. 35, which is a view taken along the line 35—35 in FIG. 34, shows a partial downward view of the hold down clip 526 and the horizontal retaining clip 528. As shown in FIG. 35, the horizontal retaining clip 528 may have a generally rectangular shape with upwardly radiused edges, denoted by the thin layers of cross section shown at each end. The horizontal retaining clip 528 further has a rectangular opening 590 in the center, through which the hold down clip 526 and the head of the screw 584 extend. The flange portion 582 of the hold down clip 526 partially extends under the horizontal retaining clip 528, as indicated by the broken lines shown in the figure. The opening 590 in the horizontal retaining clip 528 allows a certain amount of freedom of placement between the horizontal retaining clip 528 and the hold down clip 526, and further allows each to operate independently in securing the standing seam assembly 500. It is important to note that other shapes for the horizontal retaining clip 528 may be used to provide the same function as described hereinabove, and the horizontal retaining clip 528 may be located either over an underlying purlin or between adjacent purlins, as desired.

FIGS. 36 and 37

Turning now to FIG. 36, shown therein is a standing seam assembly 600 having an external clip 604 that provides an external clamping force upon adjacently disposed female and male sidelap joints 606 and 608 of roof panels 602A and 602B, respectively. The external clip 604 comprises sheet metal formed so as to slidably mount over the female and male sidelap joints 606 and 608.

The female and male sidelap joints 606 and 608 shown in FIG. 36 illustrate a conventional seam configuration with the female sidelap joint 606 having a radiused portion 610 that is field rolled or locked over a leg portion 612 of the male sidelap joint 608. Mastic material 524 provides a weather proof seal between a hold down clip 616, the leg portion 612 and a horizontal portion 614 of the female sidelap joint 606. Unlike standing seam assemblies described hereinabove, however, the hold down clip 616 of FIG. 36 contacts the mastic material 524.

The geometries of the external clip 604 are chosen so as to provide a close fit over the outside of the standing seam assembly 600, bringing the external clip 604 into near proximity with the female and male sidelap joints 606 and 608. The external clip 604 is installed by driving the external clip 604 over the seam from one end by way of a rubber mallet or other suitable instrument. For clarity of illustration, FIG. 37 provides an isometric view of the external clip 604 prior to installation on the standing seam assembly 600. Of course, any number of different configurations of female and male sidelap joints 606 and 608 could be used in substitution for the standing seam assembly 600 shown in FIG. 36, including any of the previously described standing seams, in which case the geometries of the external clip 604 would be correspondingly modified to fit over the seam in like fashion.

Additionally, the external clip 604 may contain one or more screws 618 installed through the external clip, the female sidelap joint 606, the hold down clip 616 and the male sidelap joint 608 as shown in FIG. 36 to secure the external clip 604 and provide additional clamping force upon the standing seam assembly 600.

The length of the external clip 604 may be selected to run in a horizontal direction from a few inches to the entire length of the standing seam assembly 600, as desired, although more installation force and effort may be required as the horizontal length of the external clip 604 is increased. In addition, the vertical height of the external clip 604 may be varied so that first and second clip leg portions 620 and 622 may be made to approach the base of the roof panels 602A and 602B, respectively. It will be apparent to those of skill in the art, however, that greater clamping force will generally be achieved by providing a clamp having a greater vertical height and by locating the screw 618 closer to the base of the roof panels 602A and 602B.

FIGS. 38-48

Referring now to FIG. 38, shown therein is another standing seam assembly 650 of the field roll formed variety with FIG. 38 showing the standing seam assembly 650 in a pre-roll formed configuration, that is, before the field roll forming operation has taken place. The standing seam assembly 650 is shown to include adjacent female and second roof panels 652A and 652B having raised corrugation sections including horizontal portions 654A and 654B, first angled portions 656A and 656B, and second angled portions 658A and 658B, respectively. The raised corrugation sections of the first and second roof panels 652A and 652B provide additional strength to the finished roof as well as add to the aesthetic value of the roof by providing an architecturally pleasing design.

Although the raised corrugation sections of the roof panels 652A and 652B shown in FIG. 38 may be used in conjunction with any of the previously described standing seam assemblies, the configuration of the standing seam assembly 650 of FIG. 38 is shown to comprise a female sidelap joint 660 having a first leg portion 662 extending in a direction normal to the female horizontal portion 654A, a horizontal portion 664 and a second leg portion 666 which includes a mastic contact portion 668 to which a mastic material 524 is attached. The roof panel 652B is shown to have a male sidelap joint 670 that has a first leg portion 672 running in a direction normal to the male horizontal portion 654B, a first radiused portion 674, a second radiused portion 676 and a second leg portion 678.

A hold down clip 680 extends between and in close proximity to the first leg portions 662 and 672 and hooks over the first radiused portion 674 of the male sidelap joint 670, securing the standing seam assembly 650 to the building structure. The hold down clip 680 extends downwardly and has a seat 682 on which the horizontal portion 654B of the roof panel 652B rests, providing support for the roof panel 652B. The support provided by the seat 682 is particularly useful when the seam is first being assembled.

The hold down clip 680 is shown in FIG. 38 to continue to extend downwardly past the seat 682 until reaching the underlying building or roof support structure, such as a purlin 684 as shown. It should be noted that the hold down clip 680, as well as first angled portions 656A and 656B of the 652A and 652B, respectively, are shown in a broken line fashion, indicating that the actual lengths of these portions may be varied and should be sized according to the geometric relationship existing therebetween. The hold down clip 680 includes a flange 686 that extends horizontally and provides a surface through which a screw 688 is placed to secure the hold down clip 680, and thereby the standing seam assembly 650, to the purlin 684. As described previously with reference to FIG. 34, the flange 686 compresses a layer of thermal insulation 690 in the area immediately adjacent to and under the flange 686.

FIG. 39 shows the standing seam assembly 650 after completion of the field rolling process using a conventional field seamer (not shown). After the field roll forming process, the second leg portion 666 of the female sidelap joint 660 is formed so as to be disposed in near proximity to the male sidelap joint 670, following the contours thereof and sandwiching the mastic material 524 between the mastic contact portion 668 and the second leg portion 678 to provide a weathertight seal. The length of the second leg portion 666 of the female sidelap joint 660 may be sized so that an end point 692 of the second leg portion 666 extends beyond the base of the male sidelap joint 670 and continue over the horizontal portion 654B of the roof panel 652B, as shown. The second leg portion 666 may be shortened or lengthened as desired, even to the extent it extends down first angled portions 656B, but the resistance of the standing seam assembly 650 to disengagement as a result of environmental forces will be improved when the end point 692 is located near or beyond the base of the male sidelap joint 670. FIG. 40 provides an optional shape for the field roll formed seam wherein second leg portion 666N is formed with a hook shaped return as shown. The second leg portion 666N is formed under the second radiused portion 676 in such a manner so that, as uplift forces tend to disengage the two panels, the second leg portion 666N latches under the second radiused portion 676 and causes the sidelap to become more securely attached.

Referring now to FIG. 41, shown therein is a standing seam assembly 700 with adjacent roof panels 702A and 702B, respectively, assembled in accordance with the present invention. The standing seam assembly 700 of FIG. 41 is of the interlocking variety, wherein a female and a male sidelap joint 704A and 704B are aligned and snapped into place during assembly in a manner similar as that described hereinabove. Further, the standing seam assembly 700 is provided with corrugation sections similar to the standing seam assembly 650 shown in FIG. 38 and FIG. 39, including first horizontal portions 706A and 706B, angled portions 708A and 708B and second horizontal portions 710A and 710B.

As with other standing seam assemblies described hereinabove, the standing seam assembly 700 is provided with a horizontal clip 712, shown in cut-away fashion in FIG. 41, which secures the roof panels 702A and 702B. FIG. 41 shows the horizontal clip 712 in near proximity to and supported by clip contact surfaces 714 provided within the second horizontal portions 710A and 710B. FIG. 42 shows an enlarged view of the horizontal clip 712 and the clip contact surface 714 for the right side of the horizontal clip 712. As shown above with reference to FIG. 29, a knurled clip retention surface 716 may be provided at the edge of the horizontal clip 712 for improved contact between the horizontal clip 712 and the clip contact surface 714.

An alternative to the horizontal clip 712, as shown in FIG. 41, is provided with reference to FIG. 43, which shows a horizontal clip 718 located at junctions between the horizontal portions 706A and 706B and the angled portions 708A and 708B of the roof panels 702A and 702B. This alternative placement of the horizontal clip 718 places it at the top of the corrugated section, as opposed to the bottom of the corrugated section as in FIG. 41. FIG. 44 provides an enlarged view of the horizontal clip 718, as well as a clip contact surface 720 provided within the horizontal portions 706A and 706B. As with the horizontal clip 712 as shown in FIG. 42, the horizontal clip 718 may also be provided with a knurled clip retention surface 716 for improved contact and retention of the clip.

Returning to FIG. 41, the standing seam assembly 700 is shown to include a hold down clip 722 that hooks over a radiused portion 724 of the male sidelap joint 704B and passes through mastic material 524 that is provided above the radiused portion 724. The mastic material 524, in providing a weathertight seal also contacts the hold down clip 722. If relative movement between the hold down clip 722 and the radiused portion 724 occurs, the sealant dam may be broken. Therefore, to prevent relative movement between the hold down clip 722 and the radiused portion 724 of the male sidelap joint 704B, a two piece floating clip has been used. More particularly, the mastic material 524 is provided both on the interior side of the female sidelap joint 704A and the interior side of the hold down clip 722, so that once the standing seam assembly 700 is assembled the mastic material 524 is sandwiched onto both sides of the hold down clip 722 to provide a weathertight seal. Additionally, as it is contemplated that the hold down clip 722 will not run the entire length of the standing seam assembly 700, but rather only be provided at selected locations along the seam, the mastic material 524 provided on the interior side of the female sidelap joint 704A will provide a weathertight seal between the interior side of the female sidelap joint 704A and the radiused portion 724 of the male sidelap joint 704B.

To accommodate expansion and contraction of the roof panels 702A and 702B relative to the building structure, a two-piece hold down clip assembly 726 is utilized, which comprises the aforementioned hold down clip 722 as well as a clip base 728 to which the hold down clip 722 is attached. The clip base 728 is shown in FIGS. 41 and 43 and is more fully illustrated with reference to FIG. 45.

Referring to FIG. 41 and to FIG. 45, the clip base 728 is shown to comprise a C-shaped beam section 730, which supports a hook-shaped section 732 of the hold down clip 722. More particularly, the hook-shaped section 732 of the hold down clip 722 extends under and around the C-shaped beam section 730 and is provided with a first tab 734 that slidably engages on an interior surface 736 of the C-shaped beam section 730, as shown. The first tab 734 limits the lateral travel of the hold down clip 722, holding the hold down clip in an essentially vertical attitude. Additionally, the hook-shaped section 732 of the hold down clip 722 is provided with a second tab 738 that rests on a top surface 740 of the C-shaped beam section 730, which serves to support the hold down clip 722 and to limit its vertical movement. Thus, the first and second tabs 734 and 738 serve to secure the hold down clip 722 from movement in the vertical direction, while allowing the hold down clip 722 to move longitudinally as the hook-shaped section 732 slides along the C-shaped beam section 730. An enlarged view of this portion of the two-piece hold down clip assembly 726 is provided in FIG. 45B.

The clip base 728 is shown to further comprise seats 742, which support the horizontal portion 706B of the roof panel 702B. The clip base 728 may be formed from a single piece of sheet metal formed as shown so as to include rib sections 744 and embossments 746 to provide additional strength and resistance to distortional forces upon the clip base 728.

During installation, the hold down clip 722 should be centered to assure the full range a movement. This is accomplished by a locking tab 747 that is formed in the hold down clip 722 such that an indent in the C-shaped beam section 730 is engaged by the locking tab 747 until the locking tab 747 is positioned over the male leg of the panel at which time the locking tab 747 is pushed away from the C-shaped beam section 730, thus freeing the hold down clip 722 to slide along the C-shaped beam section 730.

The hold down clip 722 further has a lower shelf 723 which is formed to slide under the male side lap joint 704B. The lower shelf 723 is formed an an angle that results in a leading edge 723A of the lower shelf 723 having to be deflected by about 15 degrees to slide under the male sidelap joint 704B. The deflection of the lower shelf 723 results in a continuous force being applied to the lower portion of the male sidelap joint, thus forcing the radiused portion 724 of the male sidelap joint 704B into the mastic material 524 contained under the hold down clip 722. This will assure that the male side lap joint 704B will be held firmly against the mastic material 524 throughout the life of the roof system.

The clip base 728 further comprises an insulation tab 748 useful in securing a foam block insulation strip (not shown) that may be placed over a layer of thermal insulation 750. The foam insulation strip will be sized to a width that will fit between the reinforcing seats 742 on the previously installed clip base and will be of a length that will allow the insulation tab 748 to embed into the opposite end of the foam block as the clip is being installed, thus capturing both ends of the foam block. This will hold the foam block in position as the panels expand and contract.

The base of the clip base 728 is anchored to the underlying structure, such as a purlin 752 using conventional hardware, such as screws 762 shown in FIG. 45A. More particularly, FIG. 45A shows that the clip base 728 may be attached to the underlying structure by means of the screws 762 through a flange portion 756. To provide a solid connection of the base over the thermal insulation 750, the flange portion 756 is formed with feet 758 that extend downwardly at an angle normal to the flange portion 756 and which easily compress the thermal insulation 750 so as to bear solidly on the purlin 752. The feet 758 are formed by punching square holes 754 through the flange portion 756 and forming opposing sides of the square downward. Additionally, a back edge 757 of the flange portion 756 is formed downwardly to provide a foot surface 764 that acts in cooperation with the feet 758 to support the flange portion 756.

Finally, returning to the discussion concerning the mastic material 524 used to provide a weathertight seal between the hold down clip 722, the interior side of the female sidelap joint 704A and the radiused portion 724 of the male sidelap joint 704B, a notch 760 in each end of the hold down clip 722 is shown in FIG. 45. The notch 760 provides a V-shaped cutaway at the end of the hold down clip 722, beyond which the mastic material 524 attached to the interior side of the hold down clip 722 extends, as shown. The purpose for the notch 760 is to provide a structure that will carry sufficient mastic material 524 to bridge between mastic material 524 carried by the underside of female sidelap joint 704A and the radiused portion 724 of the male sidelap joint 704B when in the assembled position. That is the mastic material 524 will remain positioned under the notch 760 until the hold down clip 722 is positioned over the male sidelap joint 704B, at which time the mastic material carried by the end or the hold down clip 722 bridging the edges of the notch 760 will be extruded up, forming a sealant nodule that will easily join with the mastic material 524 in the female sidelap joint 704A.

Turning now to FIG. 46, shown therein is yet another interlocking standing seam assembly 800, comprising roof panels 802A and 802B, respectively, placed adjacently as shown and locked into place during assembly. The standing seam assembly 800 includes a female sidelap joint 804 having a first leg portion 806, a first radiused portion 808, a second leg portion 810 and a second radiused portion 812 constructed as shown. A mastic material 524 is provided and attached to the interior of the second radiused portion 812. A male sidelap joint 814 is interlocked with the female sidelap joint 804 and comprises a first leg portion 816, a first radiused portion 818, a second radiused portion 820, and a second leg portion 822 with a tapered edge 824 at the end of the second leg portion 822. The second radiused portion 820 contacts and forms a weathertight seal with the mastic material 524 and the tapered edge rests against the interior edge of the first radiused portion of the female sidelap joint. A hold down clip 826 is provided that contacts and exerts a downward force upon the first radiused portion 818. The hold down clip 826 has an endpoint 828 that extends towards, but does not contact the second radiused portion 820 of the male sidelap joint 814.

The hold down clip 826 includes a seat 830 on which the male sidelap joint 814 may rest either during or after assembly of the standing seam assembly 800 and the hold down clip 826 extends downwardly and is secured to the underlying building structure (not shown) in either a conventional manner or a manner as disclosed hereinabove.

Turning now to FIG. 47, shown therein is a representation of the standing seam assembly 500, as shown previously with reference to FIG. 30, containing both the aforedescribed hold down clip 526 and the horizontal clip 528 which are used to secure the standing seam assembly 500 to the underlying structure. FIG. 47 illustrates a clamping tool 850 that is useful during installation of the horizontal clip 528.

The clamping tool comprises a pair of clamping jaws 852 attached at the ends of extension arms 854 that are secured together and pivoted about a pivot point 856. Lever arms 858 extend beyond the pivot point 856 and have attached thereto handle sections 860 that, as with conventional plier-like tools, enable a human user to provide a clamping force between the clamping jaws 852 by exerting an inwardly directed force upon the handle sections 860.

The clamping jaws 852 are shown in FIG. 48, which illustrates the clamping jaws 852 in a downward view taken along the 48—48 line shown in FIG. 47. The clamping jaws 852 can be seen in FIG. 48 to each comprise two clamp sections 862 located at each end of the clamping jaws, the clamp sections 862 serving to apply the clamping force when the handle sections 860 are brought together as previously described.

The purpose of the clamping tool 850 is to assist in the installation of the horizontal clip 528 by momentarily compressing the roof panels 502A and 502B, enabling the horizontal clip 528 to be installed as the roof panels 502A and 502B are compressed and momentarily brought closer together. Once the horizontal clip is installed, the clamping force from the clamping tool 850 is removed, allowing the roof panels 502A and 502B to substantially return to their previous relative positions.

The clamping tool 850 is formed from any suitable material sufficient to exert the necessary force upon the standing seam assembly 500 without deformation of the clamping tool 850. Those of skill in the art will recognize that the geometries of the clamping tool 850 will be dictated by the geometry of the standing seam assembly 500 and the material used in the clamping tool 850. Further, it will be recognized that, generally, the clamping jaws 852 may be of almost any length, but optimally should be chosen to be somewhat longer than the length of the horizontal clip 528 being installed thereby.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. An improved four corner sealing assembly in which an upper pair of interlocking standing seam joint panels and a lower pair of interlocking standing seam joint panels meet in a lapped four corner juncture area, an upper end of the two lower panels being overlapped by a lower end of the two upper panels at the juncture area, one panel of each of the upper panel pair and the lower panel pair having an upstanding male side lap portion forming an upper male surface, the other panel of each of the upper panels and the lower panels having an upstanding female side lap portion overlapping the respective male side lap portions, each of the female side lap portions having a longitudinally disposed sealant cavity and a side lap sealant strip predeterminedly disposed in conjunction with the sealant cavity, the sealant strip veering near the juncture area, at least one of the male side lap portions notched at the juncture area to overlap the ends and so that the upper male surface of said male side lap portions are received within the female side lap portions, at least one of the female sidelap portions being notched to be aligningly interlapped and sealed with the other of the female side lap portions, an end lap sealant positioned between the overlapping lower ends of the upper panels and the upper ends of the lower panels, the end lap sealant disposed to extend upwardly between the upstanding leg portions of the notched male side lap portions and also between female upstanding leg portions so as to sealingly engage the side lap sealant strip in the female side lap portions.

2. The sealing assembly of claim 1 further comprising:
cinch strap means generally conforming to the profile of the overlapping panel pairs at the juncture area for interconnecting the interlapped panel ends at the four corner area.

3. The assembly of claim 2 wherein the cinch strap means has a bar strip which is so dimensioned that it places the interlapped standing seam joint in compression at the four corner juncture area when the bar strip is secured to median portions of the interlapping panel pairs at the juncture area.

4. The assembly of claim 3 wherein the standing seam joint formed by the interlocking female and male side lap joints is provided a sealant overflow cavity for displacement of the side lap sealant as the standing seam joint is placed in compression.

5. The assembly of claim 3 wherein the cinch strap means comprises:
a cinch strap substantially configured to the profile of the profile of the panels;
backup means supported beneath the juncture area panels for interconnecting with the cinch strap to compress the interlapped juncture area.

6. The assembly of claim 5 wherein the backup means comprises:
stirrup connector means supported by the underlying panels near the juncture area;
a backup plate having stirrup engaging tabs engageable with the stirrup connector means so that the backup plate is supported thereby beneath the underlying panels.

7. The assembly of claim 6 wherein the stirrup connector means comprises a plurality of stirrup connectors, each of said stirrup connects comprises:
a support platform supported underneath one of the panels to supportingly engage one of the stirrup engaging tabs; and
detent means supported by the support platform for resisting removal of the engaged stirrup engaging tab.

8. The assembly of claim 1 wherein each of the male side lap portions is notched to align in non-interfering, interlapped relationship, the lapping male standing seam portion having a notch shaped to provide an angularly disposed sealant fillet to transition the sealant strip between elevations of the male standing seam portions.

9. An improved four corner sealing assembly in which an upper pair of interlocking standing seam joint panels and a lower pair of interlocking standing seam joint panels meet in an interlapped four corner juncture area, an upper end of the two lower panels being overlapped by a lower end of the two upper panels at the juncture area, one panel of each of the upper panel pair and the lower panel pair having an upstanding male side lap portion forming a male apex, the other panel of each of the upper panel pair and the lower panel pair having an upstanding female side lap portion overlapping the respective male side lap portions, at least one of the male side lap portions notched at the juncture area so that the upstanding leg portions of said male side lap portions meet in near abutting and non-interfering relationship and are received within the interlapped female side lap portions, one of the female side lap portions being notched to align with and interlap with the other female side lap portion, sealing means for sealing the overlapped upper and lower panel pairs, back up means extending generally lateral to and under the overlapping panel pairs for interconnecting the juncture area panels at the overlapped juncture area as required to unitize the area.

10. The assembly of claim 9 wherein the back lip means has a bar strip dimensioned such that it places the lapped standing seam joint in compression at the juncture area when the back up means is secured to median portions of the overlapping panel pairs at the juncture area.

11. The assembly of claim 9 wherein at least one of the notched lapping male side lap portions has an angularly disposed sealant fillet so that engagement between the side lap sealant and the lapped male side lap portion is maintained throughout the juncture area.

12. The assembly of claim 9 further characterized in that each of the female side lap portions has a longitudinally disposed sealant cavity, and wherein the sealant means comprises:

a side lap sealant strip disposed within the sealant cavity prior to assembly and positioned to selectively veer between a juncture mode and a male apex abutting mode.

13. The assembly of claim 12 wherein the sealant means further comprises:

an end lap sealant strip disposed between the overlapping lower ends of the upper panel pair and the lapped upper ends of the lower panel pair, the end lap sealant positioned to extend upwardly between the upstanding leg portions of the notched male side lap portions so as to sealingly engage with the side lap sealant strip in the female side lap portions.

14. The assembly of claim 9 wherein the cinch strap means further comprises:

backup means supported beneath the juncture area panels for interconnecting with the bar strip to compress the interlapped juncture area.

15. The assembly of claim 14 wherein the backup means comprises:

stirrup connector means supported by the underlying panels near the juncture area;

a backup plate having stirrup engaging tabs engageable with the stirrup connector means so that the backup plate is supported thereby beneath the underlying panels.

16. The assembly of claim 15 wherein the stirrup connector means comprises a plurality of stirrup connectors formed in the underlying panels, each of said stirrup connector comprising:

a support platform supported below its respective panel to supportingly engage one of the stirrup engaging tabs; and detent means supported by the support platform for resisting removal of the engaged stirrup engaging tab.

* * * * *

UNITED STATES PATENT AND TRADEMARK OFFICE
CERTIFICATE OF CORRECTION

PATENT NO. : 5,685,118
DATED : Nov. 11, 1997
INVENTOR(S) : Harold G. Simpson

It is certified that error appears in the above-indentified patent and that said Letters Patent is hereby corrected as shown below:

Column 16, line 37, delete the word "mining" and insert the word --turning--.

Column 19, line 35, delete the word "tits" and insert the word --its--.

Column 19, line 62, delete the closed parenthesis ")".

Column 23, line 59, delete the word "an" and insert the word --a--.

Column 24, line 50, insert a closed parenthesis after the number 209I --)--.

Column 28, line 56, delete the words "ag ripping" and insert the words --a gripping--.

Column 46, line 63, delete the word "lip" and insert the word --up--.

Signed and Sealed this

Seventh Day of July, 1998

Attest:

Attesting Officer

BRUCE LEHMAN

Commissioner of Patents and Trademarks